United States Patent

Kuba et al.

[11] Patent Number: 5,557,628
[45] Date of Patent: Sep. 17, 1996

[54] SOLID STATE LASER APPARATUS AND LASER MACHINING APPARATUS

[75] Inventors: Kazuki Kuba; Masaki Seguchi; Akira Ishimori; Takashi Yamamoto, all of Hyogo, Japan

[73] Assignee: Mitsubishi Denki Kabushiki Kaisha, Tokyo, Japan

[21] Appl. No.: 233,416

[22] Filed: Apr. 28, 1994

[30] Foreign Application Priority Data

Sep. 24, 1993 [JP] Japan ................................. 5-261909

[51] Int. Cl.⁶ ............................ H01S 3/091; H01S 3/092
[52] U.S. Cl. ................... 372/70; 372/35; 372/41; 372/98; 372/99
[58] Field of Search ............................ 372/70, 34, 35, 372/36, 40, 41, 98, 99

[56] References Cited

U.S. PATENT DOCUMENTS

| | | | |
|---|---|---|---|
| 4,528,671 | 7/1985 | Robbins | 372/68 |
| 4,734,917 | 3/1988 | Johnson | 372/70 |
| 4,852,109 | 7/1989 | Kuchar | 372/34 |
| 4,881,233 | 11/1989 | Von Arb et al. | 372/35 |
| 4,949,346 | 8/1990 | Kuper et al. | 372/36 |
| 4,969,155 | 11/1990 | Kahan | 372/70 |
| 4,984,246 | 1/1991 | Cabaret et al. | 376/69 |
| 4,989,215 | 1/1991 | Winik | 372/70 |
| 5,033,058 | 7/1991 | Cabaret et al. | 372/70 |
| 5,130,999 | 7/1992 | Maeda et al. | 372/70 |
| 5,299,213 | 3/1994 | Kuba et al. | 372/70 |
| 5,305,345 | 4/1994 | Albrecht et al. | 372/70 |
| 5,307,365 | 4/1994 | Stapparetz et al. | 372/70 |

FOREIGN PATENT DOCUMENTS

| | | |
|---|---|---|
| 0078654 | 5/1983 | European Pat. Off. . |
| 0382108 | 8/1990 | European Pat. Off. . |
| 0492526 | 7/1992 | European Pat. Off. . |
| 0583944 | 2/1994 | European Pat. Off. . |
| 3930328 | 6/1990 | Germany . |
| 4032488 | 4/1991 | Germany . |
| 112179 | 5/1991 | Japan . |
| 204984 | 9/1991 | Japan . |
| 3204984 | 9/1991 | Japan . |
| 77563 | 3/1994 | Japan . |
| 2230642 | 10/1990 | United Kingdom . |
| 01344 | 2/1986 | WIPO . |

Primary Examiner—Rodney B. Bovernick
Assistant Examiner—Robert E. Wise
Attorney, Agent, or Firm—Sughrue, Mion, Zinn, Macpeak & Seas

[57] ABSTRACT

A solid state laser apparatus and a laser machining apparatus are provided to provide high power laser beam having an excellent condensing performance at high efficiency and with high reliability. In the solid state laser apparatus, a recess is provided in a supporter disposed on a slab side surface at an excitation area corresponding portion. A high reflectance body having a cooling water filtrating groove is disposed in the recess to contact with a slab facing surface with pressure. The supporter contacts slab longitudinal both ends with pressure through a silicon rubber plate which is transparent to excitation light. A transparent silicon rubber O-ring is disposed to extend over an entire peripheral portion of a plane formed by a slab surface including the supporter pressure contacting porting and the supporter so as to seal cooling water and elastically support the slab.

34 Claims, 44 Drawing Sheets

FIG.18a SUPPORTER COMPLETE INSULATION NO HEAT GENERATION

FIG.18b SUPPORTER LARGE HEAT CONDUCTION SMALL HEAT GENERATION

FIG.18c SUPPORTER SMALL HEAT CONDUCTION LARGE HEAT GENERATION $\Delta P = |P_1 - P_2|$

EXCITATION INTENSITY DISTRIBUTION

TEMPERATURE DISTRIBUTION

A-A' CROSS-SECTION

B-B' CROSS-SECTION

A-A' CROSS-SECTION

B-B' CROSS-SECTION

A-A' CROSS-SECTION

B-B' CROSS-SECTION

A-A' CROSS-SECTION

B-B' CROSS-SECTION

A-A' CROSS-SECTION

B-B' CROSS-SECTION

A-A' CROSS-SECTION

B-B' CROSS-SECTION

A-A' CROSS-SECTION

B-B' CROSS-SECTION

A-A' CROSS-SECTION

B-B' CROSS-SECTION

A-A' CROSS-SECTION

B-B' CROSS-SECTION

A-A' CROSS-SECTION

B-B' CROSS-SECTION

A-A' CROSS-SECTION

B-B' CROSS-SECTION

A-A' CROSS-SECTION

B-B' CROSS-SECTION

A-A' CROSS-SECTION

B-B' CROSS-SECTION

A-A' CROSS-SECTION

B-B' CROSS-SECTION

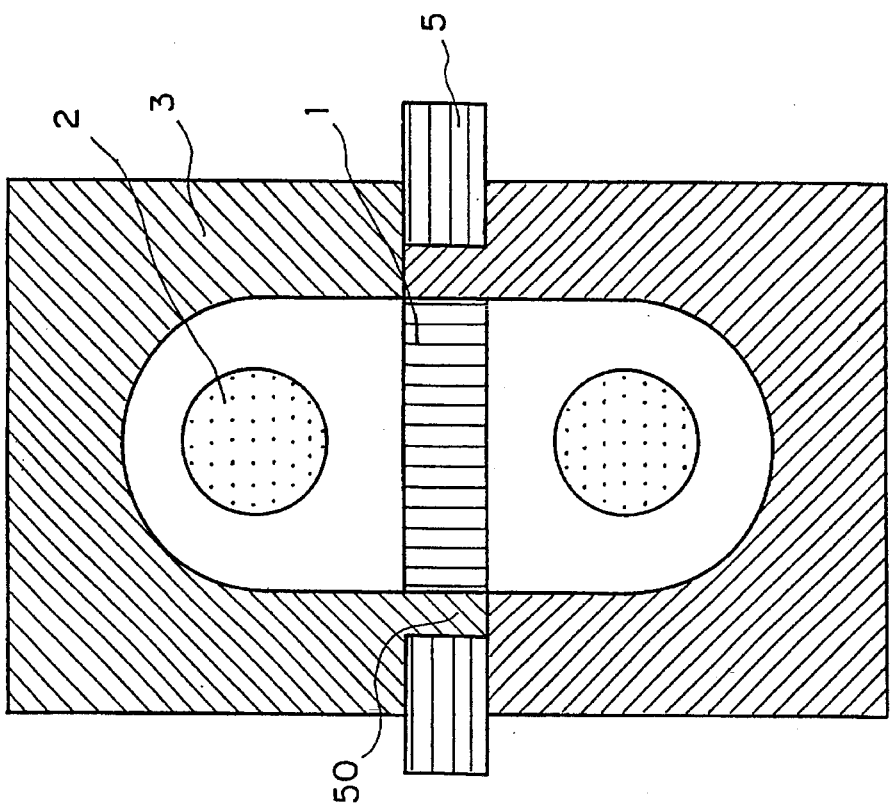
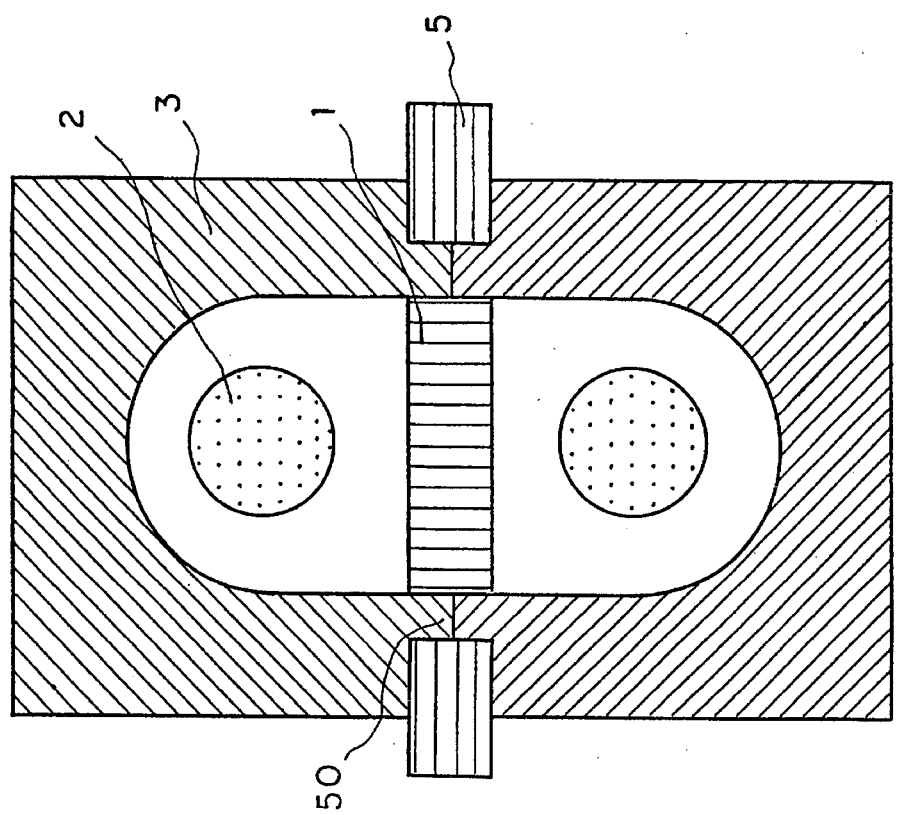

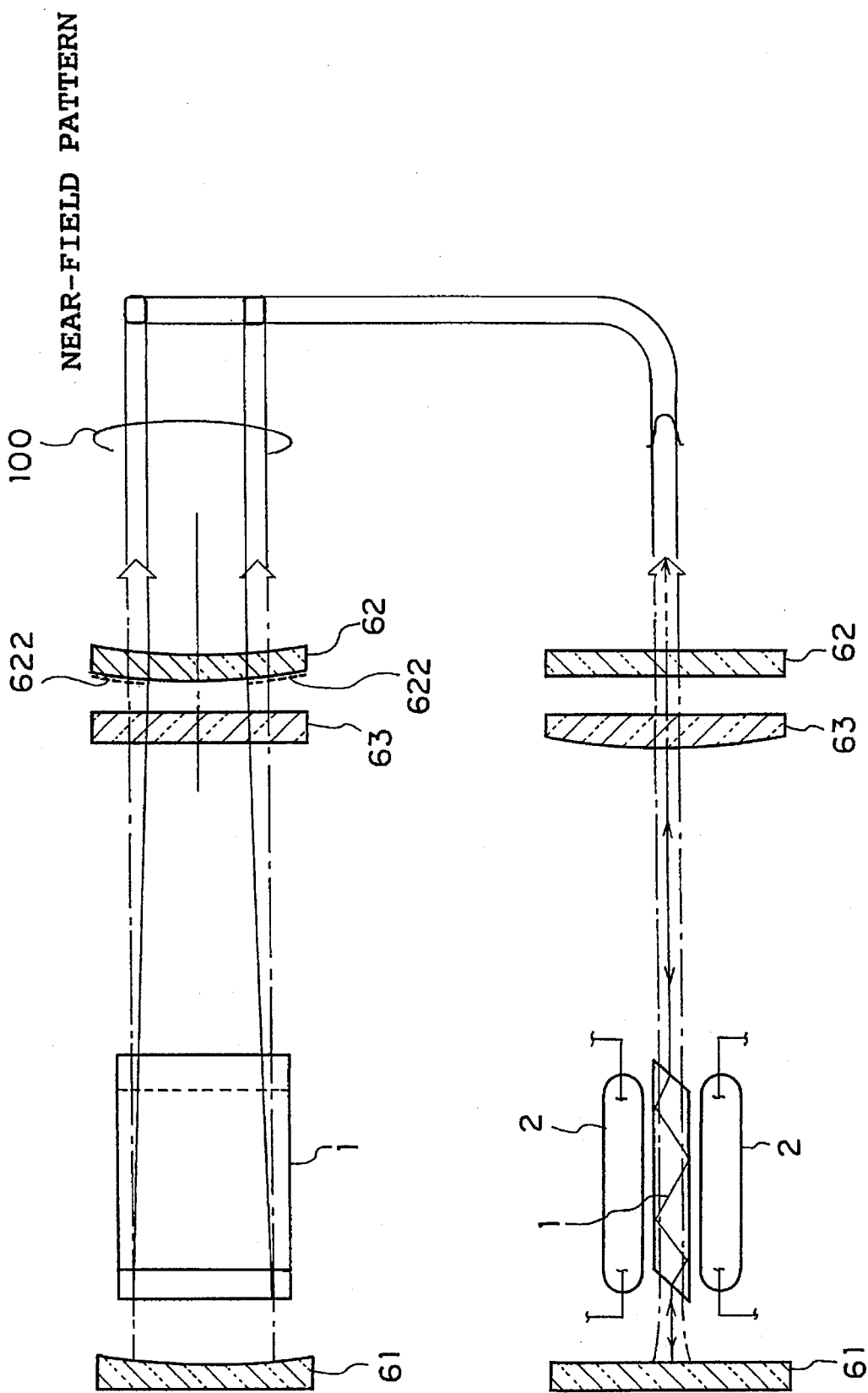

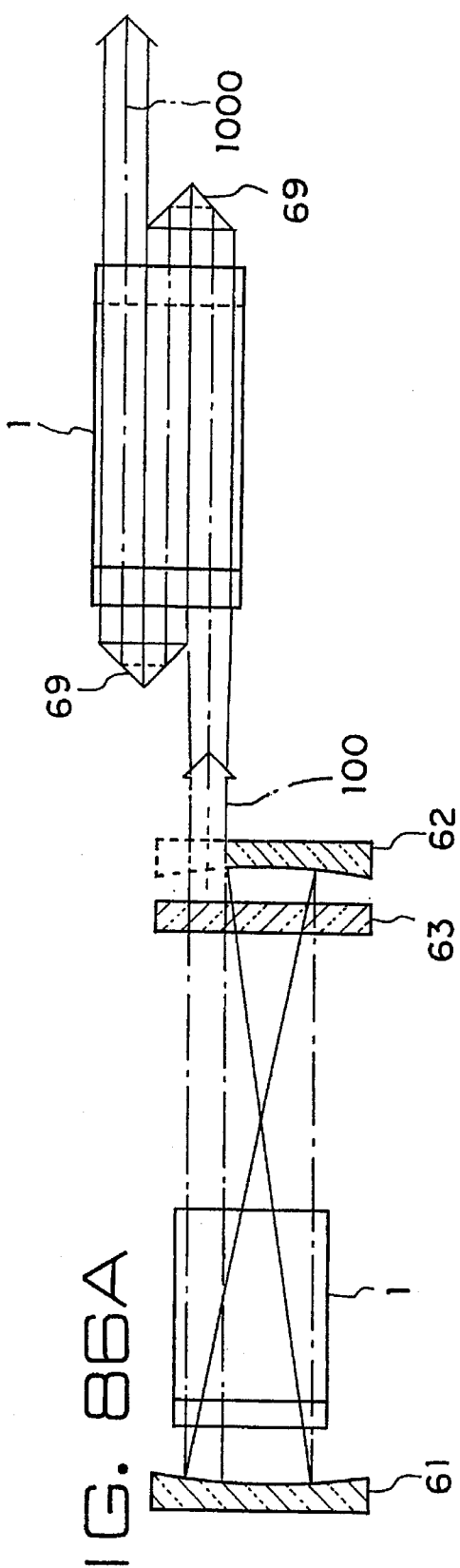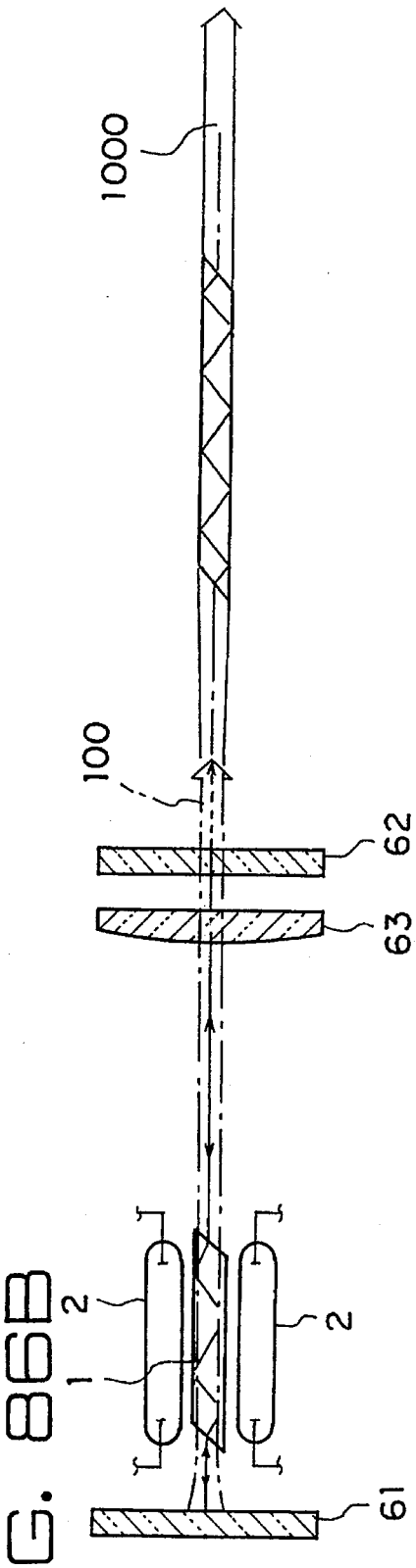

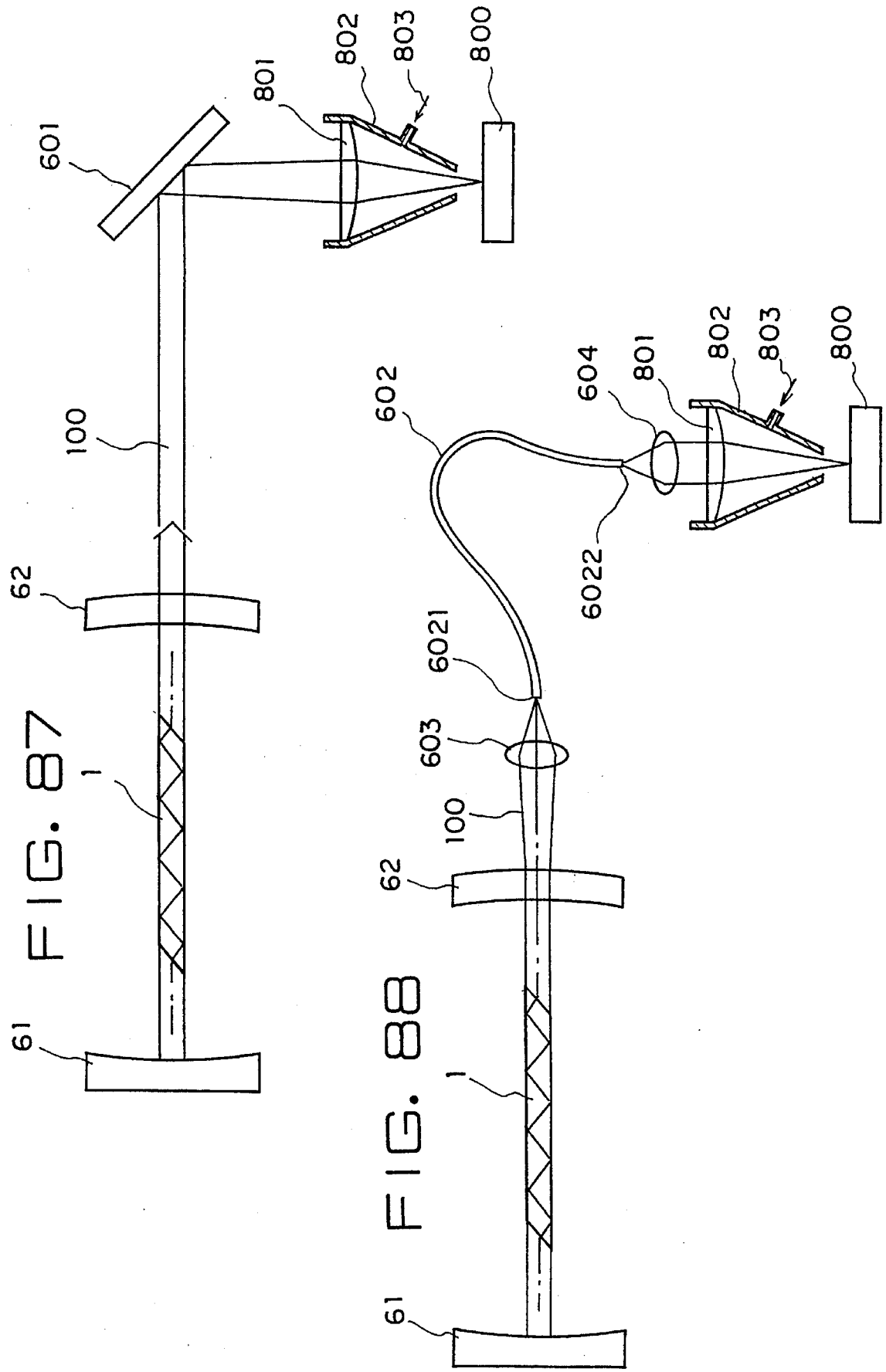

SOLID STATE LASER APPARATUS AND LASER MACHINING APPARATUS

BACKGROUND OF THE INVENTION

1. Field of the Invention

The present invention relates to enhancement of beam quality, oscillation efficiency, and reliability of a slab solid state laser apparatus, and to enhancement of a performance of a laser machining apparatus by using the slab solid state laser apparatus.

2. Description of the Prior Art

FIGS. 89 and 90 show a solid state laser apparatus including an exciting system and a cooling system for a conventional laser medium disclosed in, for example, Japanese Patent Application No. 64-84680 in addition to a conventional solid state laser apparatus disclosed in, for example, Japanese Patent Application Laid-Open No. 63-188980.

In FIGS. 89 and 90, reference numeral 1 means a slab solid state laser medium (hereinafter referred to as slab) including a pair of opposing smooth surfaces 11, a pair of side surfaces 12, and a pair of end surfaces 13 serving as an entrance surface and an exit surface for a laser beam. The slab is made of, for example, Nd:YAG (Yttrium Aluminum Garnet) obtained by doping Nd. Reference numeral 5 means a supporter disposed on the slab side surface 12, 2 means a lamp to perform light excitation of the slab 1, and 21 is the excitation light.

Reference numeral 7 means a frame integrally containing the slab 1 and the supporter 5, and an opening portion 711 is provided in the frame 7 to extend over substantially an entire surface of the smooth surface 11 of the slab as shown in FIG. 91. Reference numeral 70 means a sealant to seal water 41 serving as a coolant for the slab, and the sealant 70 extends over an entirely peripheral length of a plane formed by the slab surface (the smooth surface) 11 and the supporters 5 disposed on the side surface as shown in FIG. 92. Reference numeral 3 means a condenser to condense the excitation light for irradiation of the slab 1, and 81 and 82 are housings containing the condensers 3. Reference numeral 40 means a partition plate to form a flow path 4 of the slab cooling water 41, and the partition plate 40 is transparent with respect to the excitation light.

A description will now be given of the operation.

The slab 1 absorbs the excitation light 21 emitted from the lamp 2 to form inverted population. Energy of the inverted population is derived externally to the medium as a laser beam 100 which is propagated between the pair of opposing smooth surfaces 11 of the slab in a zigzag fashion while repeating internally total reflection. However, 50% or more excitation light energy absorbed by the slab becomes thermal energy in the slab, and finally flows out of the slab into the coolant 41 which is filled to contact the opposing smooth surfaces 11 of the slab. At this time, as shown in FIG. 93, there are generated the square temperature distribution having a hot center portion, and the square refractive index distribution along with the square temperature distribution in a thickness direction of the slab. The laser beam 100 in the slab, however, follows a zigzag optical path so that an effect of the square refractive index distribution can be canceled, and no laser beam is distorted. The coolant 41 is sealed by the sealants 70 on the opposing smooth surfaces 11 of the slab and the supporters 5 disposed on the side surfaces so as not to be externally leaked. The sealant 70 also serves as a supporter of the slab 1 to the frame 7.

In an ideal condition of slab laser, a laser medium can be uniformly excited in a width direction, and heat can also be uniformly generated in the width direction. Further, the slab can uniformly be cooled from only the slab surfaces (the opposing smooth surfaces) 11, one-dimensional square temperature distribution can be established in the thickness direction, and a uniform temperature distribution can be established in the width direction. For purpose of the ideal condition, the condenser 3 is employed such that the slab 1 can be irradiated with the most uniform and the most efficient excitation light 21 possible. For cooling, the coolant 41 uniformly flows on the slab surface 11, and the supporters 5 are adhered on the side surfaces 12 and are made of glass (having thermal conductivity K of 0.012 W/cm$^2$deg), fluorocarbon resin (having thermal conductivity K of 0.0025 W/cm$^2$deg), or silicon rubber (having thermal conductivity K of 0.0015 W/cm$^2$deg) which has a higher heat insulation property than that of the laser medium (i.e., YAG having thermal conductivity K of 0.12 W/cm$^2$deg).

A conventional laser oscillator is constructed as set forth above. There are problems in that heat insulating materials 5 on the slab side surfaces 12 and adhesives absorb the excitation light to generate heat, and generate a temperature distribution having hot side surfaces in a width direction and a concave lens-like optical distortion along with the hot temperature distribution on the side surface as shown in FIG. 94, resulting in degradation of beam quality and laser output. Further, there is another problem in that the beam quality varies according to an output level since the optical distortion depends upon excitation intensity.

In case reflectance of the supporter 5 with respect to the excitation light 21 is low, the excitation light 21 passes from the slab side surfaces 12 to the supporters 5 as shown in FIG. 95. Hence, there are other drawbacks in that a sufficient oscillation effect can not be provided, and uniform excitation can not be achieved due to degraded excitation intensity in the vicinity of the side surface.

When the slab 1 and the supporters 5 disposed on side surfaces thereof are contained in the frame 7, pressure caused by O-rings 70 in upper and lower surfaces apply force in a direction 510 to separate the slab 1 from the supporters 5 as shown in FIGS. 96, 97. Consequently, the coolant 41 can not be sufficiently sealed due to reduced adhesive properties between the slab side surfaces 12 and the supporters 5 so that water leakage occurs on the slab end surface 13. Thus, there are serious problems in that a beam may be cut away, and contamination may occur on the beam entrance/exit end surface 13 which is optically polished.

Further, in case the slab is strongly excited, mechanical deformation is generated in the vicinity of the slab side surfaces and in the vicinity of the entrance/exit end as shown in FIGS. 98, 99. As a result, there are problems in that the water leakage may occur due to reduced water-tightness between the slab side surfaces 12 and the supporters 5, the optical distortion may occur due to stress concentration 125 since the supporters 5 can contact the slab 1 with a pin point contact, and the slab 1 may be damaged if the worst happens.

Alternatively, substances having high reflectance may be employed as the supporter 5 in order to provide more enhanced oscillation efficiency. Most substances of this kind, however, have extremely poor adhesive properties, and it is typically difficult to provide compatibility of the heat insulating properties with the water-tightness for the slab side surface 12 even if the substances are used.

SUMMARY OF THE INVENTION

The present invention is made to overcome the above problems, and it is an object of the present invention to provide a compact solid state laser apparatus at a lower cost, having higher efficiency, excellent beam quality and output stability, and higher reliability, and to provide a laser machining apparatus using the solid state laser apparatus.

According to the first aspect of the present invention, for achieving the above-mentioned objects, there is provided a solid state laser apparatus in which a so-called slab laser medium is employed, a pair of supporters are disposed on the right and left sides of the laser medium, and an irregular pattern is provided in the supporter at an inner surface opposed to a side surface of the laser medium or at a back surface.

As stated above, in the solid state laser apparatus according to the first aspect of the present invention, the irregular construction is provided in the supporter at the surface opposed to the laser medium or at the back surface, and a concave portion contains substances such as coolant (for example, water) having low absorbance, low heat generation and a sufficient cooling effect. It is thereby possible to optimize a thermal boundary condition of a slab side surface, and prevent temperature distributions from occurring in a slab width direction and in a longitudinal direction and optical distortion from occurring along with the temperature distribution.

According to the second aspect of the present invention, there is provided a solid state laser apparatus in which a so-called slab laser medium is employed, a pair of supporters are disposed on the right and left sides of the laser medium, and the supporters are made of a plurality of different materials.

As stated above, in the solid state laser apparatus according to the second aspect of the present invention, the supporter is made of a composite material containing the plurality of different materials. It is thereby possible to optimize a thermal boundary condition between a slab side surface and the supporter, and prevent temperature distributions from occurring in a slab width direction and in a longitudinal direction and optical distortion from occurring along with the temperature distribution.

According to the third aspect of the present invention, there is provided a solid state laser apparatus in which a so-called slab laser medium is employed, a pair of supporters are disposed on the right and left sides of the laser medium, and the supporter is contacted with a side surface of the laser medium with pressure.

As stated above, in the solid state laser apparatus according to the third aspect of the present invention, the supporter is disposed on the side surface of the laser medium, and is contacted with a slab side surface with pressure. This construction enhances water-tightness between the slab side surface and the supporter and stabilizes a thermal boundary condition of the slab side surface so as to stabilize an optical characteristic of a slab medium.

According to the fourth aspect of the present invention, there is provided the solid state laser apparatus according to the first aspect or the second aspect of the invention in which the supporter is contacted with a side surface of the laser medium with pressure.

As stated above, in the solid state laser apparatus according to the fourth aspect of the present invention, the supporter is contacted with the side surface of the laser medium with pressure. It is thereby possible to further stabilize an effect obtained by providing an irregular construction for a supporter inner surface or forming the supporter by a plurality of materials, that is, an effect to optimize a thermal boundary condition between a laser medium side surface and the supporter, and improve water-tightness.

According to the fifth aspect of the present invention, there is provided a solid state laser apparatus in which a so-called slab laser medium is employed, a pair of supporters are disposed on the right and left sides of the laser medium. In the solid state laser apparatus, a recess is provided in the supporter at an excitation area corresponding position opposed to the laser medium, and a member having high reflectance to excitation light is disposed in the recess.

As stated above, in the solid state laser apparatus according to the fifth aspect of the present invention, the recess is provided in the supporter at the excitation area corresponding position opposed to the laser medium, and the member having high reflectance to the excitation light is disposed in the recess. This construction can reduce loss of the excitation light on a slab side surface, eliminate the need for inclusion such as adhesive in joint between the high reflectance body and the slab side surface so as to reduce heat generation on an interface and reduce optical distortion generated along with the heat generation, and can maintain high water-tightness.

According to the sixth aspect of the present invention, there is provided a solid state laser apparatus according to any one of the first aspect, the second aspect, the third aspect, and the fourth aspect of the invention in which a recess is provided in the supporter at an excitation area corresponding position opposed to the laser medium, and a member having high reflectance to excitation light is disposed in the recess.

As stated above, in the solid state laser apparatus according to the sixth aspect of the present invention, it is possible to combine some of a configuration to, for example, provide the irregular construction for the supporter inner surface, a configuration to contact the supporter with the laser medium with pressure, and a configuration to dispose the high reflectance body in the recess of the supporter so as to concurrently achieve a high optical characteristic and improved water-tightness as a synergistic effect of the combination. In particular, the configuration to dispose the high reflectance body in the recess of the supporter can be combined with the configuration to contact the supporter with the laser medium with pressure, resulting in a synergistic effect to provide high efficiency while maintaining high water-tightness. In case the high reflectance body is disposed in the recess of the supporter, the high reflectance body is preferably contacted with the laser medium with pressure. However, in this case, pressing force to the high reflectance body reacts in a direction to separate the supporter from the laser medium. Therefore, it is necessary to press the supporter onto the laser medium against the reaction in order to maintain the high water-tightness.

According to the seventh aspect of the present invention, there is provided a solid state laser apparatus according to any one of the first aspect, the fourth aspect, and the sixth aspect of the invention in which a groove is provided in an inner surface of the supporter to extend in a thickness direction of the laser medium so as to form the irregular pattern.

As stated above, in the solid state laser apparatus according to the seventh aspect of the present invention, the groove extends in a direction parallel to a slab thickness direction, and a concave portion of the groove contains substances such as coolant (for example, water) having low absorbance, low heat generation and a sufficient cooling effect. It is thereby possible to optimize a thermal boundary condition of a slab side surface, and prevent temperature distributions from occurring in a slab width direction and in a longitudinal direction and prevent optical distortion from occurring along with the temperature distribution.

According to the eighth aspect of the present invention, there is provided a solid state laser apparatus according to any one of the first aspect, the fourth aspect, the sixth aspect, and the seventh aspect of the invention in which a distribution in a longitudinal direction or in a vertical direction of the laser medium is provided for a pitch, an area, or a depth of the irregular pattern.

As stated above, in the solid state laser apparatus according to the eighth aspect of the present invention, the distributions in the slab thickness direction and the longitudinal direction are provided for all or any one of the area, the pitch, and the depth of the concave portion of the supporter. The distributions provide the optimal thermal boundary condition at any positions of a slab side surface in the thickness and the longitudinal directions. It is thereby possible to prevent temperature distributions from occurring in a slab width direction and in a longitudinal direction and prevent optical distortion from occurring along with the temperature distribution.

According to the ninth aspect of the present invention, there is provided a solid state laser apparatus according to any one of the first aspect, the fourth aspect, and the sixth to eighth aspects of the invention in which the laser medium is cooled by coolant filled to contact each smooth surface, and a pressure difference is provided between the coolants on the upper and lower sides of the laser medium so as to generate a flow of the coolant in a concave portion in the inner surface of the supporter.

As stated above, in the solid state laser apparatus according to the ninth aspect of the present invention, the laser medium is cooled by the coolant filled to contact the surface, and the pressure difference in the coolant generates the flow of the coolant in the concave portion in a slab facing surface of the supporter. It is thereby possible to optimize a cooling condition on a contact interface between a slab side surface and the supporter, and prevent temperature distributions from occurring in a slab width direction and in a longitudinal direction and prevent optical distortion from occurring along with the temperature distribution.

According to the tenth aspect of the present invention, there is provided a solid state laser apparatus according to the ninth aspect of the invention in which an irregular pattern in the inner surface of the supporter is formed by a groove extending diagonally with respect to a thickness direction of the laser medium.

As stated above, in the solid state laser apparatus according to the tenth aspect of the present invention, the groove is provided in the supporter disposed on a side surface of the laser medium at a position opposed to the laser medium to extend diagonally to a slab thickness direction. The groove generates the flow of the coolant in the concave portion. It is thereby possible to optimize a cooling condition on a contact interface between a slab side surface and the supporter, and prevent temperature distributions from occurring in a slab width direction and in a longitudinal direction and prevent optical distortion from occurring along with the temperature distribution.

According to the eleventh aspect of the present invention, there is provided a solid state laser apparatus according to the first to the tenth aspects of the invention in which the supporter is made of material having high reflectance to excitation light.

As stated above, in the solid state laser apparatus according to the eleventh aspect of the present invention, the supporter is made of the material having the high reflectance to the excitation light. It is thereby possible to perform highly efficient excitation, prevent reduction of excitation intensity in the vicinity of a slab side surface, and reduce generation of optical distortion.

According to the twelfth aspect of the present invention, there is provided a solid state laser apparatus according to any one of the third aspect, the fourth aspect, the sixth aspect, the seventh to the eleventh aspects of the invention in which the supporter is contacted with the laser medium with pressure through an elastic body.

As stated above, in the solid state laser apparatus according to the twelfth aspect of the present invention, the supporter is contacted with a slab with pressure through the elastic body so that mechanical deformation of the slab and the supporter can be absorbed, and local stress concentration on a slab side surface can be relaxed so as to reduce stress deformation. In addition, it is possible to enhance adhesive properties between the slab side surface and the supporter so as to further improve water-tightness, and further stabilize a thermal boundary condition of the slab side surface so as to stabilize an optical characteristic of the slab medium.

According to the thirteenth aspect of the present invention, there is provided a solid state laser apparatus according to the twelfth aspect of the invention in which the elastic body includes a material which is transparent to excitation light.

As stated above, in the solid state laser apparatus according to the thirteenth aspect of the present invention, the elastic body includes the material which is transparent to the excitation light. It is thereby possible to reduce heat generation due to absorption of the excitation light, and reduce an increased temperature of a slab side surface and optical distortion generated along with the increased temperature.

According to the fourteenth aspect of the present invention, there is provided a solid state laser apparatus according to the twelfth aspect or the thirteenth aspect of the invention in which the elastic body is adhered to the supporter.

As stated above, in the solid state laser apparatus according to the fourteenth aspect of the present invention, the elastic body is adhered to the supporter. It is thereby possible to facilitate assembly and disassembly of a slab and the supporter, and improve water-tightness.

According to the fifteenth aspect of the present invention, there is provided a solid state laser apparatus according to either the third aspect, the fourth aspect, or the sixth to the fourteenth aspects of the invention in which no inclusion is interposed between an excitation area of the laser medium and a supporter.

As stated above, in the solid state laser apparatus according to the fifteenth aspect of the present invention, an elastic body is disposed only in the vicinity of a seal position for coolant between the slab and the supporter, and no inclusion is interposed between the slab corresponding to an excitation area and the supporter. It is thereby possible to reduce heat generation on an interface between a slab side surface and the supporter, and reduce an increased temperature of the slab side surface and optical distortion generated along with the increased temperature.

According to the sixteenth aspect of the present invention, there is provided a solid state laser apparatus according to the twelfth to the fifteenth aspects of the invention in which a substance having elasticity is filled into a clearance between a chamfer portion of corner portions in the vicinity of a seal position of the laser medium and the elastic body.

As stated above, in the solid state laser apparatus according to the sixteenth aspect of the present invention, the substance having the elasticity is filled into the clearance between the chamfer of the slab corner portions and the elastic body, resulting in improved water-tightness.

According to the seventeenth aspect of the present invention, there is provided a solid state laser apparatus according to either the third aspect, the fourth aspect, or the sixth to the sixteenth aspects of the invention in which a chamfer dimension of corner portions in the vicinity of a seal position of the laser medium is set at 0.3 mm or less.

As stated above, in the solid state laser apparatus according to the seventeenth aspect of the present invention, the chamfer dimension of the slab corner portions in the vicinity of the seal position is set at 0.3 mm or less, resulting in further improved water-tightness.

According to the eighteenth aspect of the present invention, there is provided a solid state laser apparatus according to either the third aspect, the fourth aspect, or the sixth to the seventeenth aspects of the invention in which a screw hole is provided in a frame integrally containing the supporter at a position opposed to the supporter to extend substantially perpendicular to a back surface of the supporter, and a distal end of a screw member fitted into the screw hole pushes the back surface of the supporter to contact the supporter with the laser medium with pressure.

As stated above, in the solid state laser apparatus according to the eighteenth aspect of the present invention, the screw hole is provided in the frame at the position opposed to the supporter to extend substantially perpendicular to the back surface of the supporter, and a distal end of a male screw fitted into the screw hole pushes the back surface of the supporter to contact the supporter with a slab side surface with pressure. It is thereby possible to adjust contact pressure between the supporter and the slab side surface by rotating the screw externally to a slab head, and easily provide the optimal contact pressure having excellent water-tightness and less optical distortion.

According to the nineteenth aspect of the present invention, there is provided a solid state laser apparatus according to the eighteenth aspect of the invention in which an elastic body is interposed between the supporter and the distal end of the screw member.

As stated above, in the solid state laser apparatus according to the nineteenth aspect of the present invention, the elastic body is interposed between the supporter and the distal end of the screw member. It is thereby possible to stabilize contact pressure and facilitate adjustment of the contact pressure. As a result, water-tightness between a slab side surface and the supporter can be further improved, and a thermal boundary condition of the slab side surface can be further stabilized, resulting in stabilization of an optical characteristic of a slab medium.

According to the twentieth aspect of the present invention, there is provided a solid state laser apparatus according to the eighteenth aspect or the nineteenth aspect of the invention in which a plate body is disposed on a back surface of the supporter.

As stated above, in the solid state laser apparatus according to the twentieth aspect of the present invention, the plate body is disposed on the back surface of the supporter. It is thereby possible to relax a contact pressure distribution and reduce optical distortion, and prevent damage to the supporter.

According to the twenty-first aspect of the present invention, there is provided a solid state laser apparatus according to the twentieth aspect of the invention in which an elastic body is interposed between the supporter and a plate body.

As stated above, in the solid state laser apparatus according to the twenty-first aspect of the present invention, the elastic body is interposed between the supporter and the plate body. It is thereby possible to further relax a contact pressure distribution so as to further reduce optical distortion, and stabilize adhesive properties.

According to the twenty-second aspect of the present invention, there is provided a solid state laser apparatus according to the twenty-first aspect of the invention in which the plate body is made of a material having extremely lower elasticity than that of the elastic body.

As stated above, in the solid state laser apparatus according to the twenty-second aspect of the present invention, the slight elasticity is provided for the plate body disposed on a back surface of the supporter. It is thereby possible to control a contact pressure distribution so as to provide the optimal pressure distribution having excellent water-tightness, and less optical distortion.

According to the twenty-third aspect of the present invention, there is provided a solid state laser apparatus according to the fifth aspect or the sixth aspect of the invention in which the high reflectance member contacts a side surface of the laser medium with pressure.

As stated above, in the solid state laser apparatus according to the twenty-third aspect of the present invention, a member having the high reflectance to excitation light is disposed in a recess of the supporter, and is contacted with a slab side surface with pressure. It is thereby possible to enhance adhesive properties, and provide a uniform and stable thermal boundary condition of a slab side surface so as to stabilize an optical characteristic of a slab medium.

According to the twenty-fourth aspect of the present invention, there is provided a solid state laser apparatus according to the twenty-third aspect of the invention in which an elastic body is interposed between a back surface of the high reflectance member and a recess, and elasticity of the elastic body contacts the high reflectance member with a side surface of the laser medium with pressure.

As stated above, in the solid state laser apparatus according to the twenty-fourth aspect of the present invention, the elastic body is provided for the back surface of the member having high reflectance to excitation light, and the elasticity of the elastic body contacts the high reflectance member with the slab side surface with pressure. It is thereby possible to absorb mechanical deformation of the slab, the high reflectance body and the supporter, and relax local stress concentration on the slab side surface so as to reduce stress deformation. Further, it is possible to enhance adhesive properties between the slab side surface and the high reflectance body, and further stabilize a thermal boundary condition of the slab side surface so as to stabilize an optical characteristic of a slab medium.

According to the twenty-fifth aspect of the present invention, there is provided a solid state laser apparatus according to the twenty-third aspect of the invention in which a screw hole is provided in a recess of the supporter to extend substantially perpendicular to a side surface of a laser medium, and a distal end of a screw member fitted into the screw hole contacts the high reflectance member with the side surface of the laser medium with pressure.

As stated above, in the solid state laser apparatus according to the twenty-fifth aspect of the present invention, the screw hole is provided in the supporter at a position opposed to the member having high reflectance to excitation light to extend substantially perpendicular to a back surface of the high reflectance body, and the distal end of the male screw fitted into the screw hole pushes the back surface of the high reflectance body so as to contact the high reflectance member with the slab side surface with pressure. It is thereby possible to adjust contact pressure between the high reflectance body and the slab side surface by rotating the screw externally to a slab head, and easily provide the optimal contact pressure having less optical distortion.

According to the twenty-sixth aspect of the present invention, there is provided a solid state laser apparatus according to the twenty-fifth aspect of the invention in which an elastic body is interposed between the high reflectance member and the distal end of the screw member.

As stated above, in the solid state laser apparatus according to the twenty-sixth aspect of the present invention, the elastic body is interposed between the member having the high reflectance to excitation light and the distal end of the screw member. It is thereby possible to stabilize contact pressure, facilitate adjustment thereof, and improve adhesive properties between a slab side surface and the high reflectance body so as to further stabilize a thermal boundary condition of the slab side surface, resulting in stabilization of an optical characteristic of a slab medium.

According to the twenty-seventh aspect of the present invention, there is provided a solid state laser apparatus according to the twenty-fifth aspect or the twenty-sixth aspect of the invention in which a plate body is disposed on a back surface of the high reflectance member.

As stated above, in the solid state laser apparatus according to the twenty-seventh aspect of the present invention, the plate body is disposed on the back surface of the member having high reflectance to excitation light. It is thereby possible to relax a contact pressure distribution and reduce optical distortion, and prevent damage to the high reflectance body.

According to the twenty-eighth aspect of the present invention, there is provided a solid state laser apparatus according to the twenty-seventh aspect of the invention in which an elastic body is interposed between the high reflectance member and a plate body.

As stated above, in the solid state laser apparatus according to the twenty-eighth aspect of the present invention, the elastic body is interposed between the member having high reflectance to excitation light and the plate body. It is thereby possible to absorb mechanical deformation of the slab, the high reflectance body and the supporter, and further relax a contact pressure distribution so as to further reduce optical distortion. In addition, it is possible to further enhance adhesive properties, and further stabilize a thermal boundary condition of the slab side surface so as to stabilize an optical characteristic of a slab medium.

According to the twenty-ninth aspect of the present invention, there is provided a solid state laser apparatus according to the twenty-eighth aspect of the invention in which the plate body is made of a material having extremely lower elasticity than that of the elastic body.

As stated above, in the solid state laser apparatus according to the twenty-ninth aspect of the present invention, the slight elasticity is provided for the plate body disposed on a back surface of a member having high reflection to excitation light. It is thereby possible to control a contact pressure distribution so as to provide the optimal pressure distribution having less optical distortion.

According to the thirtieth aspect of the present invention, there is provided a solid state laser apparatus according to either the fifth aspect, the sixth aspect, or the twenty-third to the twenty-ninth aspects of the invention in which the high reflection member is integrally formed with a condenser condensing excitation light for irradiation of the laser medium.

As stated above, in the solid state laser apparatus according to the thirtieth aspect of the present invention, the member having the high reflectance to the excitation light is disposed in a recess of a supporter, and the high reflectance member is integrally formed with the condenser. It is thereby possible to reduce the number of component parts, eliminate a gap between the condenser and the supporter, and reduce loss of the excitation light.

According to the thirty-first aspect of the present invention, there is provided a solid state laser apparatus according to the first to the thirtieth aspects of the invention in which a laser beam is extracted by a stable resonator.

As stated above, in the solid state laser apparatus according to the thirty-first aspect of the present invention, the stable resonator can generate a laser beam having less distortion from a laser medium whose optical distortion is reduced.

According to the thirty-second aspect of the present invention, there is provided a solid state laser apparatus according to the first to the thirtieth aspect of the invention in which a laser beam is extracted from an anisotropic resonator serving as a stable resonator in a thickness direction of the laser medium and an unstable resonator in a width direction.

As stated above, in the solid state laser apparatus according to the thirty-second aspect of the present invention, the anisotropic resonator can generate a laser beam having less distortion, and excellent isotropy in a sectional form from the laser medium whose optical distortion is reduced.

According to the thirty-third aspect of the present invention, there is provided a solid state laser apparatus according to the first to the thirtieth aspects of the invention in which a laser beam is extracted by an anisotropic resonator serving as a stable resonator in a thickness direction of the laser medium and a single side negative branch unstable resonator in a width direction.

As stated above, in the solid state laser apparatus according to the thirty-third aspect of the present invention, the anisotropic resonator can generate a laser beam having less distortion, and more excellent isotropy in a sectional form from the laser medium whose optical distortion is reduced.

According to the thirty-fourth aspect of the present invention, there is provided a solid state laser apparatus in which laser beams emitted from different laser apparatus are amplified by the laser medium according to the first to the thirtieth aspects of the invention.

As stated above, in the solid state laser apparatus according to the thirty-fourth aspect of the present invention, the laser medium whose optical distortion is reduced can amplify the laser beam emitted from different solid state laser apparatus without distortion.

According to the thirty-fifth aspect of the present invention, there is provided a solid state laser apparatus according to the first to the thirtieth aspects of the invention in which a laser beam is oscillated or amplified by an optical path folded in a width direction of the laser medium.

As stated above, in the solid state laser apparatus according to the thirty-fifth aspect of the present invention, the optical path folded in the width direction of a slab can provide an equivalent medium section having less distortion and excellent isotropy in a sectional form from the laser medium whose optical distortion is reduced.

According to the thirty-sixth aspect of the present invention, there is provided a laser machining apparatus in which laser machining is performed by condensing a laser beam generated from the solid state laser apparatus according to the first to the thirty-fifth aspects of the invention by a condensing optical system.

As stated above, in the laser machining apparatus according to the thirty-sixth aspect of the present invention, the laser machining is performed by condensing the laser beam generated from the solid state laser apparatus by the condensing optical system. As a result, the laser beam generated from the laser medium whose optical distortion is reduced has less distortion and excellent isotropy in a sectional form, and generates a small spot diameter and a deep depth of focus with excellent stability at a condensing position.

According to the thirty-seventh aspect of the present invention, there is provided a laser machining apparatus in which laser machining is performed by introducing a laser beam generated from the solid state laser apparatus according to the first to the thirty-fifth aspects of the invention through an optical fiber.

As stated above, in the laser machining apparatus according to the thirty-seventh aspect of the present invention, the laser machining is performed by introducing the laser beam generated from the solid state laser apparatus through the optical fiber. Therefore, the laser beam generated from the laser medium whose optical distortion is reduced has less distortion and excellent isotropy in a sectional form, and generates a small spot diameter and a deep depth of focus with excellent stability in condensation to a fiber entrance end surface. As a result, it is possible to perform stable and highly efficient connection of the laser beam to the fiber and maintain high beam quality even after fiber transmission.

The above and further objects and novel features of the invention will more fully appear from the following detailed description when the same is read in connection with the accompanying drawing. It is to be expressly understood, however, that the drawings are for purpose of illustration only and are not intended as a definition of the limits of the invention.

BRIEF DESCRIPTION OF THE DRAWINGS

FIG. 79 is a front sectional view of one embodiment of a laser apparatus according to the thirtieth aspect of the present invention;

FIG. 80 is a front sectional view of another embodiment of the laser apparatus according to the thirtieth aspect of the present invention;

FIG. 82 is a top view and a side view illustrating a resonator of one embodiment of a laser apparatus according to the thirty-second aspect of the present invention;

FIG. 86 is a top view and a side view illustrating the resonator and the amplifier of one embodiment of the laser apparatus according to the thirty-third aspect, the thirty-fourth aspect, and thirty-fifth aspect of the present invention;

FIG. 87 is a side view showing one embodiment of a laser machining apparatus according to the thirty-sixth aspect of the present invention;

FIG. 88 is a side view showing one embodiment of a laser machining apparatus according to the thirty-seventh aspect of the present invention;

DETAILED DESCRIPTION OF THE PREFERRED EMBODIMENTS

Preferred embodiments of the invention will now be described in detail referring to the accompanying drawings.

Embodiment 1

Figure 1:
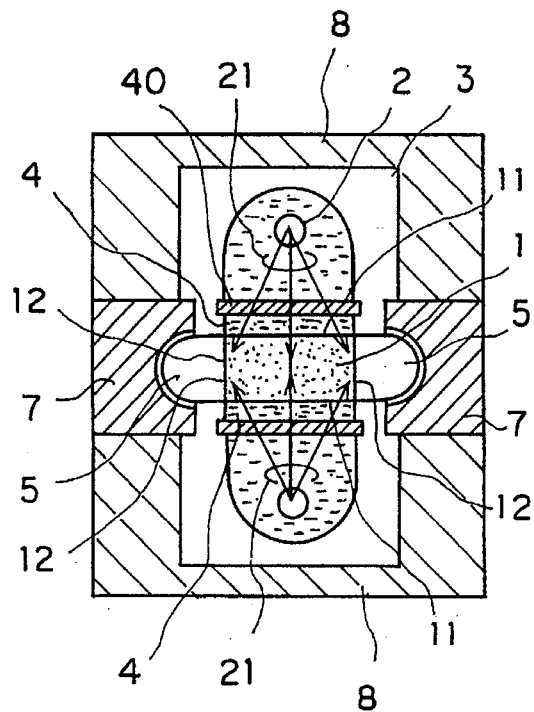
FIG. 1 is a front sectional view showing one embodiment of a laser apparatus according to the first aspect or the seventh aspect of the present invention.
Figure 2:
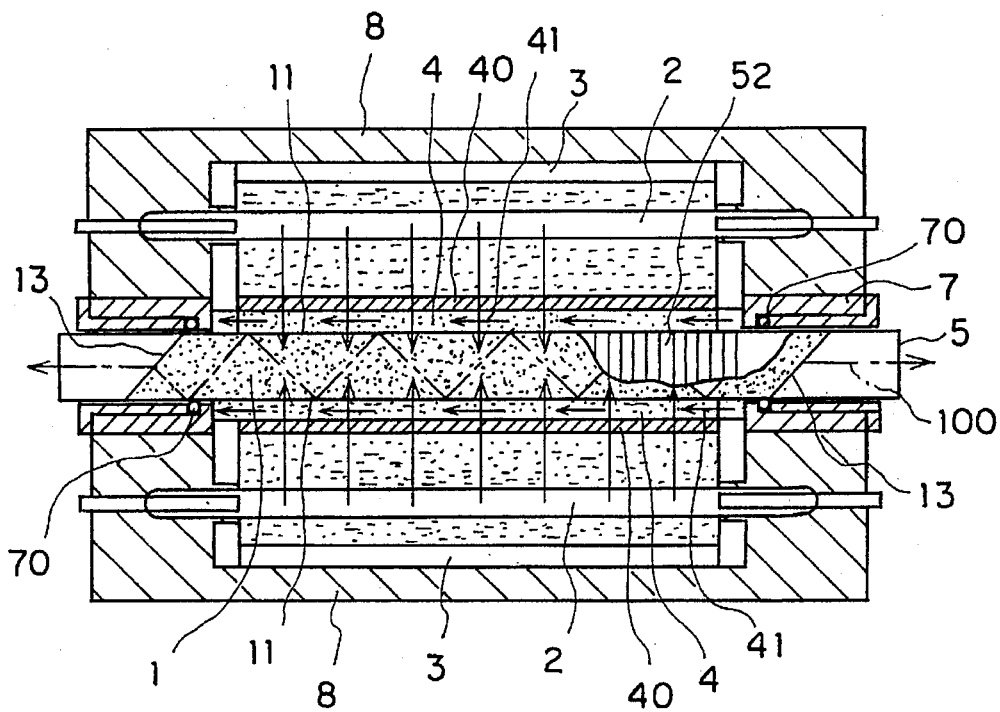
FIG. 2 is a side sectional view showing one embodiment of the laser apparatus according to the first aspect or the seventh aspect of the present invention.
Figure 3:
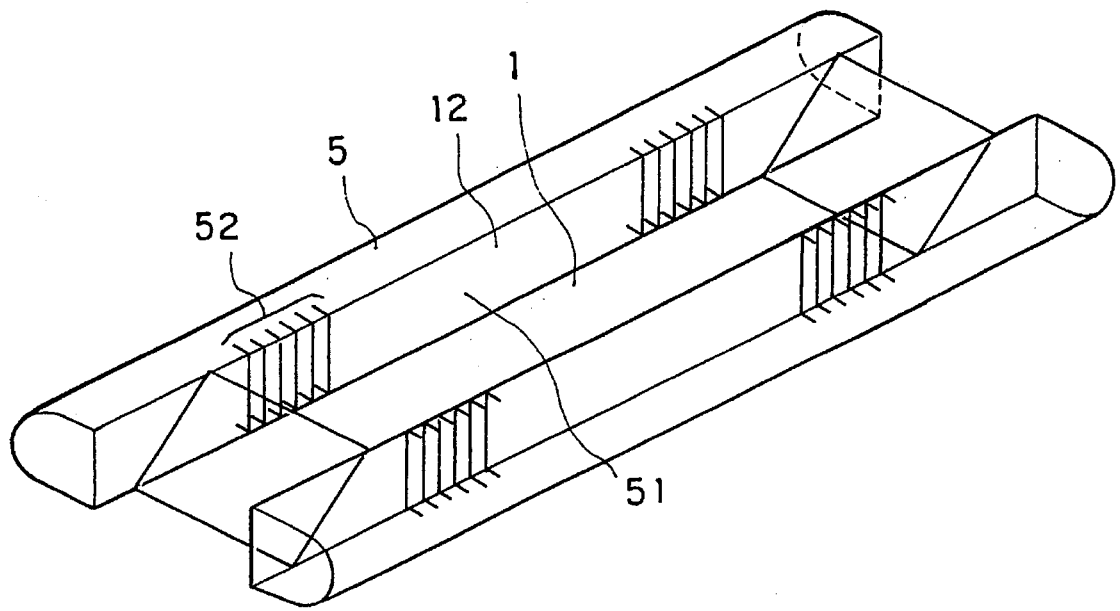
FIG. 3 is a perspective view showing a configuration of a laser medium and supporters in one embodiment of the laser apparatus according to the first aspect or the seventh aspect of the present invention.
Figure 4:
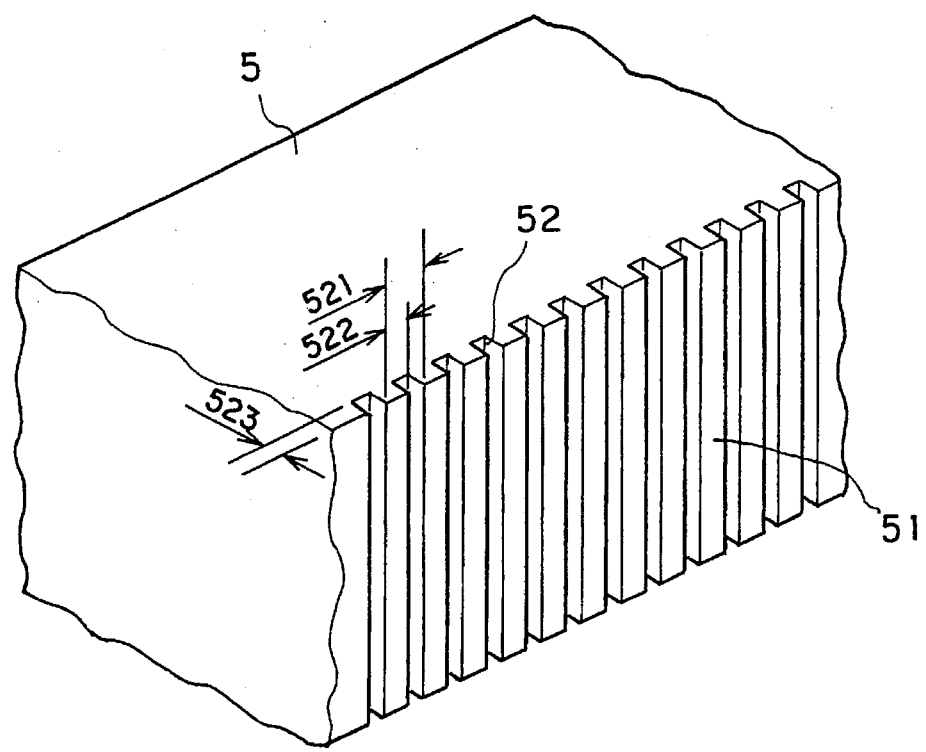
FIG. 4 is an enlarged view showing the configuration of the laser medium and the supporters in one embodiment of the laser apparatus according to the first aspect or the seventh aspect of the present invention.
Figure 5A:
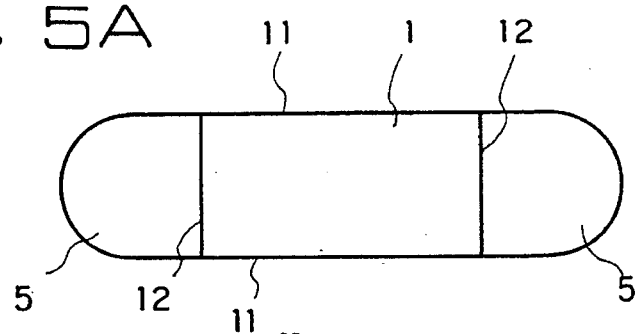
FIG. 5 is a diagram showing an optical distortion distribution in a laser medium width direction of one embodiment of the laser apparatus according to the first aspect of the present invention.
Figure 5B:
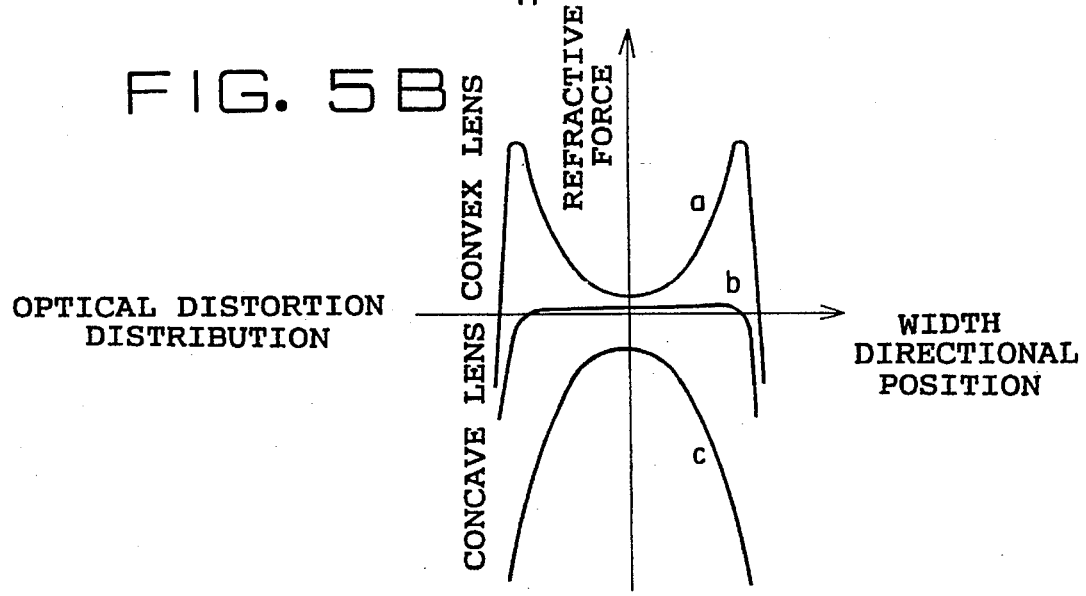

Referring now to FIGS. 1 to 7, a description will be given of one embodiment according to the first aspect and the seventh aspect of the present invention. FIG. 1 is a front sectional view showing the embodiment, FIG. 2 is a side sectional view thereof, FIG. 3 is a perspective view of a laser medium and supporters, and FIG. 4 is a partially enlarged view of FIG. 3.

In FIGS. 1 and 2, reference numeral 1 means a slab solid state laser medium (hereinafter referred to as slab) including a pair of upper and lower smooth surfaces 11 extending parallel to each other, a pair of side surfaces 12 vertically extending on the right and left sides, and a pair of back and forth end surfaces 13 serving as an entrance/exit surface for a laser beam. Reference numeral 5 means a supporter disposed along the side surface 12 of the slab 1. Reference numeral 7 means a frame integrally containing the slab 1 and the supporters 5, and 70 is a sealant to seal water 41 serving as a coolant for the slab. The sealant 70 extends over an entirely peripheral portion of the slab 1 and the respective supporters 5 along a plane perpendicular to a longitudinal direction (i.e., back and forth directions) of the slab 1. Reference numeral 2 means a lamp for light excitation of the slab 1, and 21 is the excitation light. Reference numeral 3 means a condenser to condense the excitation light 21 for irradiation of the slab 1, and 8 is a housing to contain the condensers 3. Reference numeral 40 means a partition plate to form a flow path 4 of the slab cooling water 41, and the partition plate 40 is transparent with respect to the excitation light 21.

In the embodiment, a plurality of vertical grooves 52 are provided in the supporters 5 at inner surfaces 51 opposed to the side surfaces 12 of the slab 1 to extend in a thickness direction (a vertical direction) of the slab at predetermined pitches as shown in FIGS. 3 and 4. Thereby, the inner surface 51 has an irregular construction.

A description will now be given of the operation. A basic operation is identical with the operation of a conventional apparatus, and descriptions thereof are omitted. Thus, a description will now be given of the operation and a detailed embodiment of the supporters 5 having the vertical grooves 52 disposed on the slab side surfaces 12.

Problems in the conventional solid state laser apparatus are an increased temperature due to absorption of the excitation light 21 or heat generation in the supporter 5, and the side surfaces of the slab 1 having a hot temperature distribution in a width direction (i.e., in a lateral direction) along with the increased temperature. In the embodiment, the vertical cooling grooves 52 are provided in the slab facing/contacting surfaces 51 of the supporters 5 in order to overcome the problems. The water 41 serving the coolant for the slab 1 infiltrates into the vertical grooves 52 so that the interfaces 51 of the supporters can be cooled. It is thereby possible to reduce optical distortion by optimizing the temperature distribution in the width direction of the slab 1. In this case, since a substance infiltrating the grooves 52 is water, there is little absorption or heat generation of the excitation light 21, and a cooling effect more increases as a groove width 522 is more extended.

In actuality, for YAG slab having a thickness of 6 mm, a width of 25 mm, and an excitation length of 150 mm, Teflon resin (Spectralon) was employed as the supporter 5 to measure optical distortion (heat lens) in the slab width direction. As a result, in case electrical input for the excitation lamp was 30 kW with no groove, an intensive concave lens distribution was exhibited at side ends as shown by the curve c in FIG. 5. Further, in case the groove width 522 was set at 0.5 mm, and the pitch 521 was set at 1 mm, and a groove depth 523 was set at 0.2 mm, an intensive convex lens distribution was exhibited at side ends as shown by the curve a in FIG. 5. Subsequently, the groove width 521 was varied while the pitch 521 and the depth 523 were left as they were. Consequently, for the groove width of 0.1 mm and the pitch of 1 mm, it was possible to provide a condition having substantially no heat lens as shown by the curve b in FIG. 5.

Figure 6A:
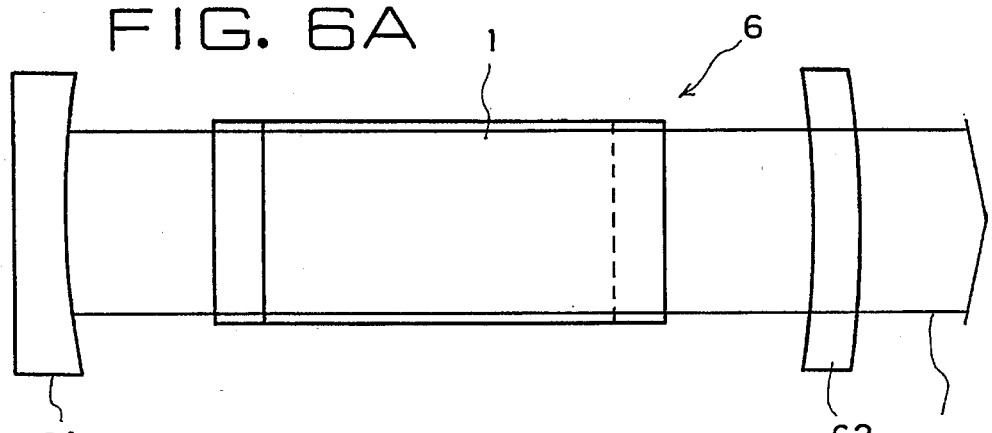
FIG. 6 is a diagram showing a configuration of a resonator of one embodiment of a laser apparatus according to the thirty-first aspect of the present invention.
Figure 6B:
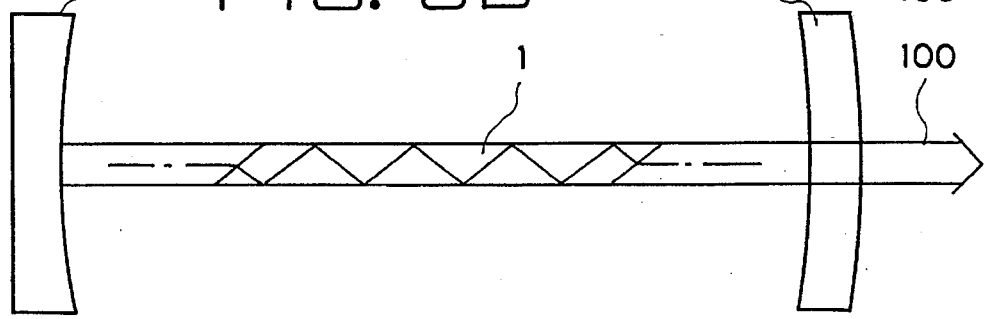
Figure 7:
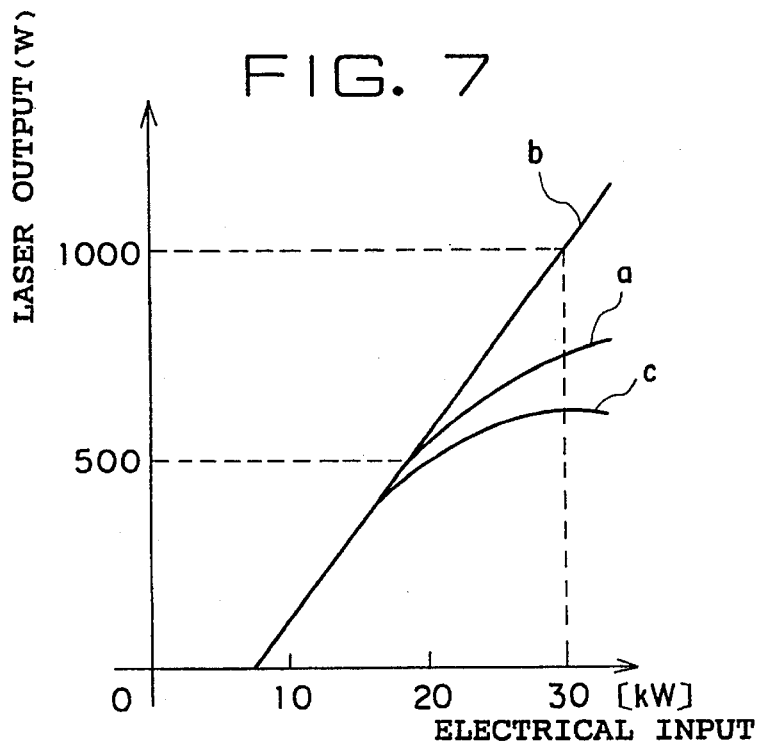
FIG. 7 is a diagram showing an output characteristic of one embodiment of the laser apparatus according to the first aspect or the thirty-first aspect of the present invention.

In addition, oscillation experiments were performed under the respective conditions by using a stable resonator as shown in FIG. 6. FIG. 7 shows output characteristics for the respective conditions. While a laser output substantially proportionally increased to the electrical input of 30 kW under the optimized condition b, large output saturation was observed at the electrical input of 20 kW or later under conditions a and c having the optical distortion.

The embodiment is characterized by thermal boundary conditions of the slab side surface 12 which are optimized by only variation in the width 522 of the groove 52 provided in the supporter 5, an extremely simple construction, and the optimal condition which can invariably be found. Heat lens refracting power under the optimized condition is equal to 0.1 mm$^{-1}$ or less for the electrical input of 30 kW and the laser output of 1 kW or more. Absolute value of the heat lens refracting power is smaller than heat lens refracting power of 2 m$^{-1}$ in a rod YAG, and has smaller electrical input dependency than that of the rod YAG.

Figure 8:
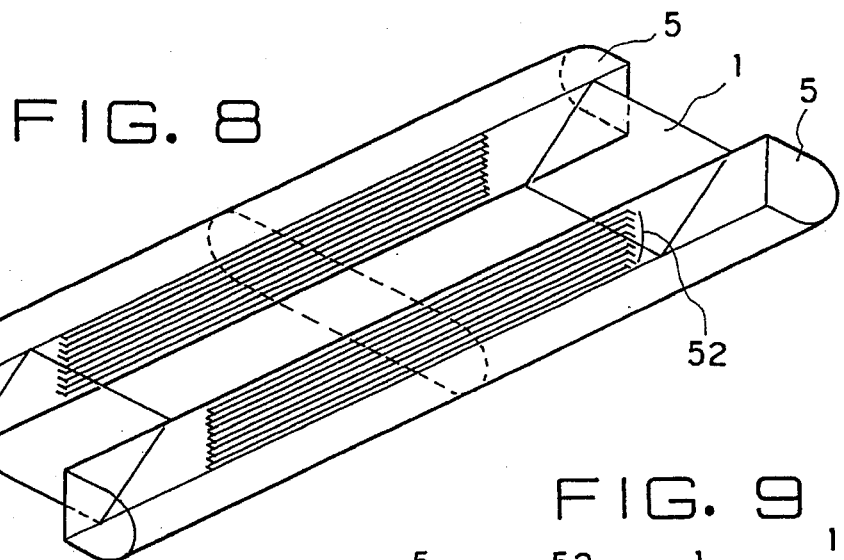
FIG. 8 is a perspective view showing a configuration of supporters of another embodiment of the laser apparatus according to the first aspect of the present invention.
Figure 9:
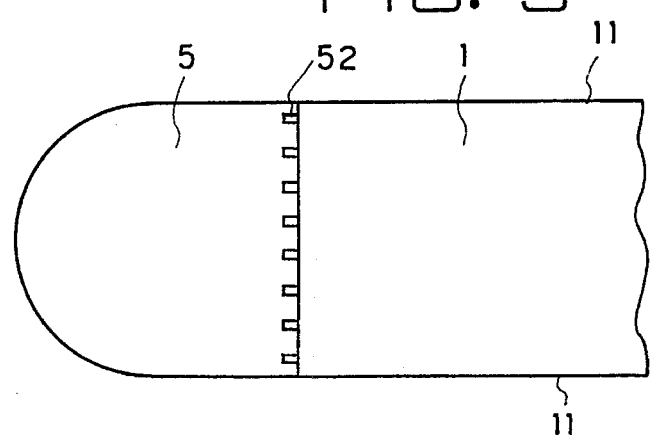
FIG. 9 is an enlarged perspective view showing a configuration of a supporter of another embodiment of the laser apparatus according to the first aspect of the present invention.
Figure 10:
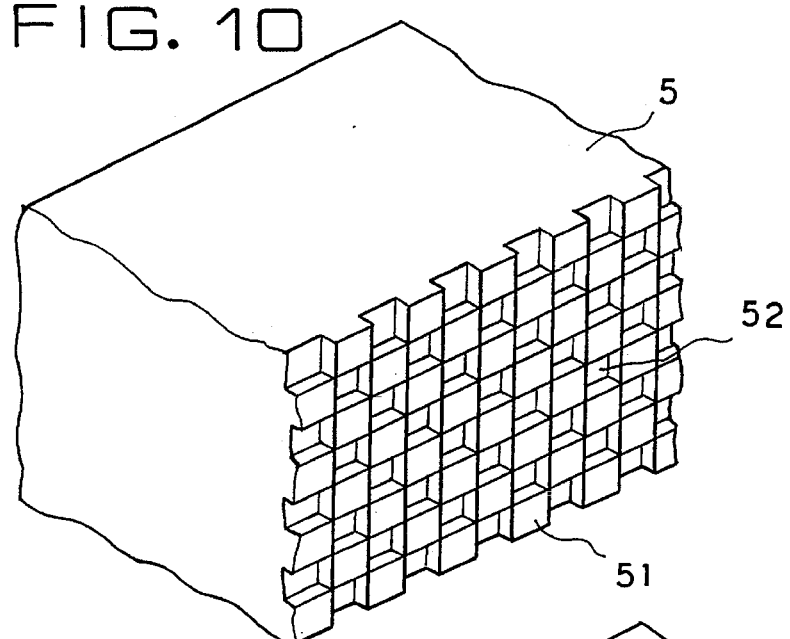
FIG. 10 is an enlarged perspective view showing a configuration of a supporter of another embodiment of the laser apparatus according to the first aspect of the present invention.
Figure 11:
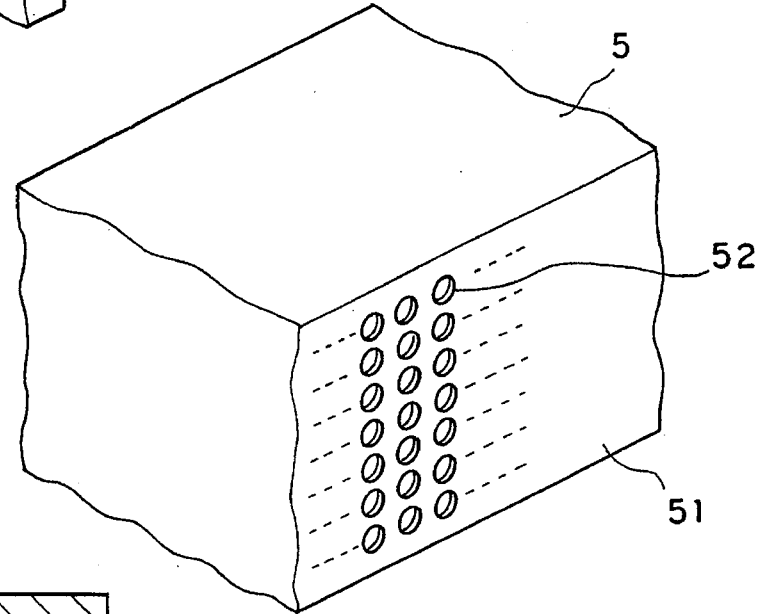
FIG. 11 is an enlarged perspective view showing a configuration of a supporter of another embodiment of the laser apparatus according to the first aspect of the present invention.
Figure 12:
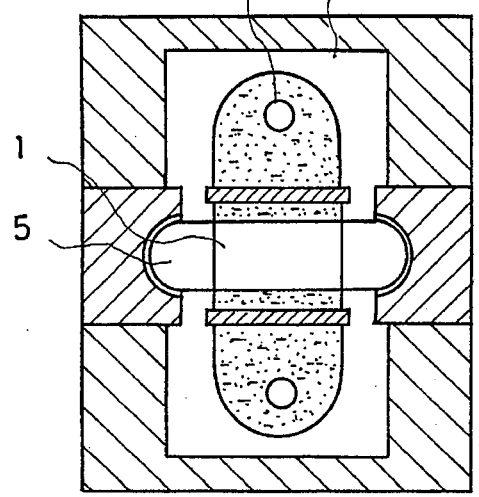
FIG. 12 is a front view taken along a thickness-longitudinal direction of a laser medium, illustrating a temperature distribution of a laser apparatus according to the eighth aspect of the present invention.

The embodiment as shown in FIGS. 1 and 2 has been discussed with reference to a case where, as the coolant infiltrating groove 52, the groove extends parallel to the slab thickness direction. However, the same effect can be provided by grooves extending parallel to the longitudinal direction of the slab as shown in FIGS. 8 and 9, or by finely irregular constructions as shown in FIGS. 10 and 11.

Embodiment 2

Referring now to FIGS. 12 to 15, a description will be given of one embodiment according to the eighth aspect of the present invention.

Figure 13:
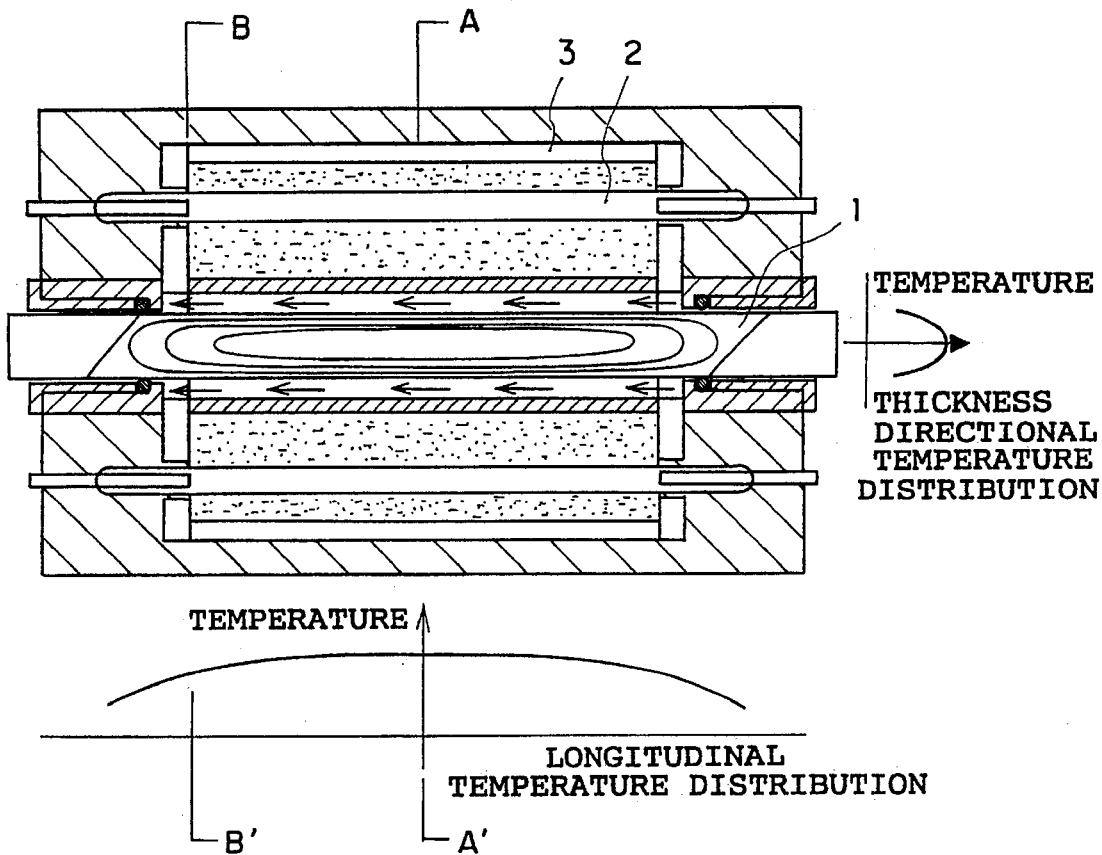
FIG. 13 is a side view according to the eighth aspect of the present invention, illustrating a temperature distribution of the laser apparatus taken along the thickness-longitudinal direction of the laser medium.
Figure 14:
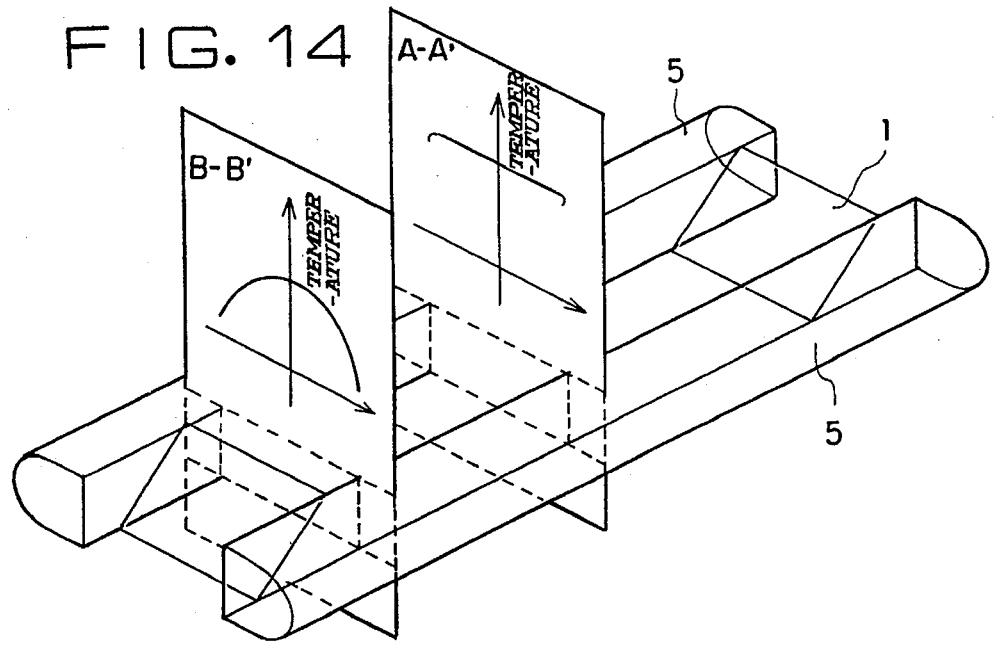
FIG. 14 is a perspective view according to the eighth aspect of the present invention, illustrating a temperature distribution of the laser apparatus in a width direction of the laser medium.
Figure 15:
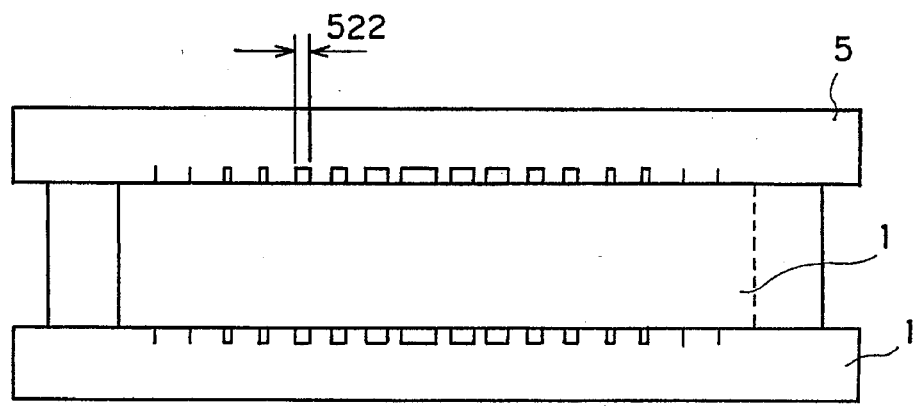
FIG. 15 is a top view showing a configuration of supporters of one embodiment of the laser apparatus according to the eighth aspect of the present invention.

In a slab laser, a rod-like lamp 2 and a rod-like condenser 3 are employed so as to provide the most uniform excitation/heat generation possible in a longitudinal direction as well as a width direction. In actuality, excitation intensity, however, is more reduced at ends of an excitation length than would be in the vicinity of a longitudinal intermediate portion, resulting in a temperature distribution as shown in FIG. 13. The heat generation on slab facing surfaces 51 of supporters 5 is more reduced toward the ends. Accordingly, the ends are too cooled under the same cooling condition as that at the intermediate portion so that the optical distortion in the width direction exhibits a concave lens distribution at the longitudinal ends as shown in FIG. 14. Hence, in the embodiment, groove widths 522 have more thin forms in a direction closer to the longitudinal ends of the slab as shown in FIG. 15 so as to reduce a cooling effect, and minimize the optical distortion even in the vicinity of the ends.

As set forth above, according to the embodiment, it is possible to provide the optimal thermal boundary condition at any desired position in the longitudinal direction the slab side surfaces 12 as well as in the lateral direction of the slab 1 so as to provide more uniform and higher quality laser beam.

Figure 16:
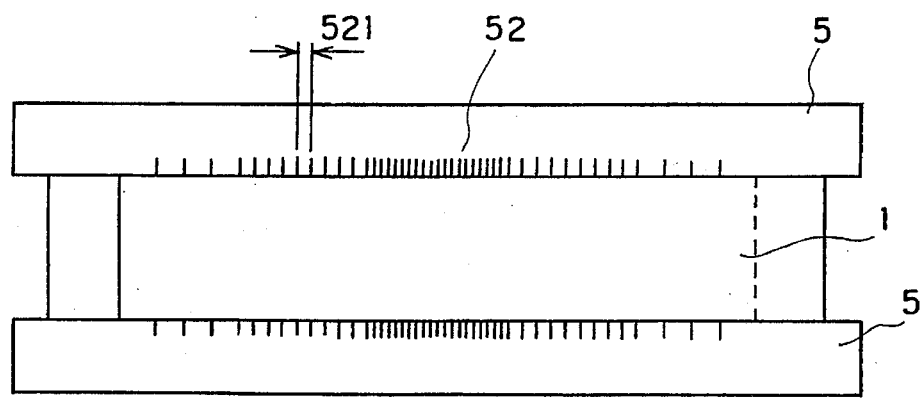
FIG. 16 is a top view showing a configuration of supporters of another embodiment of the laser apparatus according to the eighth aspect of the present invention.
Figure 17:
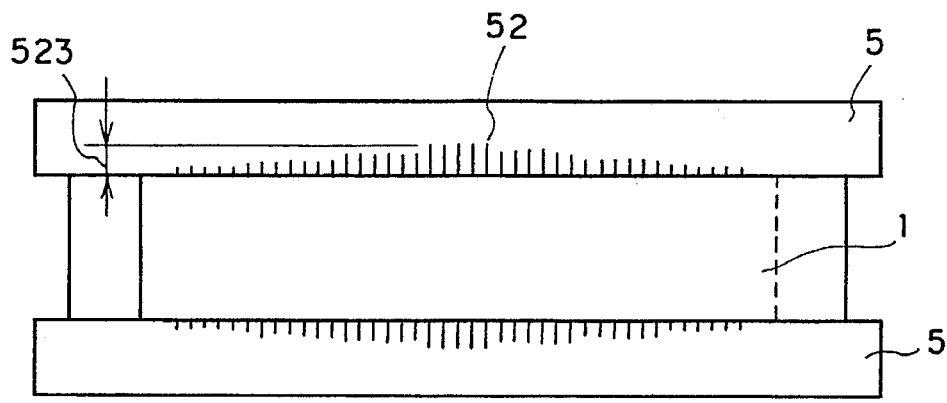
FIG. 17 is a top view showing a configuration of supporters of another embodiment of the laser apparatus according to the eighth aspect of the present invention.

In the embodiment, the cooling condition is varied by reducing only the width 522 while keeping the groove depth 523 and the pitch 521 constant. However, it is also possible to vary the cooling condition by varying the pitch and the groove depth as shown in FIGS. 16 and 17.

Further, the embodiment has been described with reference to a case where there is the intensive excitation intensity at the longitudinally intermediate portion. However, it must be noted that the optical distortion may be minimized by adjusting the pitch, the width, and the depth of the groove at the respective longitudinal positions even if, for example, the intensive excitation intensity is generated at the longitudinal ends.

Embodiment 3

Figure 18:
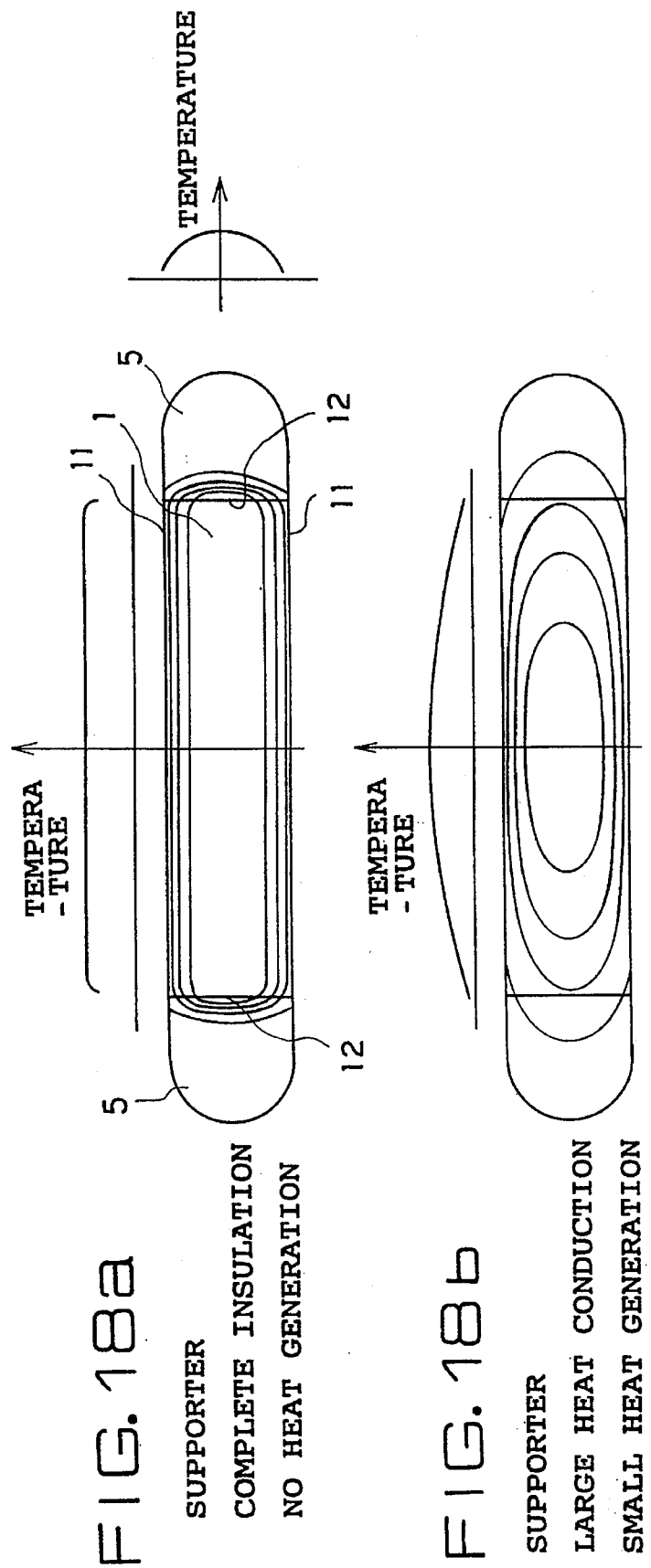
FIG. 18 is a view taken along a thickness-width direction of the laser medium, illustrating a temperature distribution of the laser apparatus according to the eighth aspect of the present invention.
Figure 19:
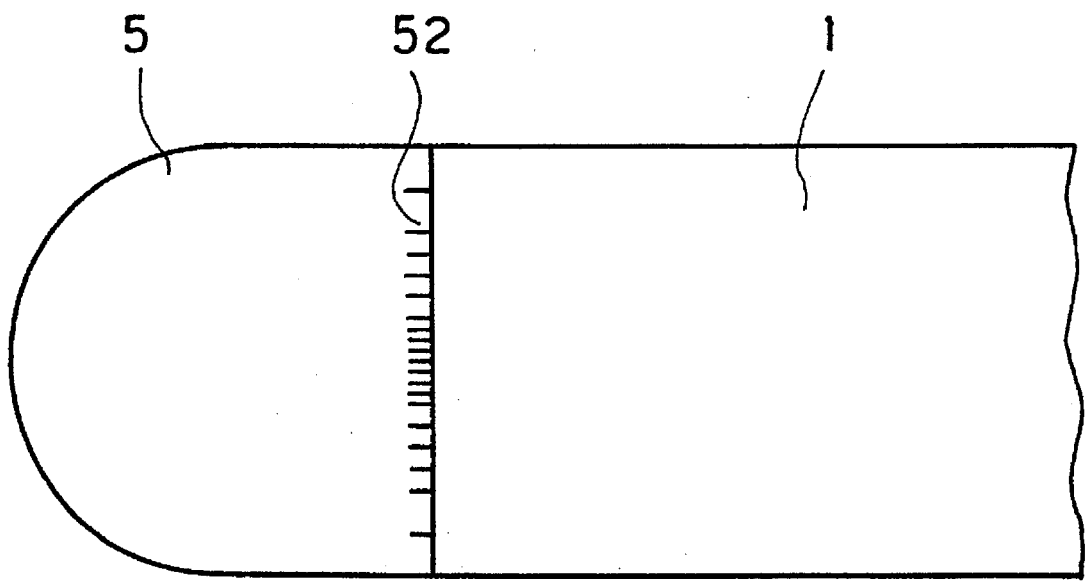
FIG. 19 is a front sectional view showing a configuration of a supporter of another embodiment of the laser apparatus according to the eighth aspect of the present invention.
Figure 20:
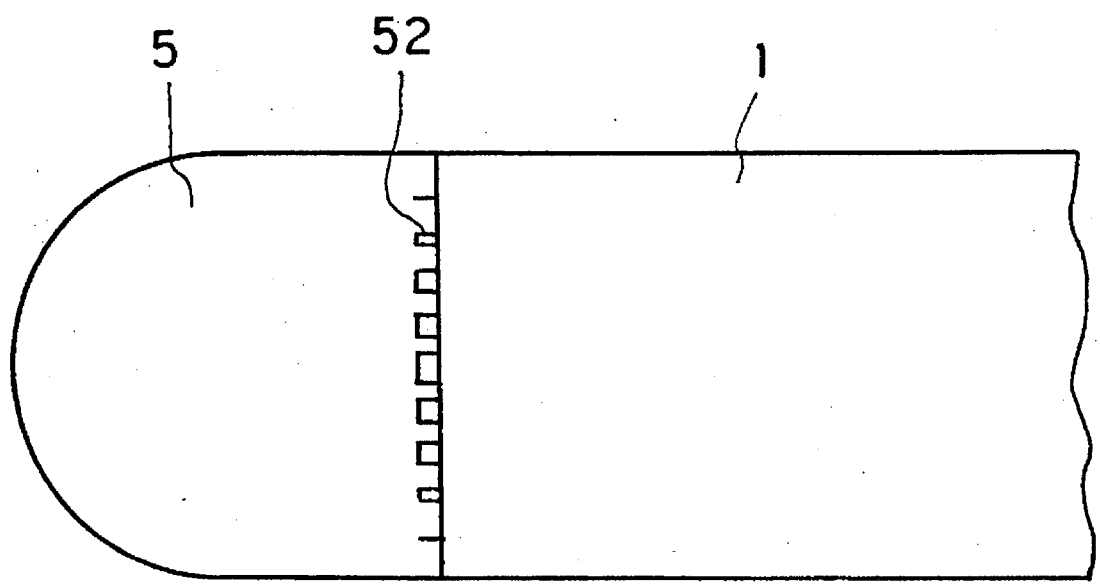
FIG. 20 is a front sectional view showing a configuration of a supporter of another embodiment of the laser apparatus according to the eighth aspect of the present invention.

Referring now to FIGS. 18 to 20, a description will be given of another embodiment according to the eighth aspect of the present invention.

The embodiments 1 and 2 have been described with reference to a constant thermal boundary condition (a cooling condition) of slab side surfaces 12 in a thickness direction. In the embodiment, a distribution is generated in the thermal boundary condition in the thickness direction. A slab 1 is cooled through both ends (smooth surfaces) 11 thereof so that the slab 1 exhibits the square temperature distribution whose center portion in the thickness direction is hot. In case the slab side surfaces 12 are completely insulated to cause no heat generation, the temperature distribution should become uniform in a width direction as shown in FIG. 18(a) (at an upper stage). In actuality, however, temperature distributions as shown in FIGS. 18(b) (at a middle stage) and 18(c) (at a lower stage) are generated due to thermal conduction and heat generation of a supporter.

Hence, in the embodiment, a distribution is provided for a groove configuration in the thickness direction as shown in FIGS. 19 and 20 such that a slab facing surface 51 of the supporter 5 can have the same square temperature distribution in the thickness direction as that under an ideal condition for the slab. It is thereby possible, even in material having the heat generation and the thermal conduction to some extent, to provide the same temperature distribution as that of a completely insulated medium generating no heat. Further, it is possible to enhance quality of a laser beam by optimizing the thermal boundary condition in the slab thickness direction.

Embodiment 4

Figure 21:
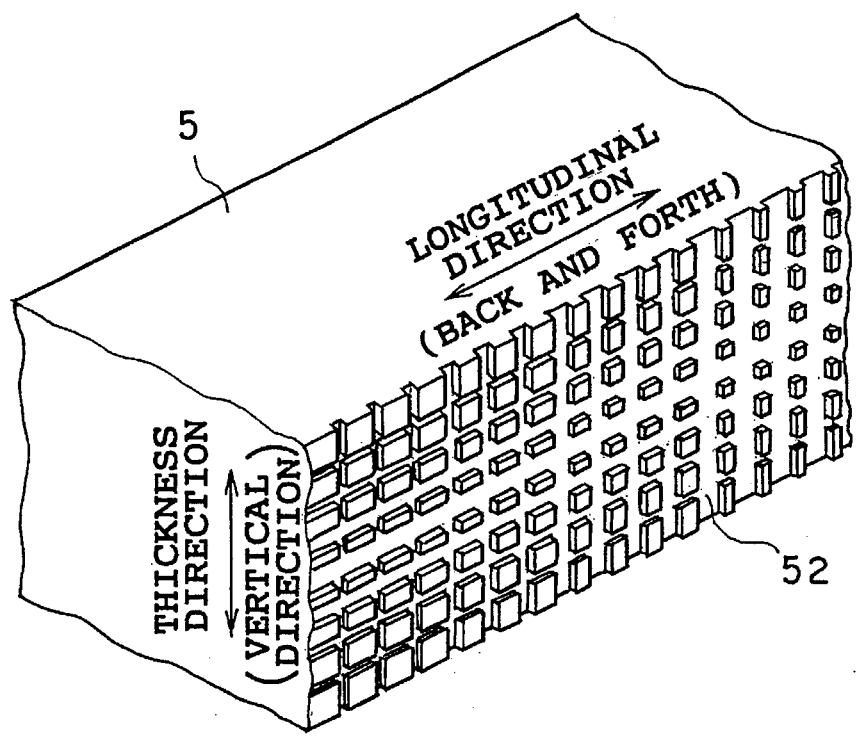
FIG. 21 is a front sectional view showing a configuration of a supporter of another embodiment of the laser apparatus according to the eighth aspect of the present invention.
Figure 22:
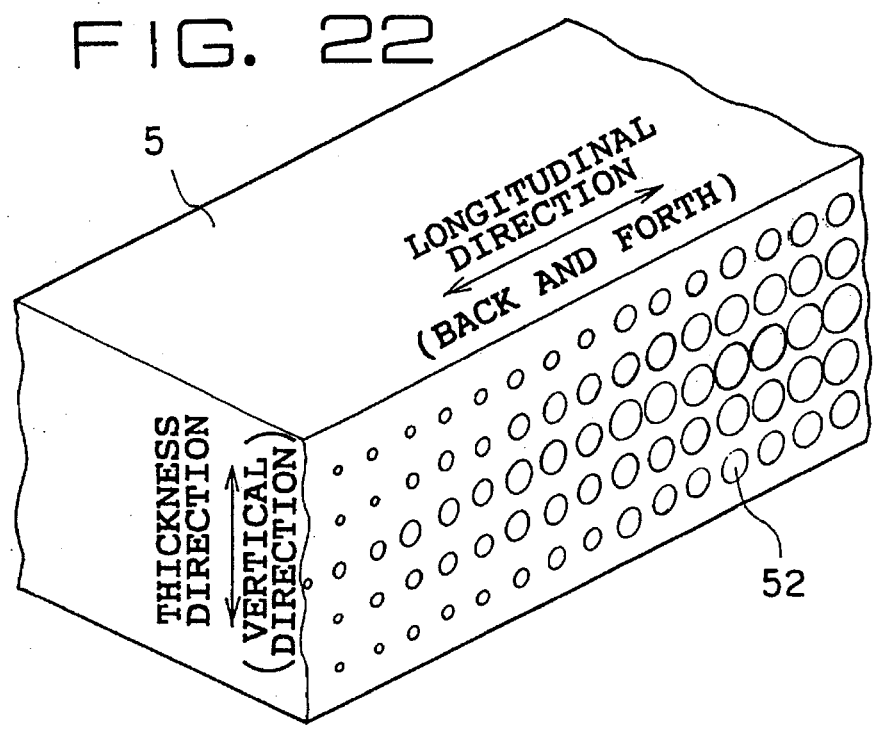
FIG. 22 is a front sectional view showing a configuration of a supporter of another embodiment of the laser apparatus according to the eighth aspect of the present invention.

Referring now to FIGS. 21 and 22, a description will be given of another embodiment according to the eighth aspect of the present invention.

In the embodiment, in order to provide the optimal thermal boundary condition at any desired positions in longitudinal and thickness directions of a slab side surface 12, grooves 52 are provided in a supporter 5 in both the longitudinal and thickness directions as shown in FIG. 21 so as to have distributions in a depth, a width, and a pitch. As a result, there is an effect in that optical distortion can further be reduced.

It is also possible to provide the same effect by providing circular concave portions 52 having different radii in a slab facing surface of the supporter 5 as shown in FIG. 22 with a distribution of the circular concave portions.

Embodiment 5

Figure 23:
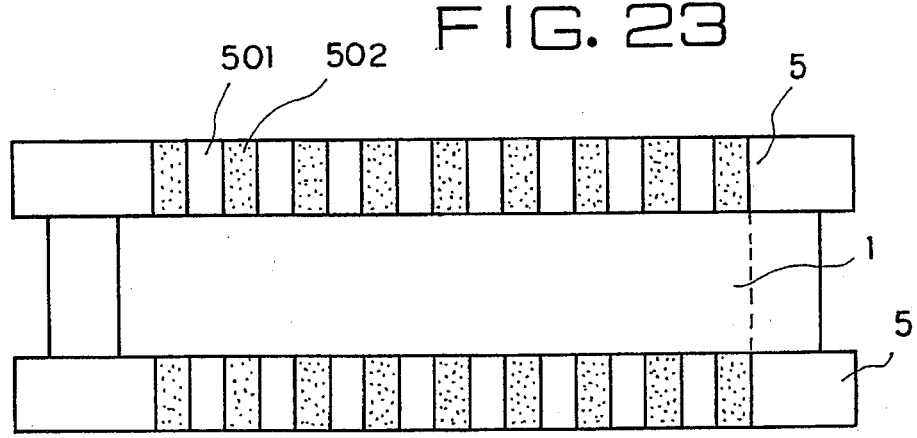
FIG. 23 is a top view showing a configuration of supporters of one embodiment of a laser apparatus according to the second aspect of the present invention.
Figure 24:
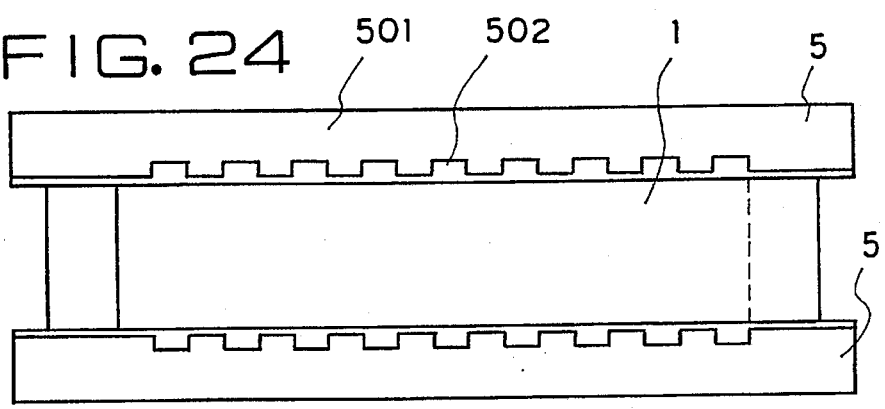
FIG. 24 is a top view showing a configuration of supporters of another embodiment of the laser apparatus according to the second aspect of the present invention.

Referring now to FIGS. 23 and 24, a description will be given of one embodiment according to the second aspect of the present invention.

The embodiment 4 has been described with reference to a case where a thermal boundary condition of a slab side surface 12 is optimized by fine concave portions 52 which is provided in a slab facing surface 51 of a supporter 5. However, as shown in FIG. 23, materials 501 and 502 having different thermal conductivity, absorptivity, and heat rates may be alternately laminated in a slab longitudinal direction to form a composite material. Further, a pitch, a thickness, and the material (i.e., the thermal conductivity, and the absorptivity and the heat rate) of the composite material may be optimized so as to optimize macroscopic thermal conductivity. Thereby, it is also possible to reduce temperature distributions in a width direction and a longitudinal direction of the slab 1, and generation of optical distortion.

For example, Spectralon (resin) and macerite (ceramic) may be employed as the materials 501 and 502 for the composite material. In addition, it must be noted that a laminating direction of the respective materials should not be limited to the longitudinal direction of the slab 1, the composite material may have another construction in which the materials are laminated in a thickness direction of the slab 1, or in both the longitudinal and thickness directions. It is also possible to further optimize the thermal boundary condition by varying, for example, a width, a pitch of the lamination according to an exothermic distribution in the longitudinal direction of the slab 1.

Alternatively, a construction as shown in FIG. 24 may also be carried out in another embodiment according to the second aspect of the present invention. In the construction, grooves are provided in a supporter 501 made of ceramic having relatively rich thermal conductivity, the grooves are filled with a transparent silicon rubber 502, and the silicon rubber 502 is adhered to the slab 1.

Embodiment 6

Figure 25:
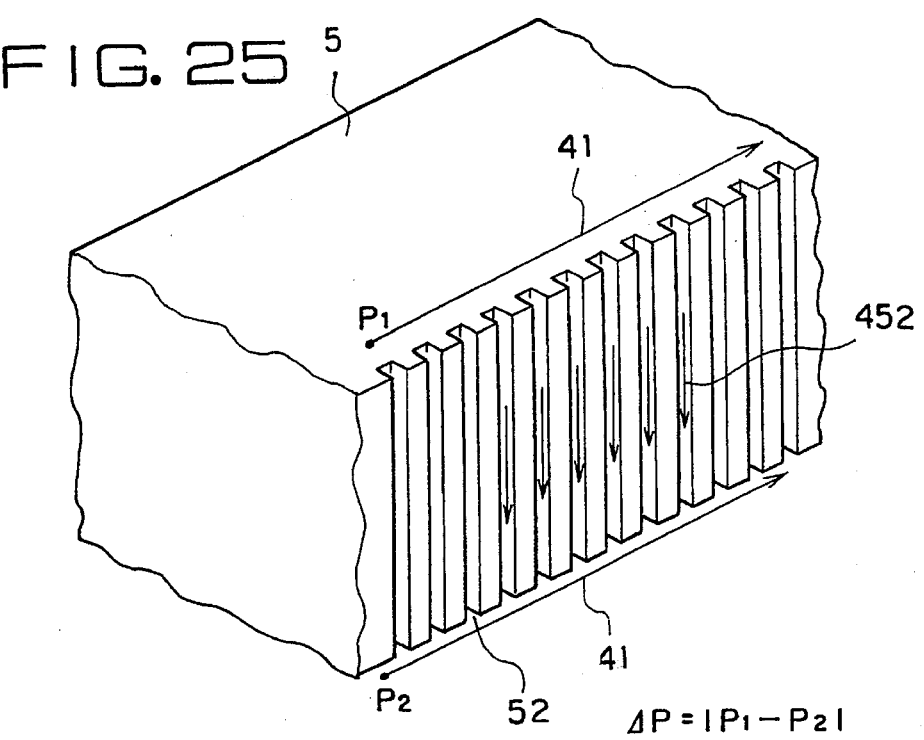
FIG. 25 is a perspective view showing a configuration of a supporter of one embodiment of a laser apparatus according to the ninth aspect of the present invention.
Figure 26:
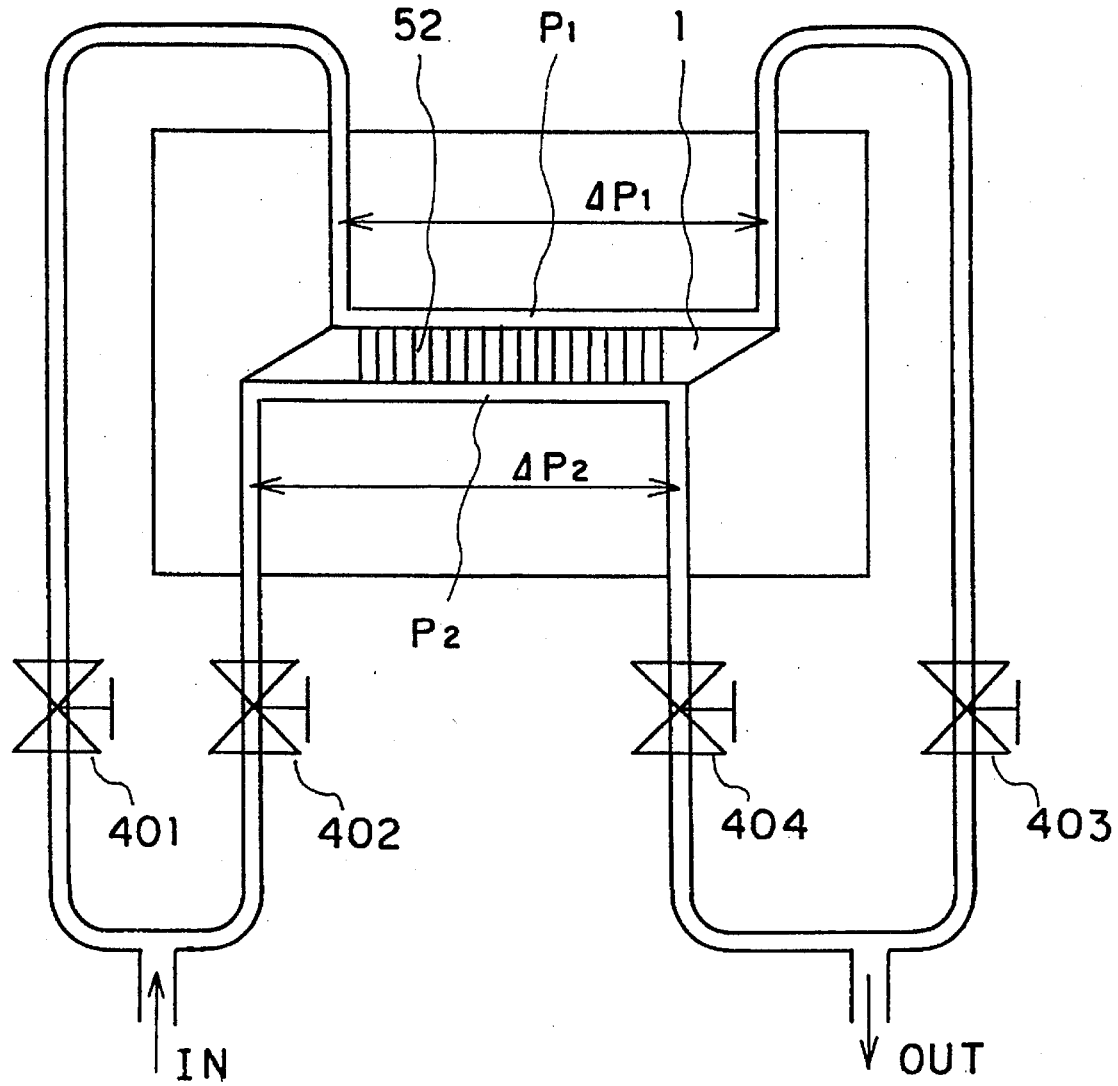
FIG. 26 is a view showing a configuration of cooling means of one embodiment of the laser apparatus according to the ninth aspect of the present invention.

Referring now to FIGS. 25 and 26, a description will be given of one embodiment according to the ninth aspect of the present invention.

In the embodiment 1, water 41 serving as coolant simply infiltrates into vertical grooves 52 in a supporter 5, and a cooling effect can mainly be provided by only thermal conduction inherent in the water. In contrast with this, in the embodiment according to the ninth aspect, a slight difference $\Delta P=|P1-P2|$ is given to water pressure in a cooling water path 4 in both slab surfaces as shown in FIG. 25. This pressure difference generates a flow 452 of the cooling water 41 in the vertical grooves 52 of the supporter so as to enhance a cooling effect of an interface between the supporter 5 and a slab side surface 12.

The invention may include the following method for giving the pressure difference to the cooling water 41 on the slab surface. As shown in FIG. 26, flow controlling valves 401, 402, 403, and 404 are provided at an inlet and an outlet for the water in the respective slab cooling water paths, and these valves are adjusted to give the difference $\Delta P=|P1-P2|$ to the water pressure P1 and P2 on the slab surface. At this time, the adjustment may be made so as to provide the same pressure differences $\Delta P1$ and $\Delta P2$ at the inlet and the outlet of the respective water paths, and generate no difference in a flow rate of the cooling water on both the surfaces of the slab. As a result, both the surface of the slab can have the same cooling ability to cause no problem.

Further, the valves 401, 402, 403, and 404 may be adjusted to vary the water pressure difference $|P1-P2|$ between the slab cooling water paths, and control the flow rate of the cooling water flowing in the vertical grooves 52 in the supporter so as to vary a cooling condition on the slab side surface. As a result, it is possible to control a temperature distribution in a slab width direction, and optical distortion generated along with the temperature distribution.

Embodiment 7

Figure 27:
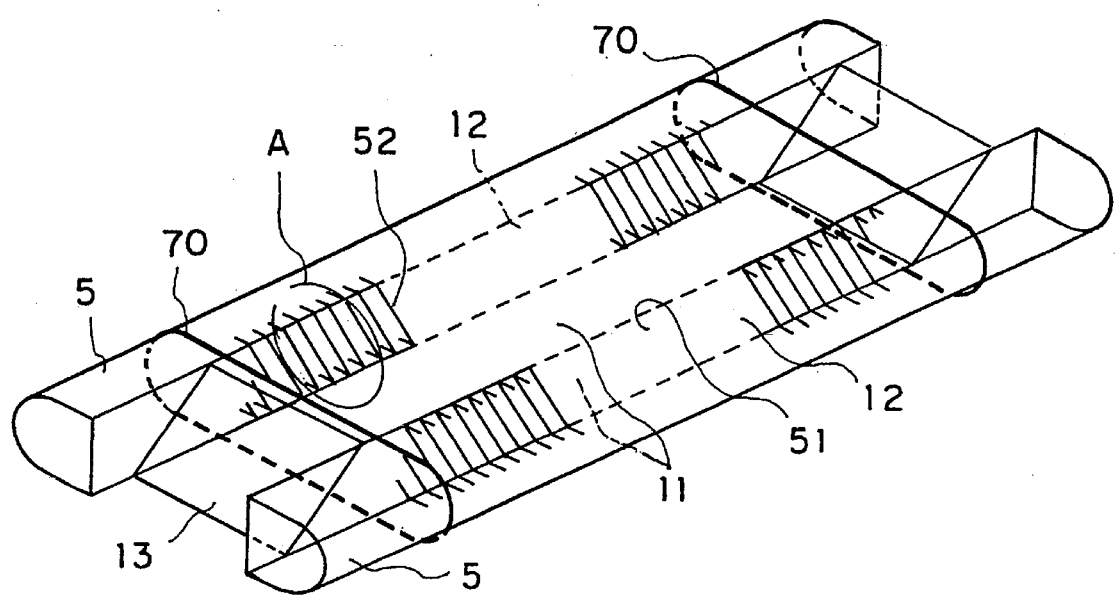
FIG. 27 is a perspective view showing supporters and a laser medium of one embodiment of a laser apparatus according to the tenth aspect of the present invention.
Figure 28:
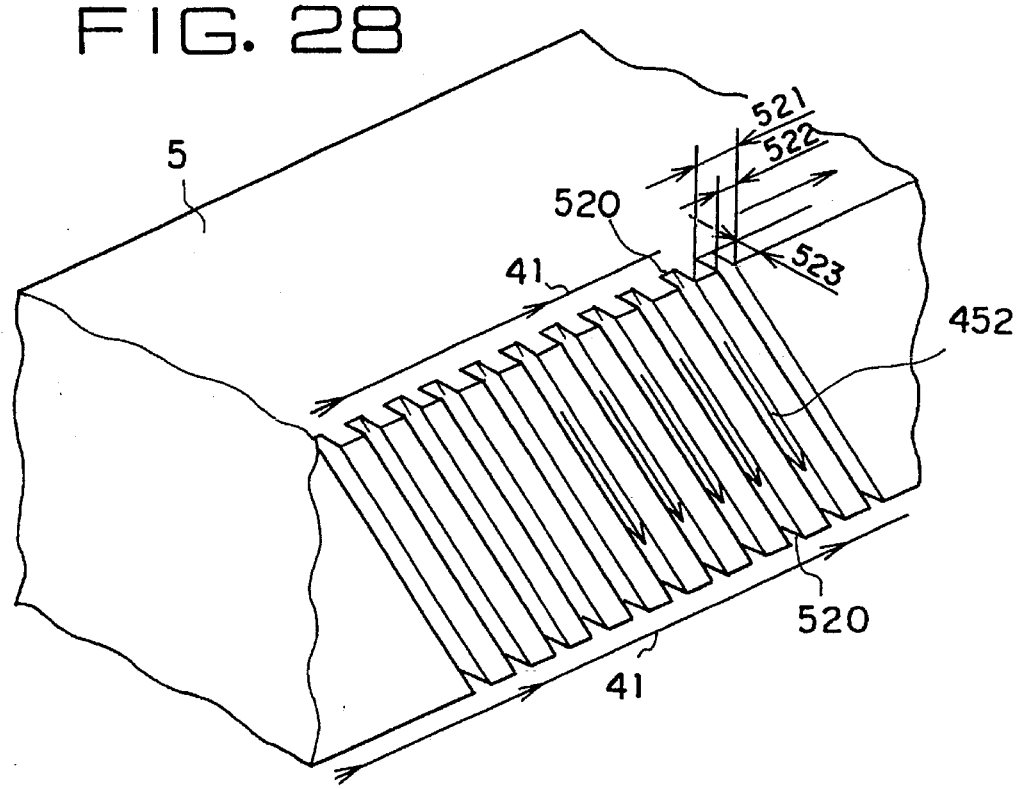
FIG. 28 is an enlarged perspective view showing the supporter of one embodiment of the laser apparatus according to the tenth aspect of the present invention.

Referring now to FIGS. 27 and 28, a description will be given of one embodiment according to the tenth aspect of the present invention.

In the embodiment 6, external valves adjust pressure in cooling water paths in a slab surface in order to cause a flow 452 of coolant in vertical grooves 52 of supporters. However, as shown in FIGS. 27 and 28, the cooling grooves 52 may be provided in the supporters 5 to extend diagonally to a slab thickness direction, and cooling water 41 may flow on the slab surface in a slab longitudinal direction. Consequently, there is generated a pressure difference between both ends 520 of the cooling groove so that the flow 452 of the coolant can be caused without pressure difference between the cooling water paths of the slab surface. As an oblique angle between the cooling groove 52 and the slab thickness direction becomes larger, the pressure difference between both the ends of the cooling groove becomes larger.

Embodiment 8

Referring now to FIG. 29, a description will be given of one embodiment according to the eleventh aspect of the present invention.

Figure 29A:
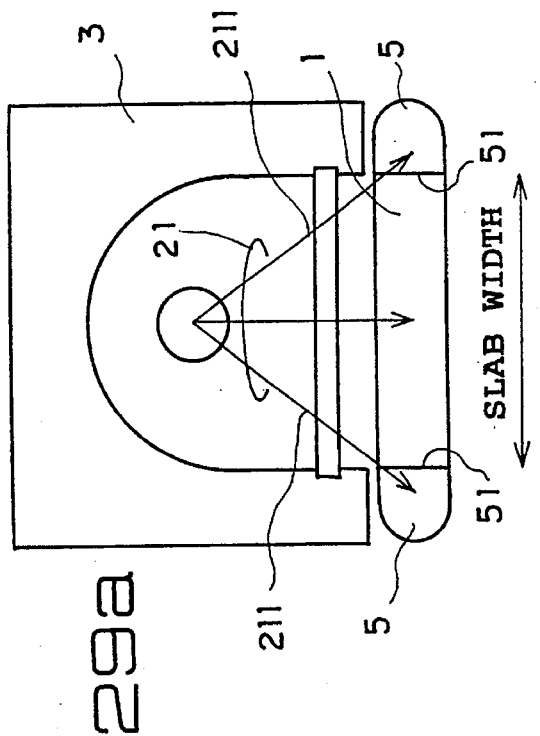
FIG. 29 is a view showing an excitation distribution and a temperature distribution in a width direction of a laser medium of a laser apparatus according to the eleventh aspect of the present invention.
Figure 29B:
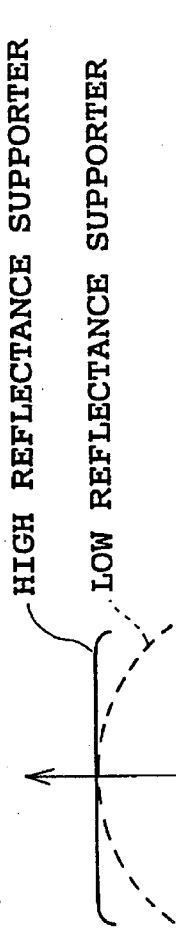
Figure 29C:
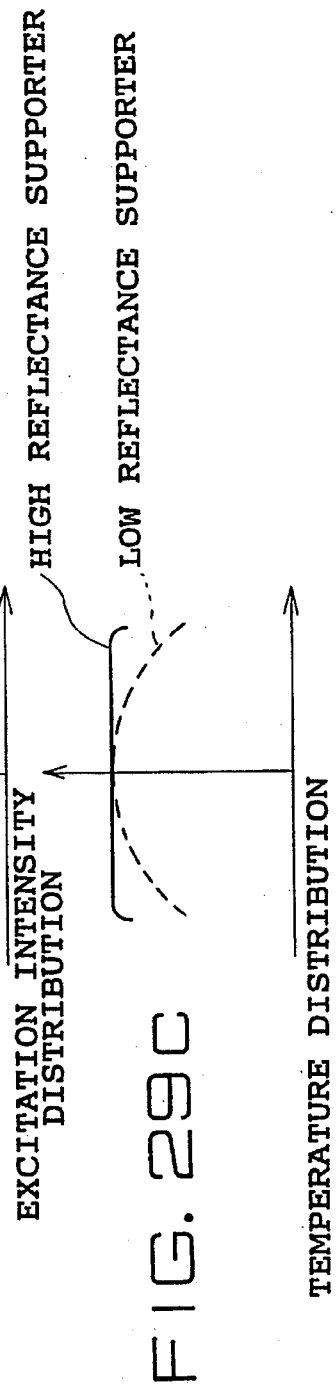

Light 211 is emitted to slab facing surfaces 51 of supporters 5, and once passes through a laser medium 1 serving as an absorber. The light 211 contains a considerable spectral component which is effective in excitation. Therefore, if the excitation light 211 emitted to the supporter 5 is returned into the slab medium 1 again by providing the supporter surfaces 51 having high reflectance as shown in FIG. 29(a) (at an upper stage), it is possible to provide higher efficient excitation.

Specially, in case there are provided a proximately coupling condenser 3, and diffuse reflectance type of supporters made of, for example, Spectralon or macerite to have high reflectance, light intensity in the condenser is enhanced, and slight reflection loss on the supporter side surface 51 has a significant effect on excitation efficiency. Further, low reflectance of the supporter surface 51 reduces the excitation efficiency, and reduces excitation intensity in the vicinity of slab side surfaces, resulting in generation of an excitation distribution as shown by the broken line in FIG. 29(b) (at a middle stage). Concurrently, there are generated a temperature distribution and optical distortion in a width direction as shown by the broken line in FIG. 29(c) (at a lower stage). It is therefor necessary to reduce the generation of the optical distortion by providing the highest reflectance of the supporter surface 51 possible, and the most uniform excitation distribution possible even at width directional ends as shown by the solid line in FIG. 29(b) (at the middle stage).

Alternatively, in case the reflectance of the supporter 5 decreases due to absorbance of light rather than transmission of the light, there are problems in that an increase in excitation input increases heat generation of the supporter itself, and the optical distortion becomes worse as the supporter becomes more hot. Thus, the supporter 5 requires optical characteristics of less absorption of the excitation light 21 (having a wavelength in the range of 200 to 1000 nm), and higher reflectance. Suitable materials for the supporter 5 may include Spectralon, macerite, gilt plate glass or the like.

Embodiment 9

Figure 30:
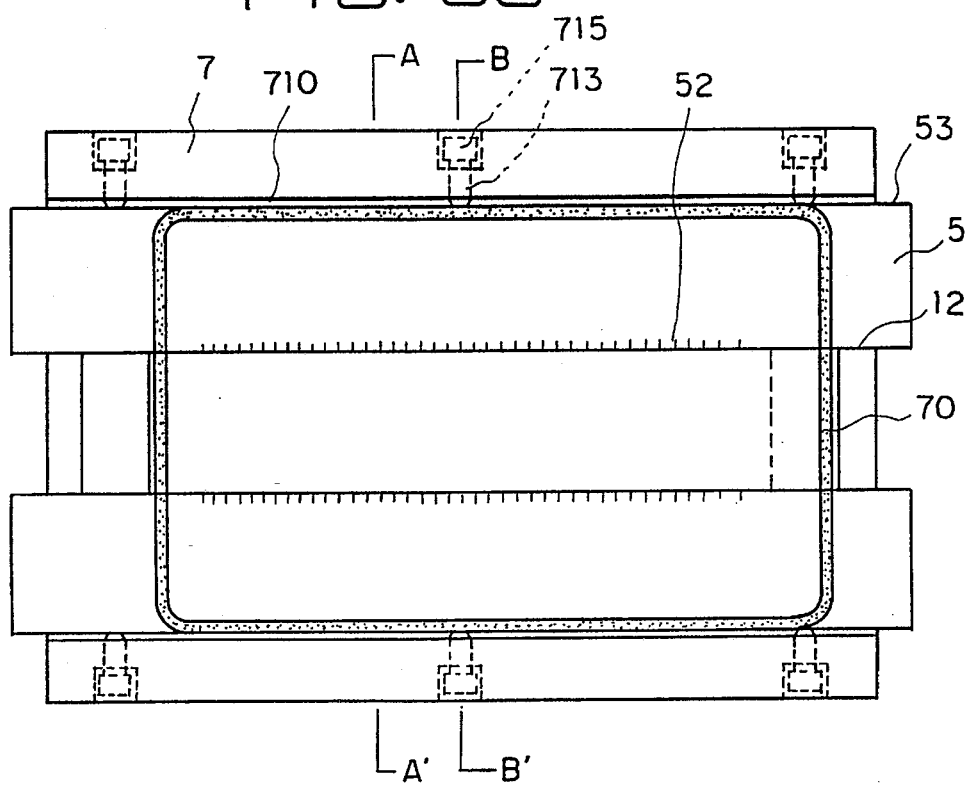
FIG. 30 is a top view of one embodiment of a laser apparatus according to the eighteenth aspect of the present invention.
Figure 31:
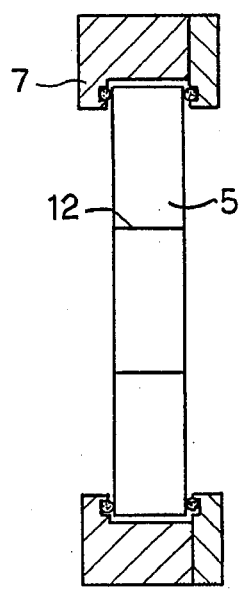
FIG. 31 is a sectional view of one embodiment of the laser apparatus according to the eighteenth aspect of the present invention.
Figure 32:
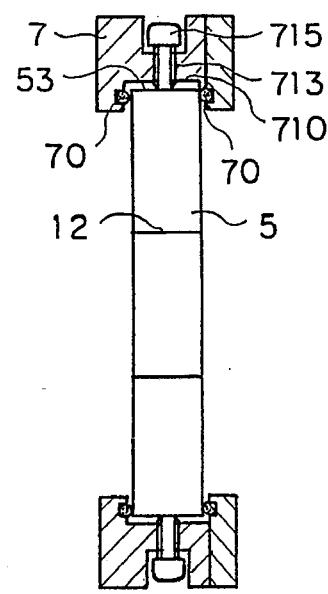
FIG. 32 is a sectional view of one embodiment of the laser apparatus according to the eighteenth aspect of the present invention.

Referring now to FIGS. 30 to 32, a description will be given of one embodiment according to the third aspect and the eighteenth aspect of the present invention.

Figure 96:
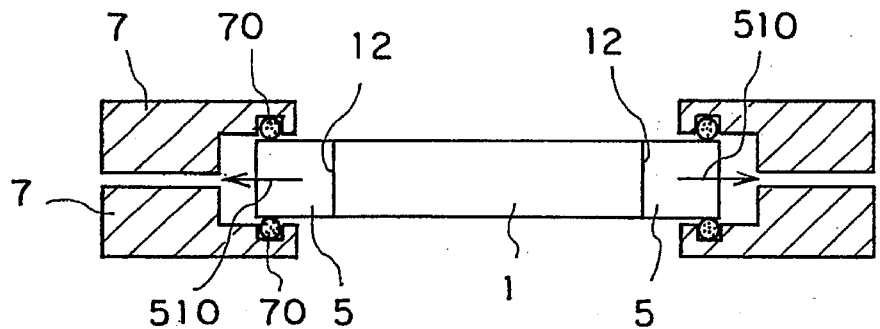
FIG. 96 is a view showing force applied in a direction to separate the laser medium from the supporters of the conventional laser apparatus.
Figure 97:
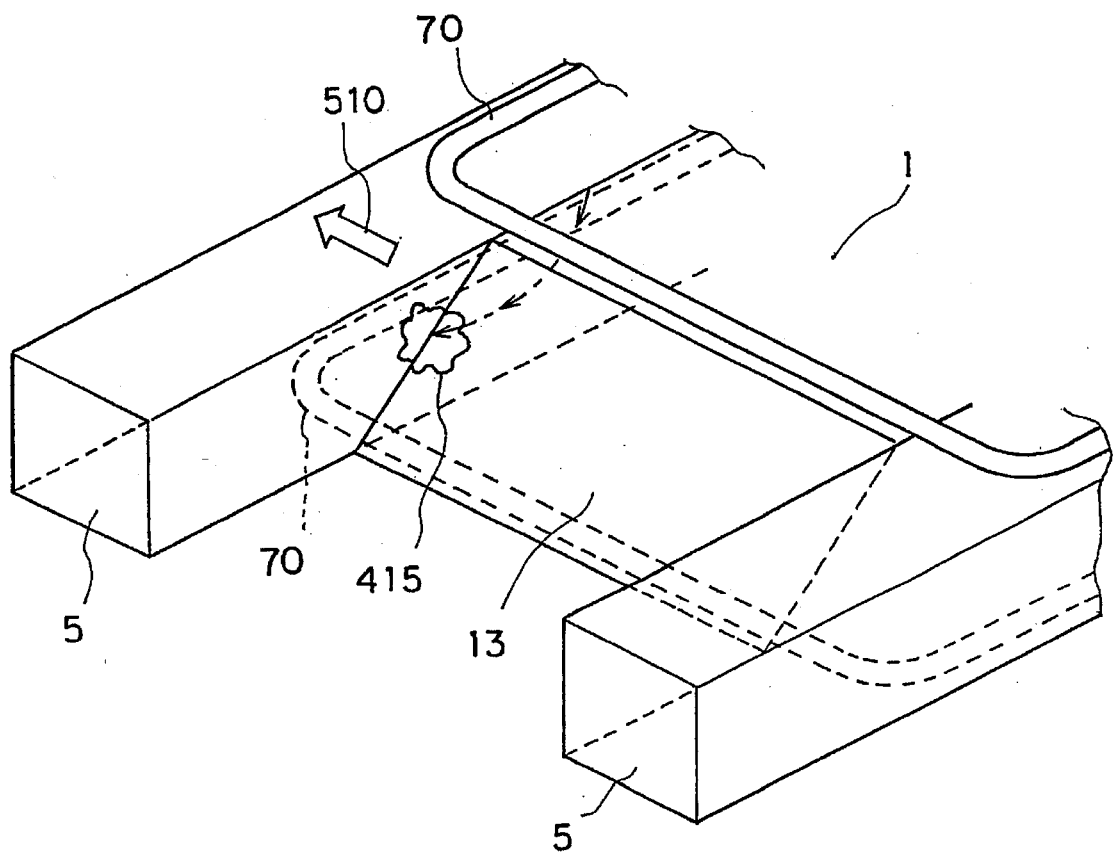
FIG. 97 is a view showing water leakage on an end surface of the laser medium of the conventional laser apparatus.
Figure 98:
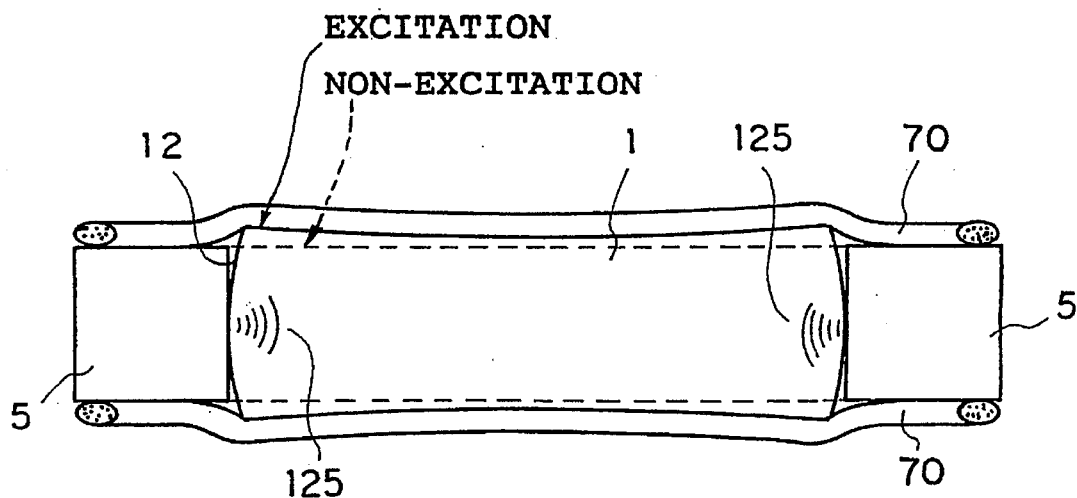
FIG. 98 is a view showing mechanical deformation at ends in a width direction of the laser medium of the conventional laser apparatus.
Figure 99:
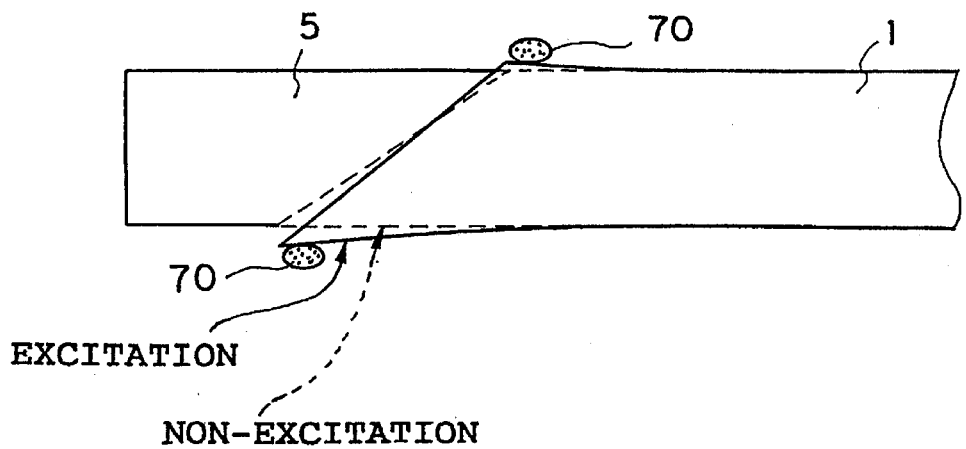
FIG. 99 is a view showing mechanical deformation at ends in a longitudinal direction of the laser medium of the conventional laser apparatus.

In a conventional solid state laser apparatus, a supporter 5 is adhered to a slab side surface 12 by silicon rubber adhesives, adhesive tapes or the like. When a slab 1 and the supporters 5 disposed on side surfaces thereof are integrally contained in the frame 7, pressure caused by an O-ring 70 serving as sealant for coolant apply force 510 in a direction to separate the slab 1 from the supporters (insulator) 5 as shown in FIG. 96. Consequently, a coolant 41 can not be sufficiently sealed due to reduced adhesive properties between the slab side surfaces 12 and the supporters 5 so that water leakage occurs on a slab end surface 13 as shown in FIG. 97. Thus, there are serious problems in that a beam may be cut away, and contamination may occur on the entrance/exit end surface 13 for the beam which is optically polished.

Hence, in the embodiment according to the third aspect and the eighteenth aspect of the invention, screw holes are provided in a slab containing frame 7 at a position 710 opposed to the supporter to extend substantially perpendicular to a supporter back surface 53 as shown in FIGS. 30 and 32. Further, a distal end of a screw (a screw member) 715 fitted into the screw hole pushes the back surface 53 of the supporter 5 to contact the supporter 5 with the slab side surface 12 with pressure.

In this construction, it is possible to adjust contact pressure by externally rotating the screw 715 even after the frame 7 contains the slab 1 and is attached to a condenser and a lamp housing 8. It is also possible to adjust the contact pressure so as to minimize mechanical stress and optical distortion, and prevent water leakage from a joint between the supporter 5 and the slab side surface 12.

Alternatively, as the fourth aspect of the present invention, a groove 52 (an irregular construction) described in, for example, the embodiment 1 may be provided in an inner surface of the supporter 5 in the embodiment 9. In this case, the supporter 5 contacting the side surface 12 of the slab 1 with pressure can further stabilize an effect obtained by providing the supporter inner surface with an irregular construction or forming the supporter by a plurality of materials, that is, an effect to optimize a thermal boundary condition between laser medium side surfaces and the supporter. Further, this contact with pressure can enhance water-tightness. As a result, it is possible to improve reliability, and realize a laser operation having more excellent stability in beam quality.

Embodiment 10

Figure 33:
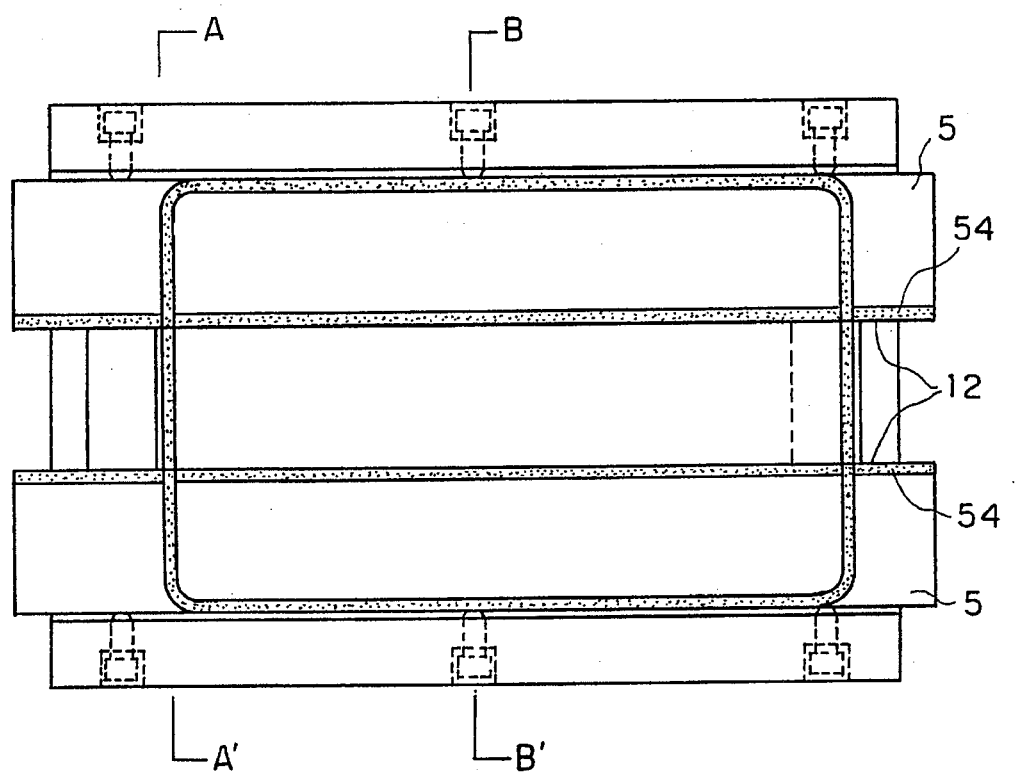
FIG. 33 is a top view of one embodiment of a laser apparatus according to the twelfth aspect, the thirteenth aspect, and the fourteenth aspect of the present invention.
Figure 34:
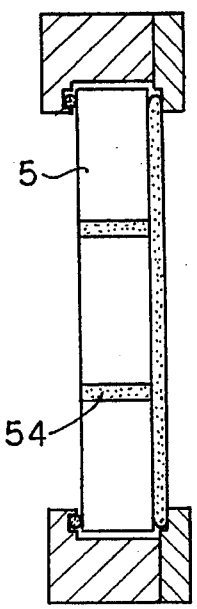
FIG. 34 is a sectional view of one embodiment of the laser apparatus according to the twelfth aspect, the thirteenth aspect, and the fourteenth aspect of the present invention.
Figure 35:
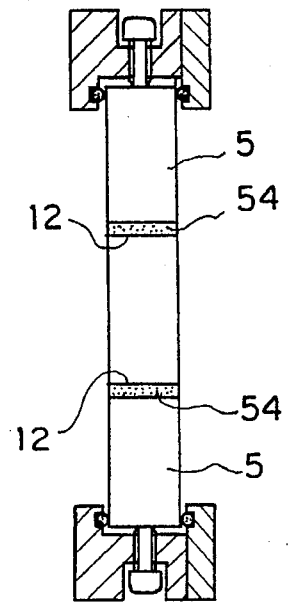
FIG. 35 is a sectional view of one embodiment of the laser apparatus according to the twelfth aspect, the thirteenth aspect, and the fourteenth aspect of the present invention.

Referring now to FIGS. 33 to 35, a description will now be given of one embodiment according to the twelfth aspect, the thirteenth aspect, and the fourteenth aspect of the present invention.

In case a supporter 5 and a slab side surface 12 are joined through adhesives or adhesive tapes, a joint layer has a thin thickness of 0.1 mm or less. Consequently, contact pressure may significantly vary in response to slight mechanical deformation due to, for example, thermal expansion of a slab 1, supporter 5, a frame 7 or the like. Hence, in the embodiment, an elastic body 54 is mounted on a joint between the supporter 5 and the slab side surface 12 to absorb the above-mentioned mechanical deformation, provide uniform contact pressure, and improve adhesive properties as shown in FIGS. 33 to 35. In order to reduce an increased temperature and optical distortion due to absorption of excitation light and heat generation, a transparent silicon rubber is employed as the elastic body 54 since the transparent silicon rubber can absorb relatively little excitation light.

It is difficult to adjust the strip silicon rubber 54 to the slab side surface 12 and the supporter 5 in assembly. Therefore, the strip silicon rubber 54 is adhered to the supporter 5 by a transparent silicon rubber adhesive (for example, the Dow Corning Silpot 186). It is thereby possible to avoid omission of the silicon rubber in assembly and disassembly so as to facilitate the assembly and the disassembly.

Embodiment 11

Figure 36:
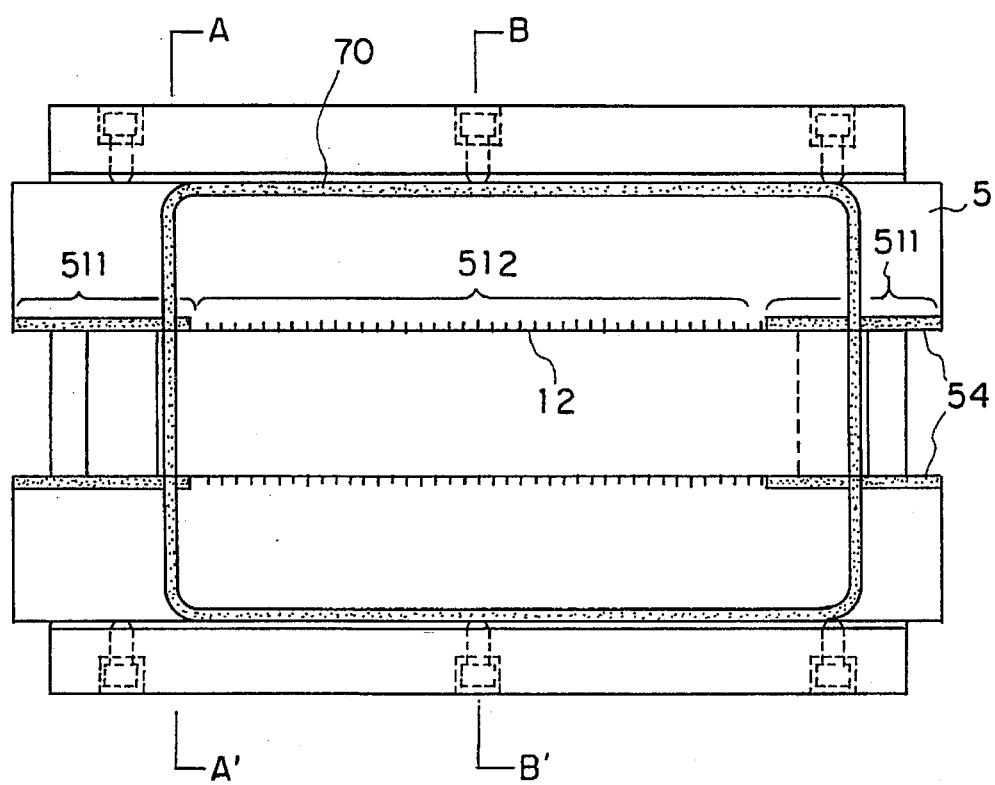
FIG. 36 is a top view of one embodiment of a laser apparatus according to the fifteenth aspect of the present invention.
Figure 37:
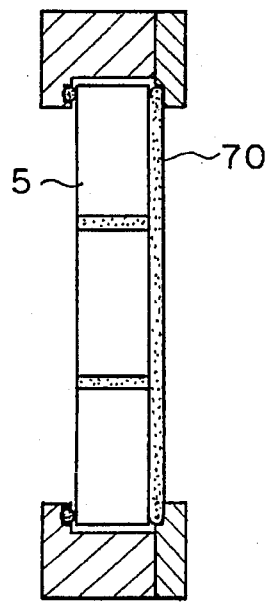
FIG. 37 is a sectional view of one embodiment of the laser apparatus according to the fifteenth aspect of the present invention.
Figure 38:
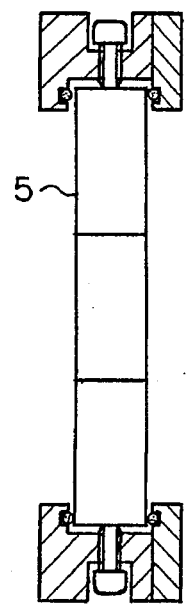
FIG. 38 is a sectional view of one embodiment of the laser apparatus according to the fifteenth aspect of the present invention.

Referring now to FIGS. 36 to 38, a description will now be given of one embodiment according to the fifteenth aspect of the present invention.

A transparent silicon rubber 54 absorbing little excitation light extends over an entire length of a supporter 5 in the embodiment 10. However, in case excitation intensity is strong, a temperature of the supporter 5 increases in response to even slight absorbance of the transparent silicon rubber so that a temperature distribution with hot ends is generated in a slab width direction, and optical distortion occurs along with the temperature distribution. Hence, in the embodiment shown in FIGS. 36 to 38, adhesive properties are specially important in vicinities 511 of contact positions with an O-ring 70 so that the transparent silicon rubbers 54 are disposed only in the vicinities 511 of the contact positions, and no transparent silicon rubber is disposed on excitation area corresponding portions 512. Though water-tightness at seal positions of the O-ring 70 is very important in view of prevention of water leakage, there may be provided the adhesive properties to stabilize a thermal boundary condition at portions rather than the seal positions. Thus, no problem occurs even if water 41 serving as coolant infiltrates into an interface between the supporter 5 and the slab side surface 12.

Embodiment 12

Figure 39:
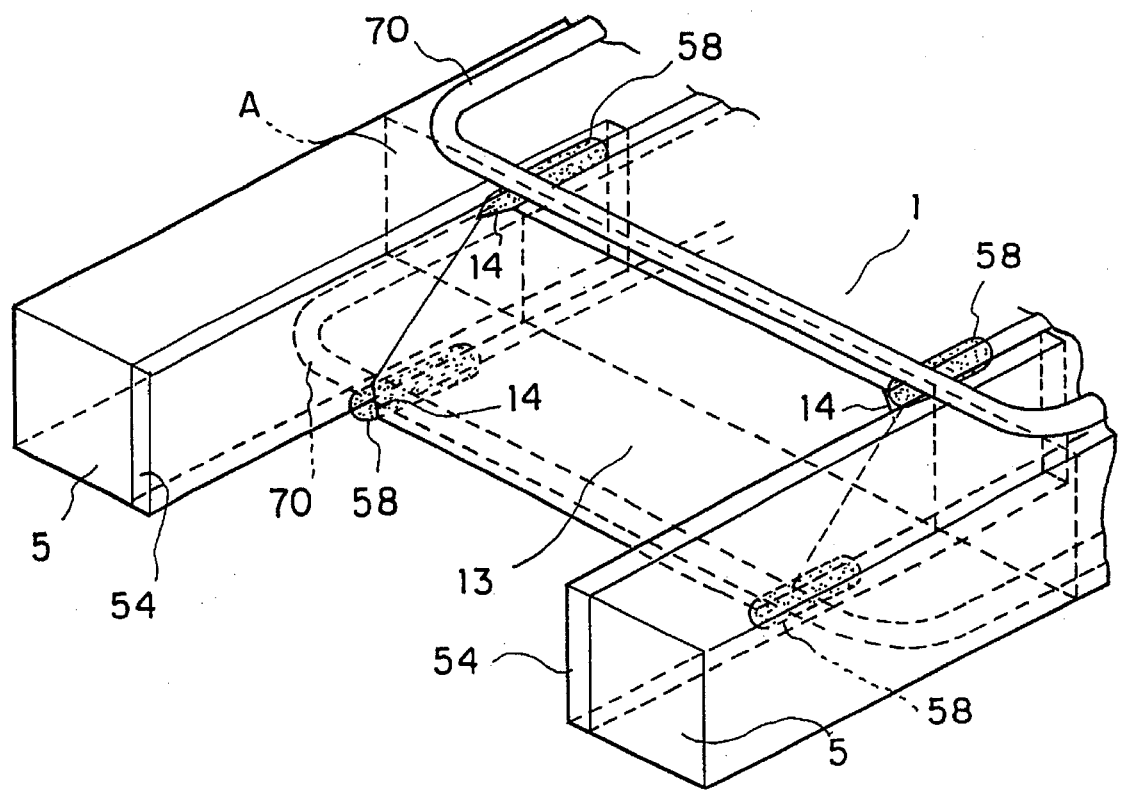
FIG. 39 is a perspective view of a joint portion between a laser medium and supporters of one embodiment of a laser apparatus according to the sixteenth aspect of the present invention.
Figure 40:
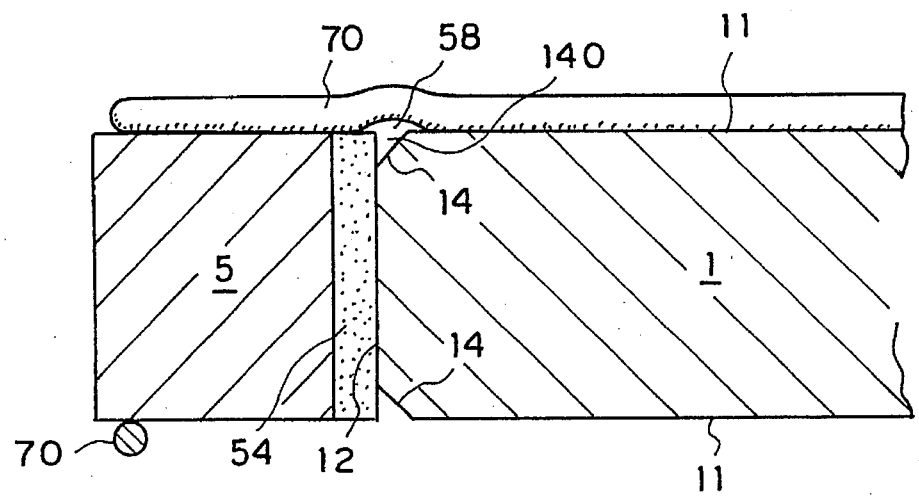
FIG. 40 is a front sectional view of a joint portion between a laser medium and supporters of one embodiment of the laser apparatus according to the sixteenth aspect of the present invention.

Referring now to FIGS. 39 and 40, a description will now be given of one embodiment according to the sixteenth aspect of the present invention.

Corner portions of a slab 1 are typically chamfered to form chamfers 14 in the range of 0.3 to 0.5 mm. Accordingly, there is a problem in that, when the slab is joined to a supporter by typical adhesion means, a triangular clearance 140 is often formed, and water leakage occurs at the clearance at a seal position. Even in case of pressure contact, it is necessary to considerably increase pressure of the pressure contact of a silicon rubber 54 interposed between the supporter 5 and a side surface 12 of the slab 1 in order to eliminate the triangular clearance. Further, it is necessary to generate large stress at slab ends having small mechanical strength so as to ensure water-tightness.

Hence, in the embodiment according to the sixteenth aspect of the invention, elastic substances 58 having elasticity such as transparent silicon rubber is filled in the triangular chamfer 14 in the vicinity of the seal position contacting an O-ring 70 so as to provide sufficient water-tightness in response to slight contact pressure as shown in FIGS. 39 and 40.

Embodiment 13

Figure 41:
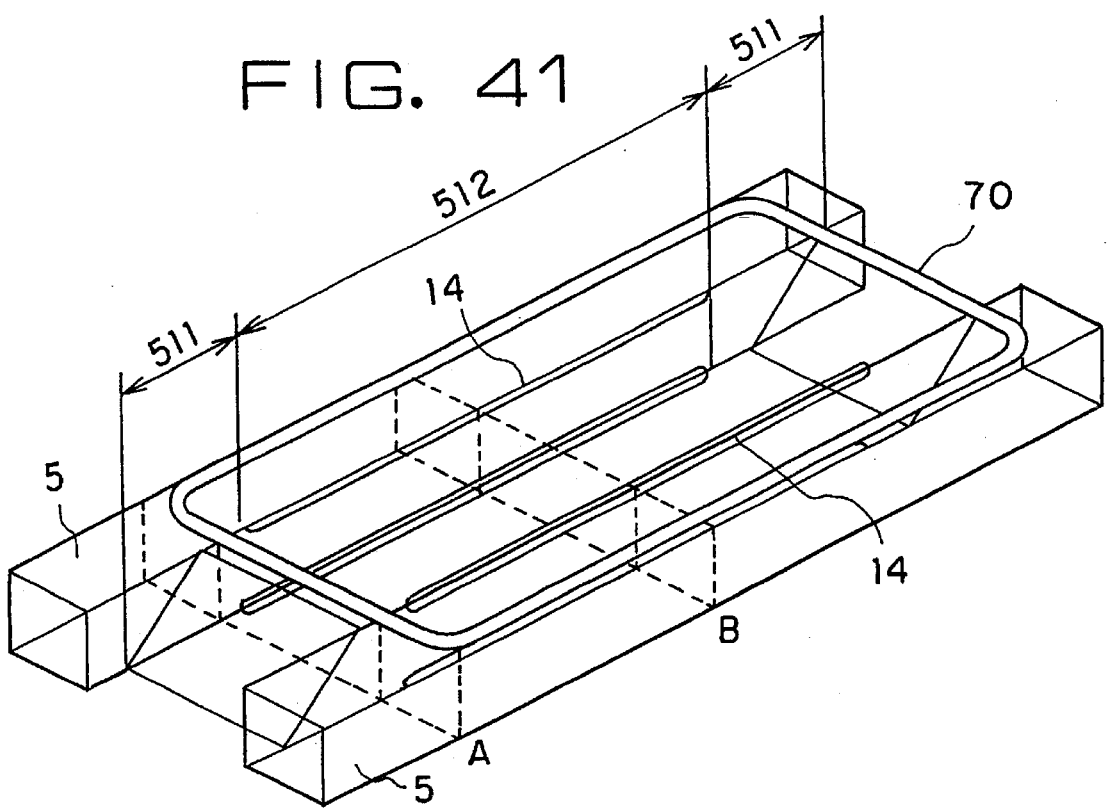
FIG. 41 is a perspective view of a laser medium and supporters of one embodiment of a laser apparatus according to the seventeenth aspect of the present invention.
Figure 42:
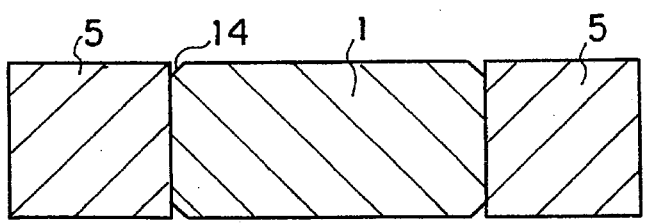
FIG. 42 is a sectional view of a Joint portion between a laser medium and supporters of one embodiment of the laser apparatus according to the seventeenth aspect of the present invention.
Figure 43:
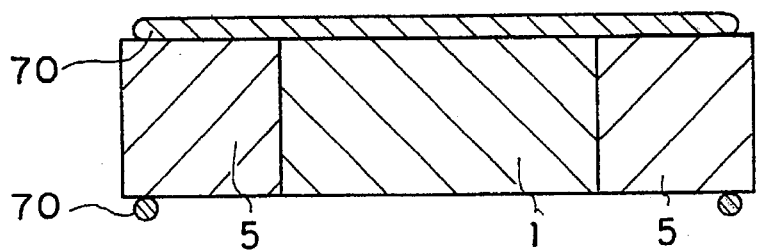
FIG. 43 is a sectional view of a joint portion between a laser medium and supporters of one embodiment of the laser apparatus according to the seventeenth aspect of the present invention.

Referring now to FIGS. 41 to 43, a description will be given of one embodiment according to the seventeenth aspect of the present invention.

In the embodiment, chamfers 14 of corner portions of a slab are set at 0.3 mm or less in the vicinities 511 of seal positions contacting an O-ring 70 as shown in FIG. 43 such that no triangular clearance 140 is formed even by typical adhesion, or slight pressure contact through an elastic body. The slab corner portions are typically chamfered so as not to cause any destruction by fine cracks of the corner portions due to stress generated in excitation. Therefore, it is necessary to chamfer only corner portions of an excitation area 512 where intensive stress occurs in the excitation, and no large chamfer is required in the vicinity 511 of a cooling seal position of a slab end rather than the excitation area.

Embodiment 14

Figure 44:
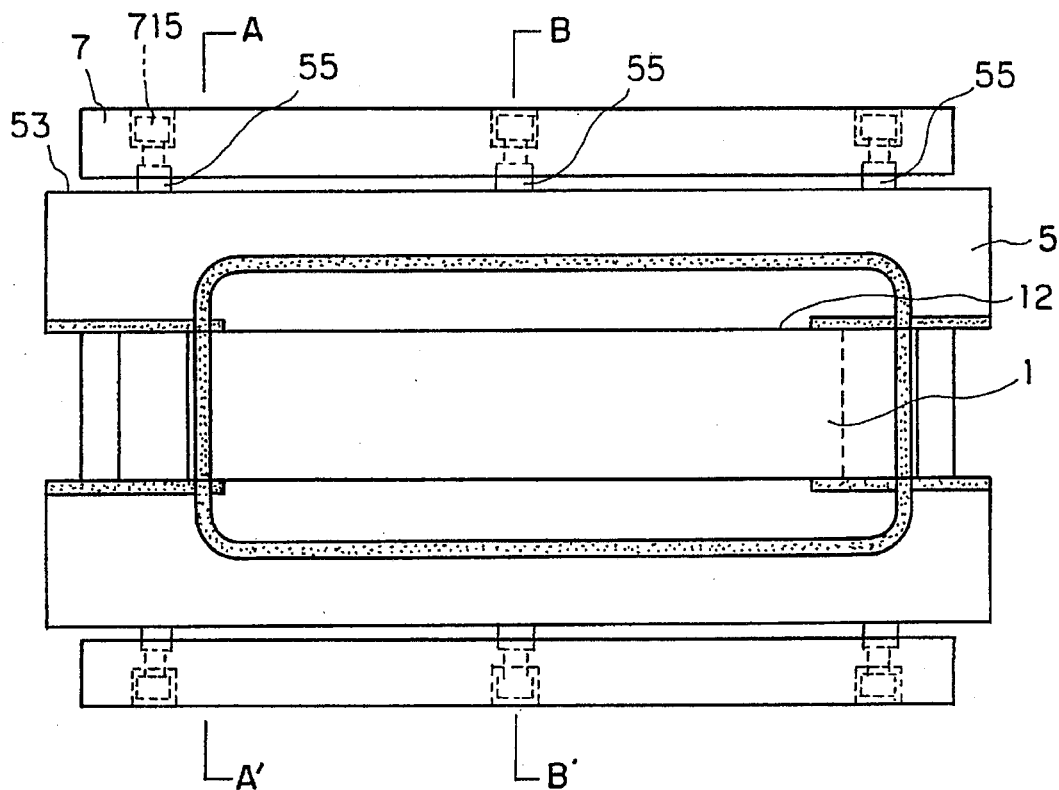
FIG. 44 is a top view of one embodiment of a laser apparatus according to the nineteenth aspect of the present invention.
Figure 45:
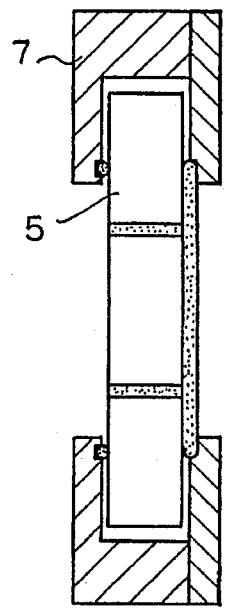
FIG. 45 is a sectional view of one embodiment of the laser apparatus according to the nineteenth aspect of the present invention.
Figure 46:
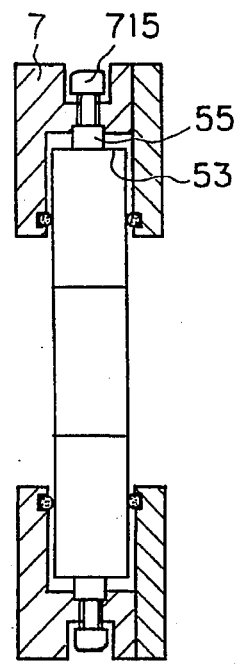
FIG. 46 is a sectional view of one embodiment of the laser apparatus according to the nineteenth aspect of the present invention.

Referring now to FIGS. 44 to 46, a description will be given of one embodiment according to the nineteenth aspect of the present invention.

In case a highly rigid material such as ceramic, glass, metal is employed as a supporter 5 for a slab side surface 12, and the supporter 5 is joined to a slab by adhesives or adhesive tapes, a joint layer has an extremely thin thickness of 0.1 mm or less. As described in the embodiment 9, contact pressure between the slab 1 and the supporter 5 may vary to a large extent in response to slight mechanical deformation due to, for example, thermal expansion of the slab 1, the supporter 5, a frame 7 or the like. Further, there are other problems in that, for example, the contact pressure becomes too sensitive to a way to clamp a screw 715, and adjustment of the contact pressure becomes difficult.

Hence, in the embodiment, a spring 55 is interposed between a supporter back surface 53 and the screw 715 as shown in FIG. 44. It is thereby possible to maintain a constant contact pressure and realize stability of the contact pressure by adjusting a compression length of the spring by the screw 715.

Embodiment 15

Figure 47:
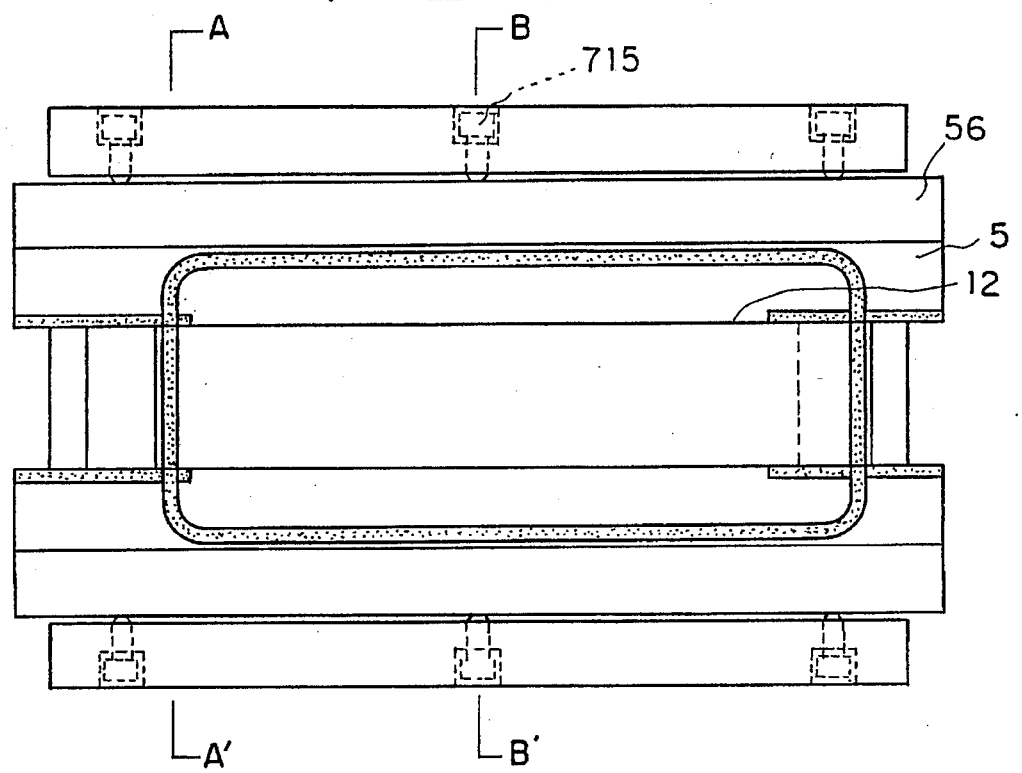
FIG. 47 is a top view of one embodiment of a laser apparatus according to the twentieth aspect of the present invention.
Figure 48:
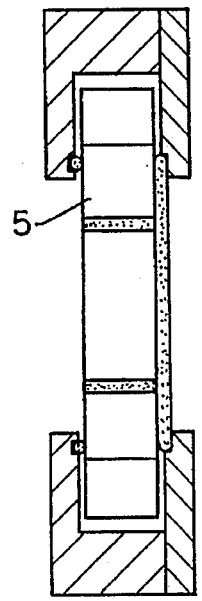
FIG. 48 is a sectional view of one embodiment of the laser apparatus according to the twentieth aspect of the present invention.
Figure 49:
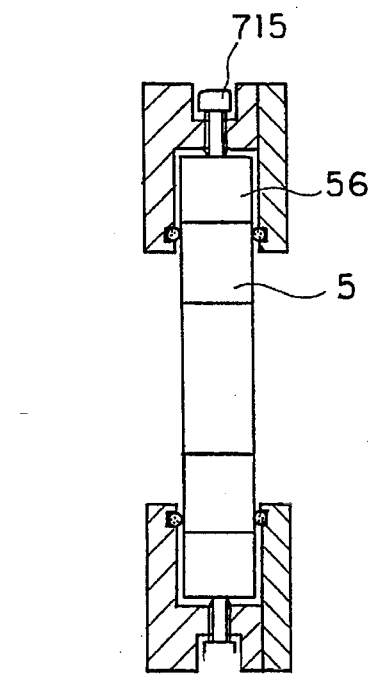
FIG. 49 is a sectional view of one embodiment of the laser apparatus according to the twentieth aspect of the present invention.

Referring now to FIGS. 47 to 49, a description will be given of one embodiment according to the twentieth aspect of the present invention.

In the embodiment 14, a supporter 5 is contacted with pressure by a screw 715 or a spring 55 mounted at a distal end of the screw at several positions. However, in case the supporter 5 is made of Spectralon or thin ceramic to have elasticity, a contact pressure difference may be generated between the vicinity of screw supporting points and other portions, resulting in a pressure distribution. Hence, in the embodiment, a rigid plate body 56 such as stainless is interposed between the screw 715 and the supporter 5 so as to provide a smooth contact pressure distribution between the supporter 5 and the slab side surface 12, and so as to prevent the distal end of the screw 715 from recessing a supporter back surface 53 as shown in FIG. 47.

Figure 50:
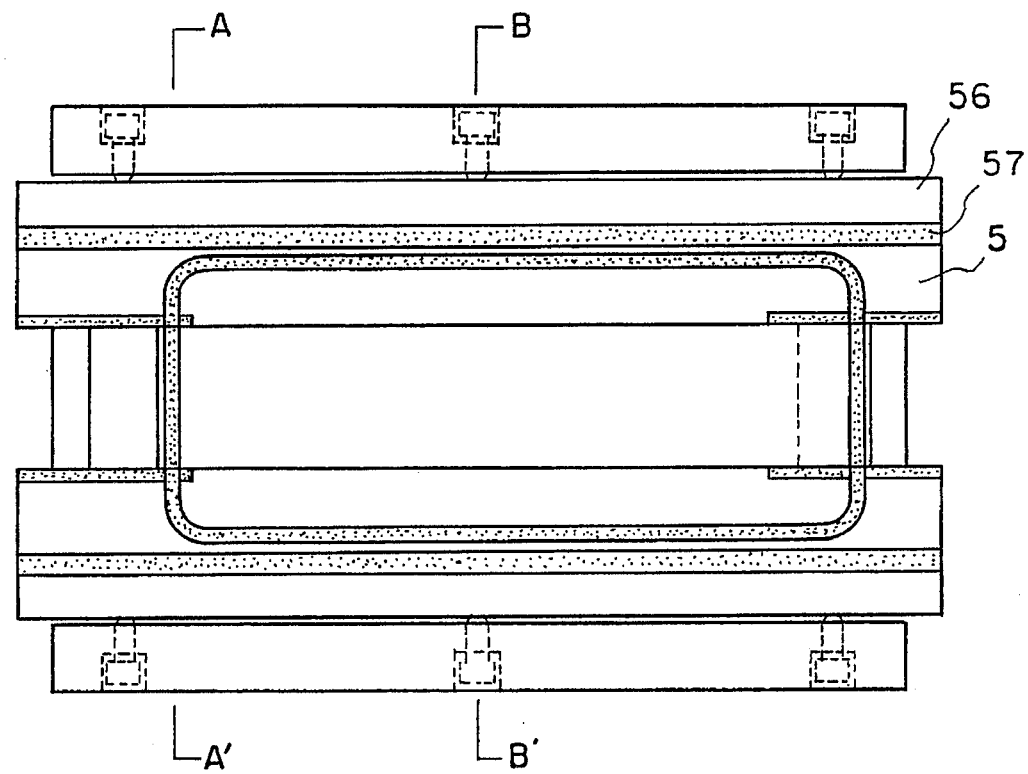
FIG. 50 is a top view of one embodiment of a laser apparatus according to the twenty-first aspect of the present invention.
Figure 51:
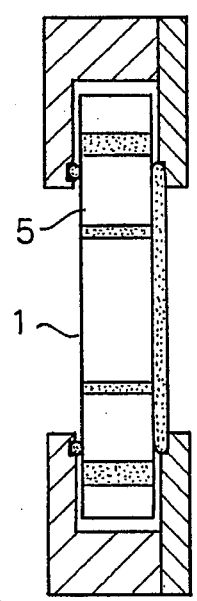
FIG. 51 is a sectional view of one embodiment of the laser apparatus according to the twenty-first aspect of the present invention.
Figure 52:
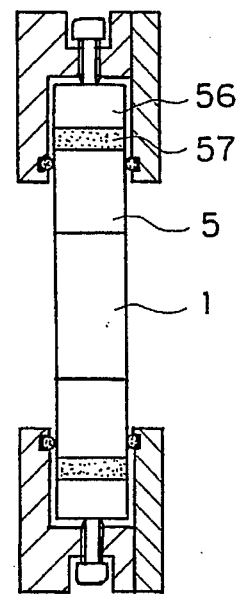
FIG. 52 is a sectional view of one embodiment of the laser apparatus according to the twenty-first aspect of the present invention.

Alternatively, as the twenty-first aspect of the invention, a silicon rubber plate 57 may be interposed between the plate body 56 and the supporter 5 as shown in FIGS. 50 to 52. It is thereby possible to more improve relaxation of the contact pressure distribution and stabilization of adhesive properties.

Embodiment 16

Referring now to FIGS. 53 to 56, a description will be given of one embodiment according to the twenty-second aspect of the present invention.

In the embodiments 1 to 8, optical distortion in width and longitudinal directions of a slab is reduced by optimizing a fine form and a material of a surface 51 of a supporter 5 opposed to a slab side surface 12, and optimizing a thermal boundary condition to match with an excitation exothermic distribution of the slab. That is, variation in the thermal boundary condition of the slab side surface 12 is affected by the fine form and the material of the slab facing surface 51 of the supporter, and is further affected by contact pressure because thermal resistance is varied by the contact pressure.

Figure 53:
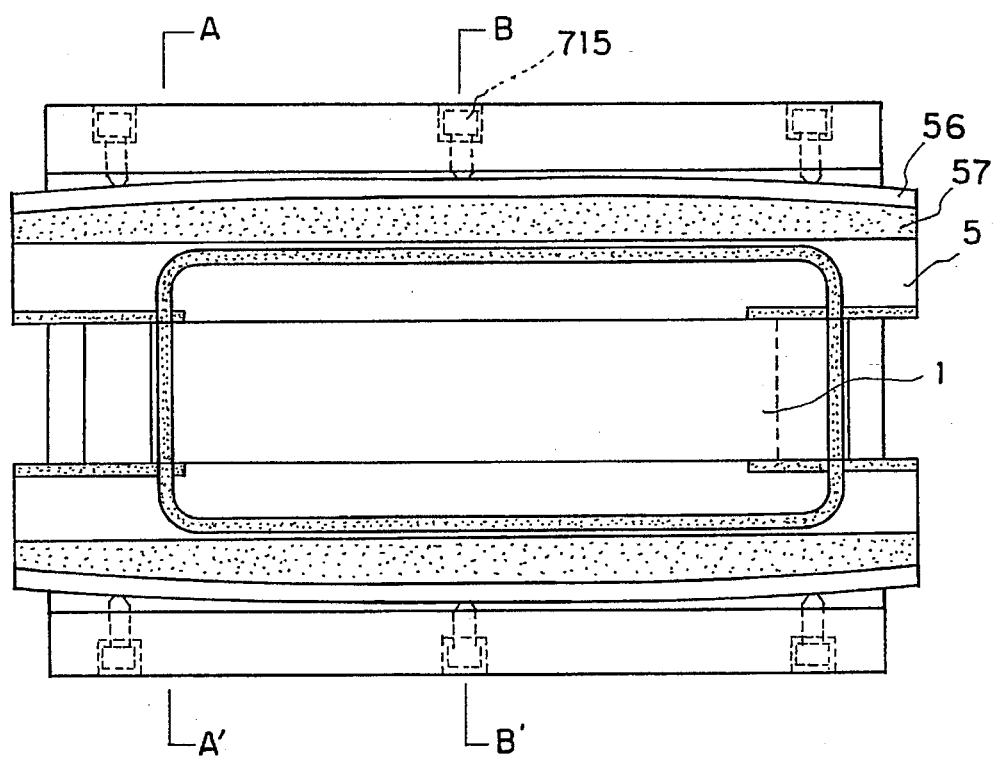
FIG. 53 is a top view of one embodiment of a laser apparatus according to the twenty-second aspect of the present invention.
Figure 54:
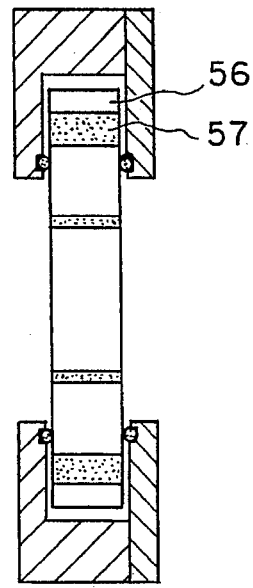
FIG. 54 is a sectional view of one embodiment of the laser apparatus according to the twenty-second aspect of the present invention.
Figure 55:
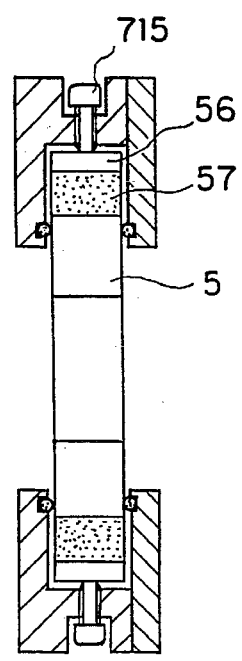
FIG. 55 is a sectional view of one embodiment of the laser apparatus according to the twenty-second aspect of the present invention.

Hence, in the embodiment, a relatively thick silicon rubber plate 57 is disposed on a back surface 53 of the supporter as shown in FIG. 53. The silicon rubber plate 57 is pushed by a screw 715 through a stainless plate body 56 having a thickness in an approximate range of 1 to 2 mm to provide the optimal contact pressure distribution for each position in a slab longitudinal direction so as to reduce optical distortion. The stainless plate 56 having the thickness in the approximate range of 1 to 2 mm can serve as a rigid body having some elasticity which is lower than that of the silicon rubber 57. As shown in FIG. 53, adjustment of a pressing screw 715 can provide a relatively smooth thickness distribution of the silicon rubber 57, and this compressive force distribution can provide a contact pressure distribution between the supporter 5 and the slab 1.

Figure 56:
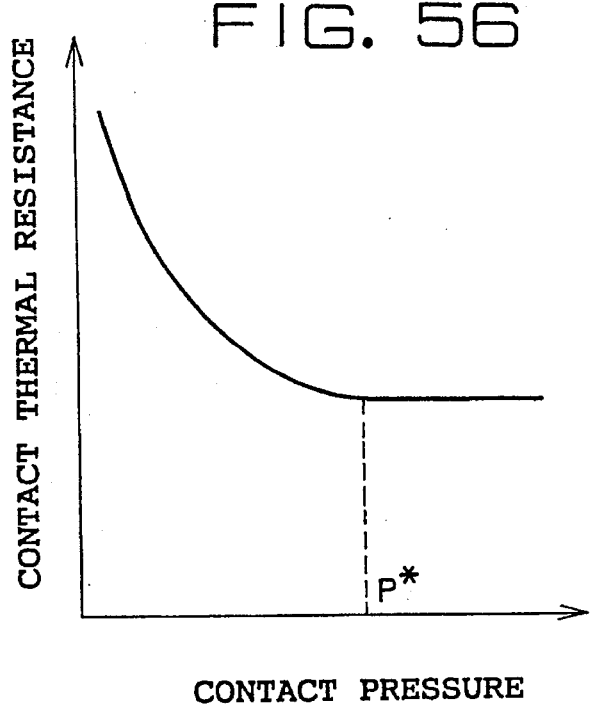
FIG. 56 is a view showing dependency of contact thermal resistance on contact pressure between supporters and a laser medium side surface of one embodiment of the laser apparatus according to the twenty-second aspect of the present invention.

Contact thermal resistance between surfaces typically becomes smaller as pressure becomes larger, but hardly varies at a predetermined pressure $P^*$ or more as shown in FIG. 56. Therefore, pressure adjustment is performed at pressure of $P^*$ or less in order to vary the thermal boundary condition.

Embodiment 17

Figure 57:
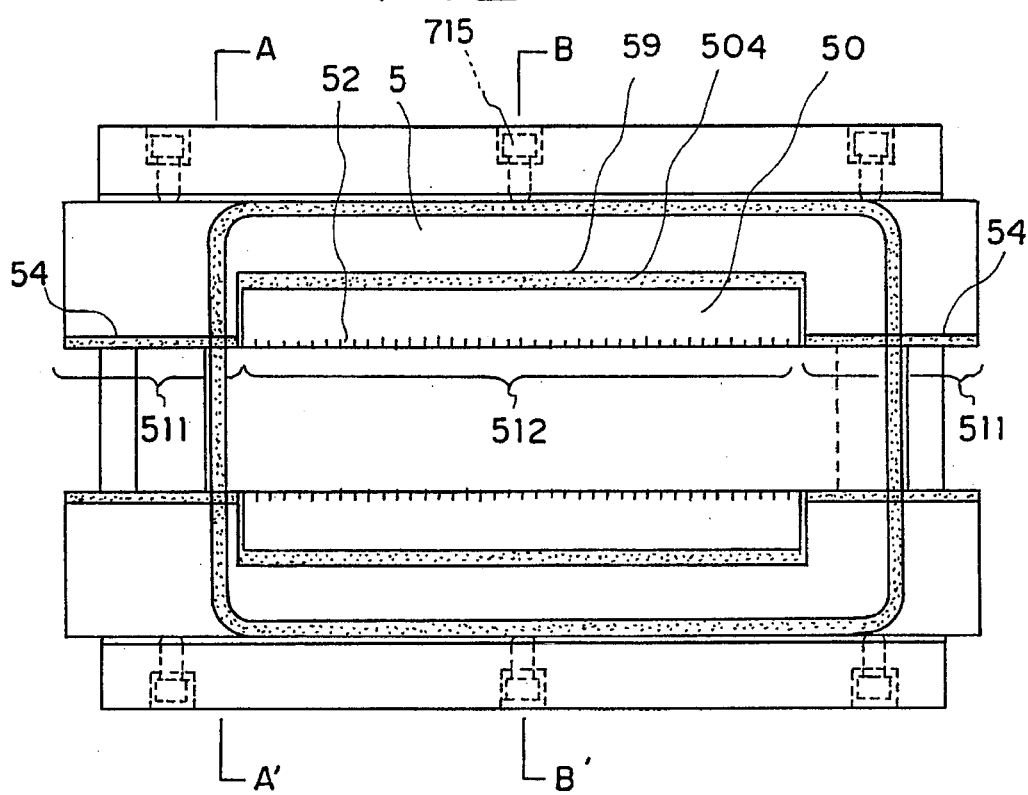
FIG. 57 is a top view of one embodiment of a laser apparatus according to the twenty-third aspect and the twenty-fourth aspect of the present invention.
Figure 58:
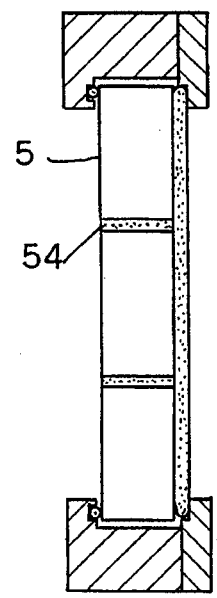
FIG. 58 is a sectional view of one embodiment of the laser apparatus according to the twenty-third aspect and the twenty-fourth aspect of the present invention.
Figure 59:
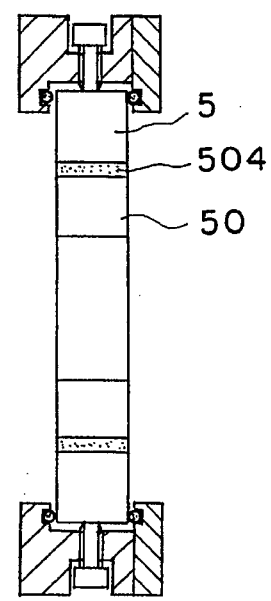
FIG. 59 is a sectional view of one embodiment of the laser apparatus according to the twenty-third aspect and the twenty-fourth aspect of the present invention.

Referring now to FIGS. 57 to 59, a description will be given of one embodiment according to the fifth aspect, the sixth aspect, the twenty-third aspect, and the twenty-fourth aspect of the present invention.

Various physical characteristics are required for each position of a supporter 5 which is disposed on a slab side surface 12. For example, the most important characteristic at longitudinal ends 511 of the slab is joint to prevent water leakage, and the most important characteristics at an excitation area corresponding position 512 are a thermal boundary condition to minimize optical distortion in a width direction, and high reflectance to excitation light and no absorption of the excitation light.

Hence, in the embodiment, a recess 59 is provided in the excitation area corresponding position 512 of the supporter 5 as shown in FIG. 57. Further, a member (for example, macerite or Spectralon) 50 having high reflectance is disposed in the recess 59 discretely from the supporter 5. In addition, sealing of coolant is important at slab longitudinal ends 511, and the supporter 5 directly contacts the slab longitudinal ends 511 with pressure through a silicon rubber 54.

A silicon rubber plate 504 is interposed between the high reflectance member 50 and the supporter 5. Compressive force of the silicon rubber plate 504 contacts the high reflectance member 50 with the slab side surface 12 with pressure so as to provide uniform contact pressure and stabilize the contact pressure.

Alternatively, a groove 51 (an irregular construction) described in, for example, the embodiment 1 may be provided in an inner surface of the high reflectance member 50 in the embodiment 17. Consequently, a synergistic effect of each construction can concurrently achieve several effects such as realization of an improved optical characteristic and high beam quality, high reliability by improved water-tightness, and enhanced efficiency of laser oscillation.

Embodiment 18

Figure 60:
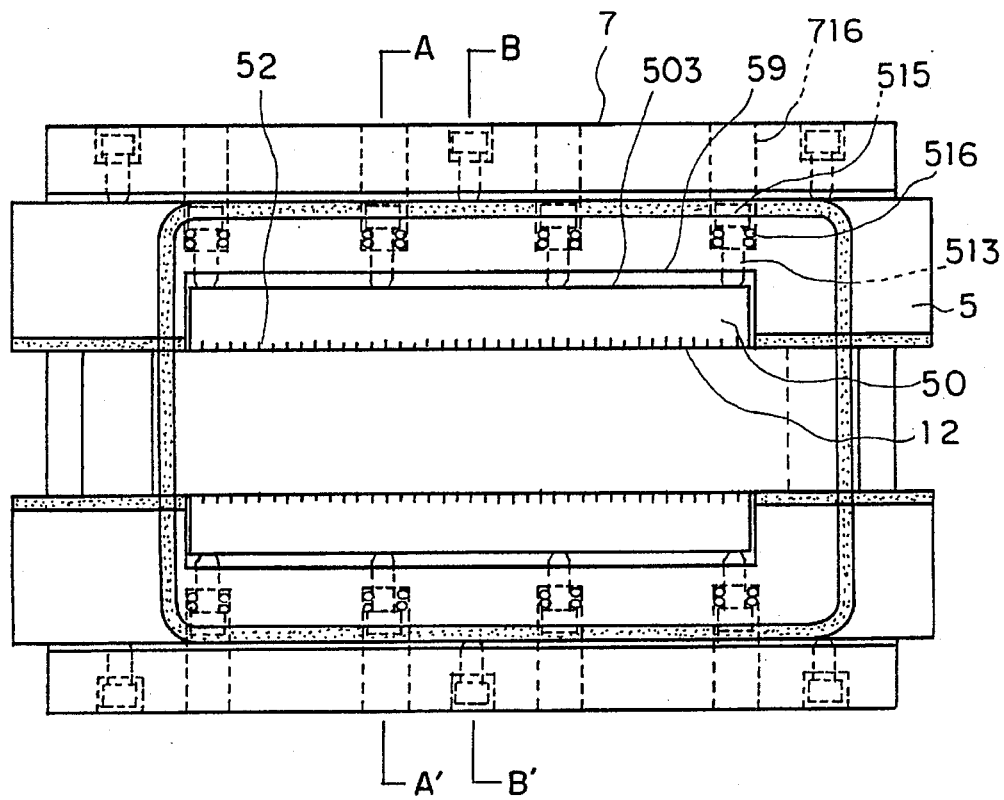
FIG. 60 is a top view of one embodiment of a laser apparatus according to the twenty-fifth aspect of the present invention.
Figure 61:
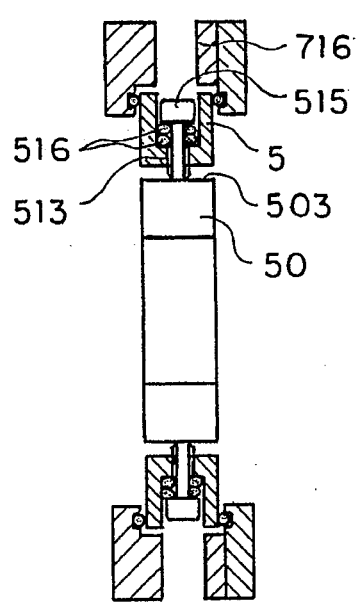
FIG. 61 is a sectional view of one embodiment of the laser apparatus according to the twenty-fifth aspect of the present invention.
Figure 62:
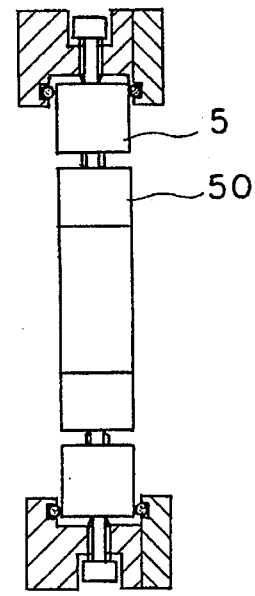
FIG. 62 is a sectional view of one embodiment of the laser apparatus according to the twenty-fifth aspect of the present invention.

Referring now to FIGS. 60 to 62, a description will be given of one embodiment according to the sixth aspect, and the twenty-fifth aspect of the present invention.

Though a simple construction is disclosed in the embodiment 17, contact pressure of a high reflectance member 50 to a slab side surface 12 may vary if a screw 715 is rotated to adjust contact pressure between a supporter 5 and a slab 1. It is naturally possible to adjust a depth of a recess 59 of the supporter, a thickness of a silicon rubber 54 at a coolant seal portion between the supporter 5 and the slab 1, a thickness of a silicon rubber 504 between the supporter 5 and the high reflectance member 50, and a thickness of the high reflectance member 50 such that the contact pressure between the high reflectance member 50 and the slab 1 at an excitation area corresponding portion 512 can be optimized when the contact pressure between the supporter 5 and the slab 1 at the coolant seal portion 511 is optimized. However, it is often desirable to independently adjust the respective contact pressure.

Hence, in the embodiment, a screw hole 513 is provided in the recess 59 of the supporter to extend substantially perpendicular to a back surface 503 of the high reflectance body as shown in FIG. 60. Further, a distal end of a male screw 515 fitted into the screw hole 513 pushes the back surface 503 of the high reflectance member so as to contact the high reflectance member 50 with the slab side surface 12 with pressure, and enable independent pressure adjustment.

Since cooling water infiltrates into the back surface 503 of the high reflectance member 50, an O-ring 516 as shown in FIG. 60 is provided for the adjustment screw 515 so as to prevent the cooling water from leaking out of the screw hole 513. A through hole 716 is provided in a frame 7 at an end surface corresponding to the screw hole 513 in the supporter 5 such that the screw 515 of the supporter 5 can externally be adjusted.

Alternatively, as the sixth aspect of the invention, a groove 52 (an irregular construction) described in, for example, the embodiment 1 may be provided in an inner surface of the high reflectance member 50 in the embodiment 18. Consequently, a synergistic effect of each construction can concurrently achieve several effects such as realization of an improved optical characteristic and high beam quality, high reliability by improved water-tightness, and enhanced efficiency of laser oscillation. In particular, in the embodiment, it is possible to provide a synergistic operation effect in providing high efficiency while maintaining high water-tightness. That is, the high reflectance member 50 is contacted with the slab side surface 12 with pressure so that pressing force to the high reflectance member 50 reacts in a direction to separate the supporter 5 from the slab 1. Therefore, it is necessary to press the supporter 5 onto the slab 1 against the reaction in order to maintain the high water-tightness.

Embodiment 19

Figure 63:
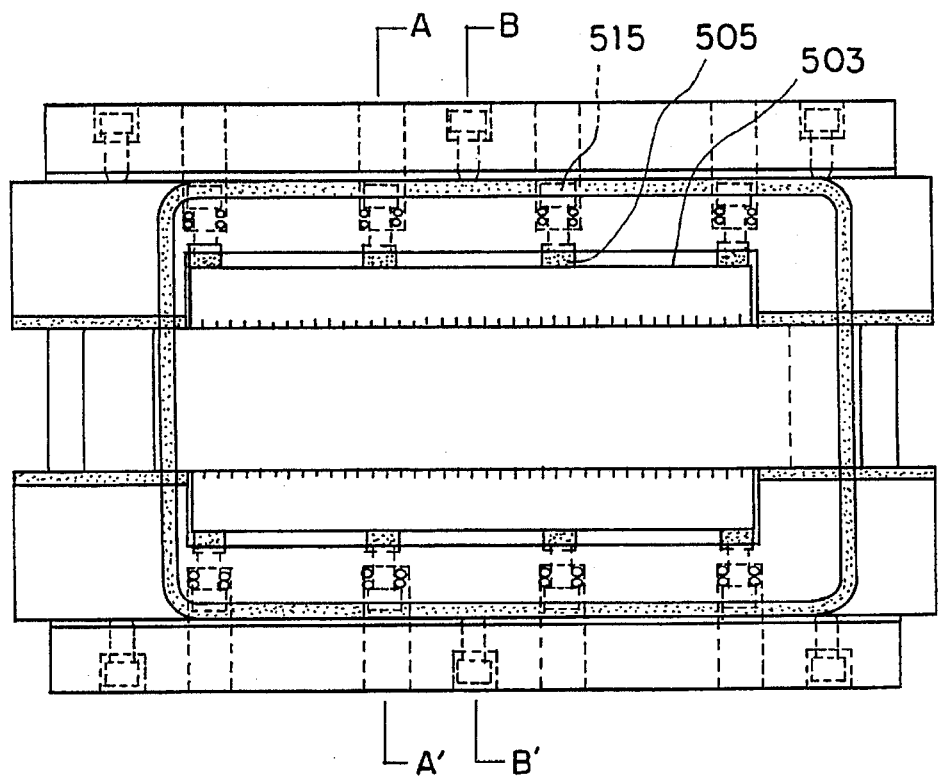
FIG. 63 is a top view of one embodiment of a laser apparatus according to the twenty-sixth aspect of the present invention.
Figure 64:
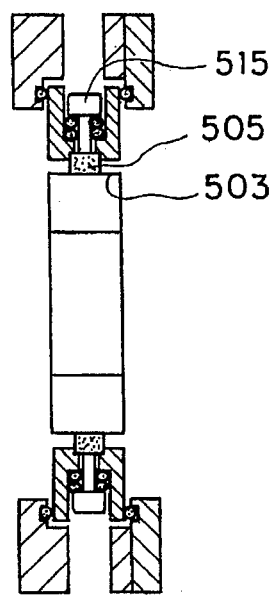
FIG. 64 is a sectional view of one embodiment of the laser apparatus according to the twenty-sixth aspect of the present invention.
Figure 65:
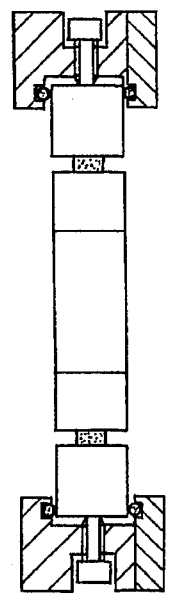
FIG. 65 is a sectional view of one embodiment of the laser apparatus according to the twenty-sixth aspect of the present invention.

Referring now to FIGS. 63 to 65, a description will be given of one embodiment according to the twenty-sixth aspect of the present invention.

In the embodiment, there is provided a construction to contact a high reflectance body 50 in a supporter with a slab side surface with pressure as shown in FIG. 63. In the construction, a spring 505 is interposed between a back surface 503 of the high reflectance body and a pressing screw 515, and a compression length of the spring 505 is varied by rotating the screw 515 so as to adjust contact pressure. This construction enables relaxation of variation in the contact pressure by the rotation of the screw 515, facilitation of the adjustment, and improvement of uniformity and stability in the contact pressure.

Embodiment 20

Figure 66:
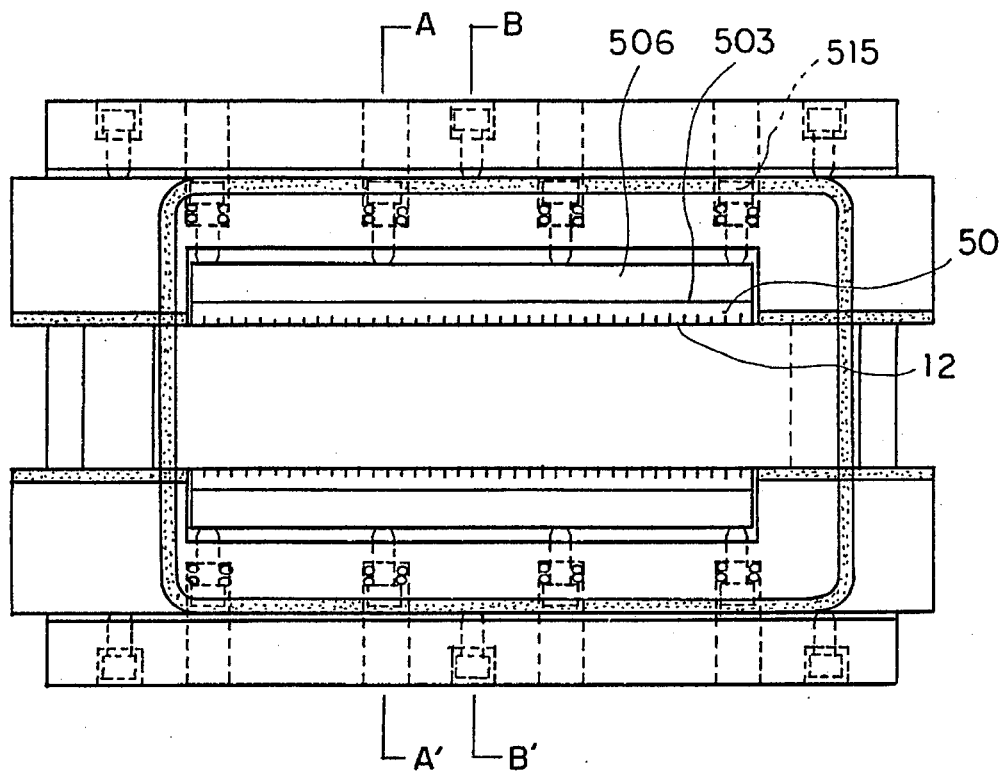
FIG. 66 is a top view of one embodiment of a laser apparatus according to the twenty-seventh aspect of the present invention.
Figure 67:
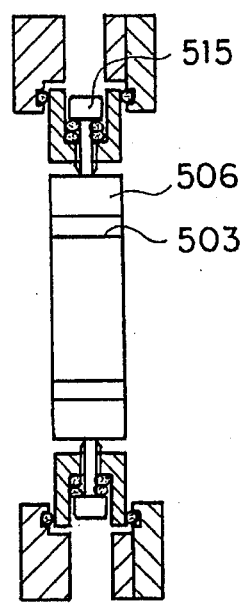
FIG. 67 is a sectional view of one embodiment of the laser apparatus according to the twenty-seventh aspect of the present invention.
Figure 68:
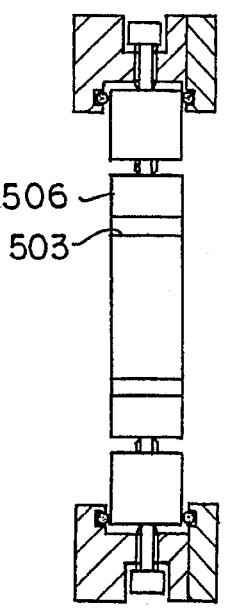
FIG. 68 is a sectional view of one embodiment of the laser apparatus according to the twenty-seventh aspect of the present invention.
Figure 69:
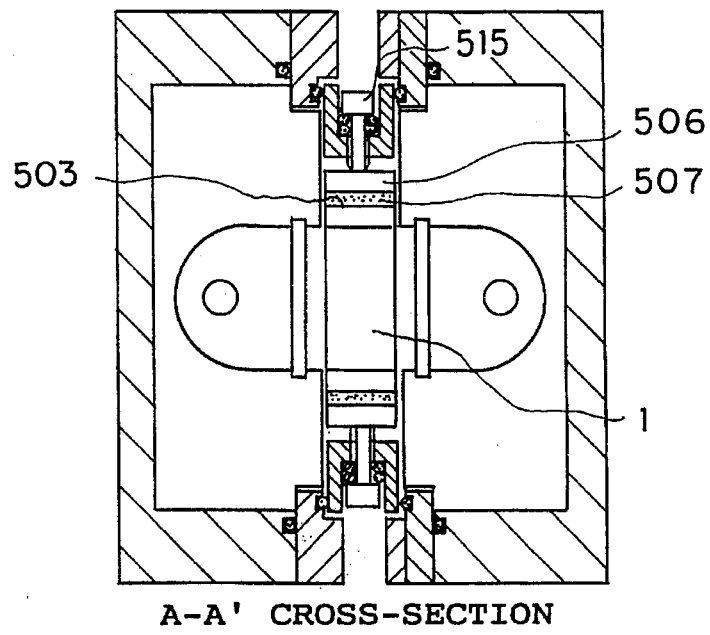
FIG. 69 is a front sectional view of one embodiment of a laser apparatus according to the twenty-eighth aspect of the present invention.
Figure 70:
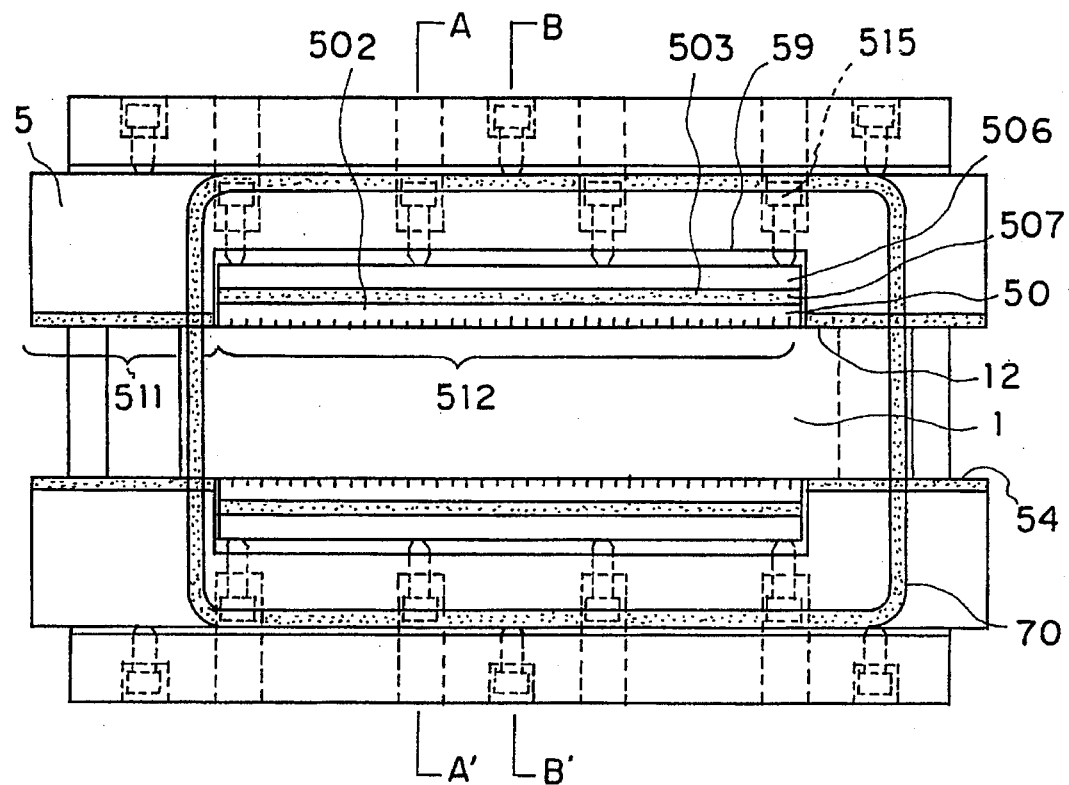
FIG. 70 is a top view of one embodiment of the laser apparatus according to the twenty-eighth aspect of the present invention.
Figure 71:
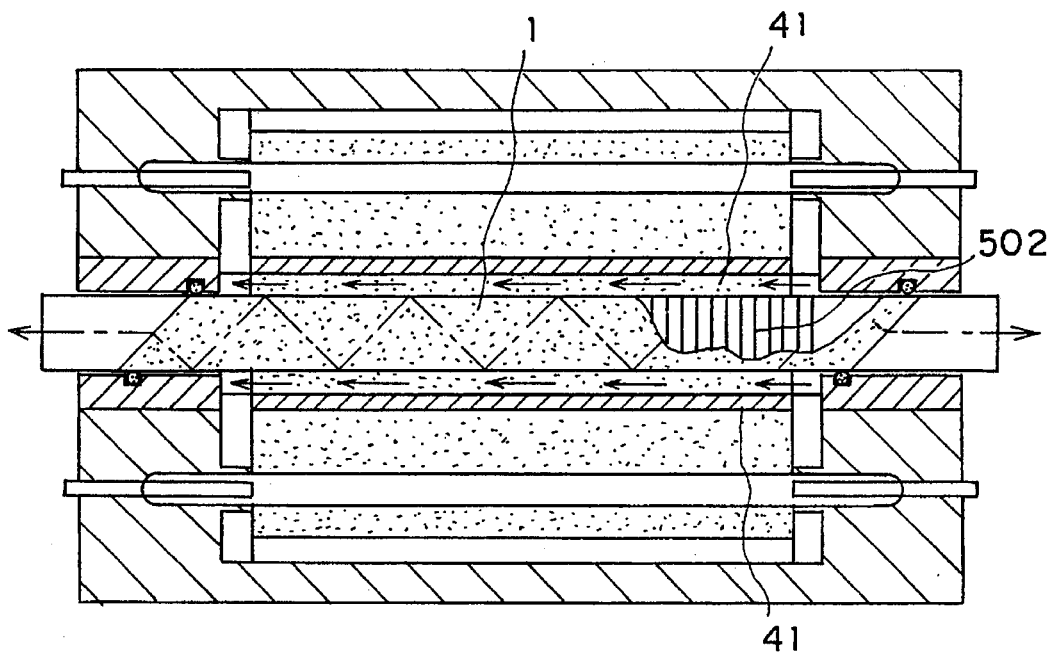
FIG. 71 is a side sectional view of one embodiment of the laser apparatus according to the twenty-eighth aspect of the present invention.
Figure 72:
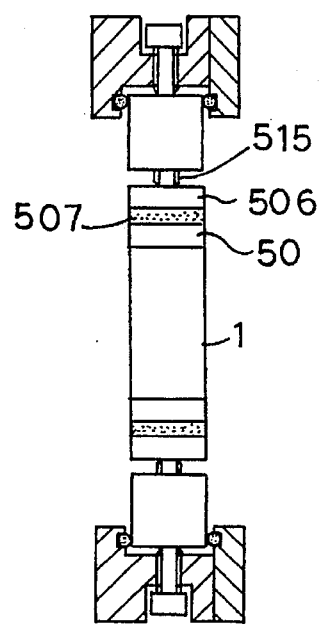
FIG. 72 is a front sectional view of one embodiment of the laser apparatus according to the twenty-eighth aspect of the present invention.

Referring now to FIGS. 66 to 68, a description will be given of one embodiment according to the twenty-seventh aspect of the present invention.

In the embodiment, there is provided a construction to contact a high reflectance body in a supporter with a slab side surface with pressure as shown in FIG. 66. In the construction, a plate body 506 made of stainless is mounted on a back surface 503 of the high reflectance body. This construction enables relaxation of local concentration of contact pressure between the high reflectance body 50 and the slab side surface 12 in the vicinity of a pressing position of a screw 515, and prevention of damage to the high reflectance body 50 due to a distal end of the pressing screw 515.

Alternatively, as the twenty-eighth aspect of the invention, an elastic body 507 such as silicon rubber plate may be interposed between the plate body 506 and the high reflectance body 50 as shown in FIGS. 69 to 72. As a result, it is possible to further enhance relaxation of a contact pressure distribution, and stability of adhesive properties.

Embodiment 21

Figure 73:
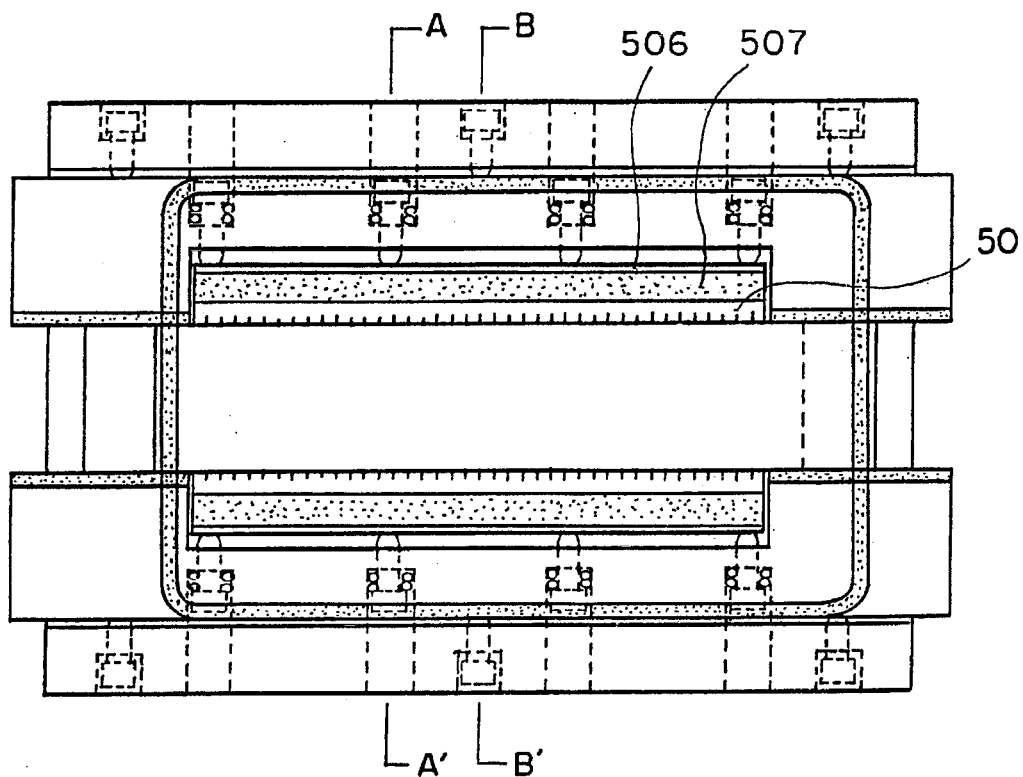
FIG. 73 is a top view of one embodiment of a laser apparatus according to the twenty-ninth aspect of the present invention.
Figure 74:
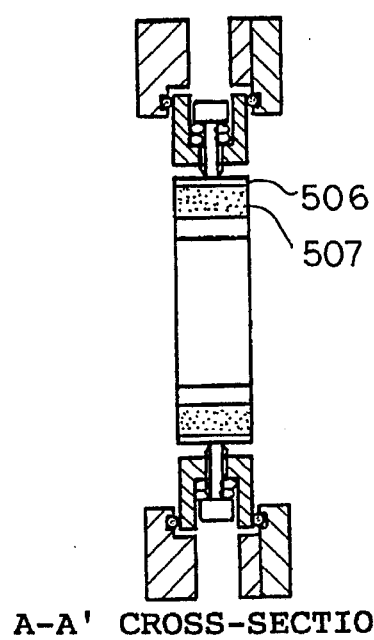
FIG. 74 is a sectional view of one embodiment of the laser apparatus according to the twenty-ninth aspect of the present invention.
Figure 75:
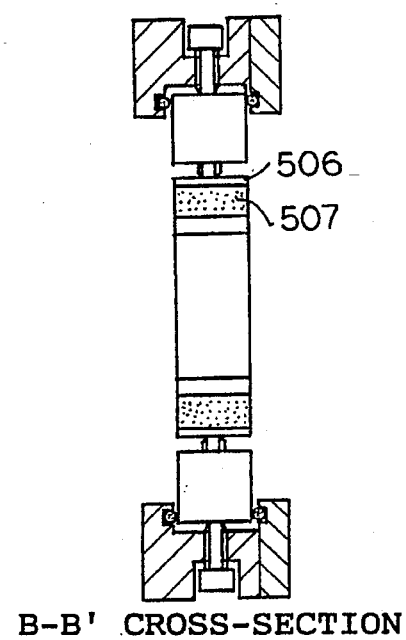
FIG. 75 is a sectional view of one embodiment of the laser apparatus according to the twenty-ninth aspect of the present invention.

Referring now to FIGS. 73 to 75, a description will be given of one embodiment according to the twenty-ninth aspect of the present invention.

In the embodiment, there is provided a construction to contact a high reflectance body 50 in a supporter 5 with a slab side surface with pressure as shown in FIG. 73. In the construction, the high reflectance body 50 is contacted with the slab side surface 12 with pressure through a stainless plate 506 serving as a rigid body having some elasticity and having a thickness in the range of 1 to 2 mm, and a silicon rubber plate 507. Thereby, a smooth distribution is given to a thickness of the silicon rubber, and this compressive force distribution results in a contact pressure distribution. In this configuration, it is possible to provide the optimal contact pressure for each longitudinal position of the slab so as to reduce optical distortion.

Embodiment 22

Figure 76:
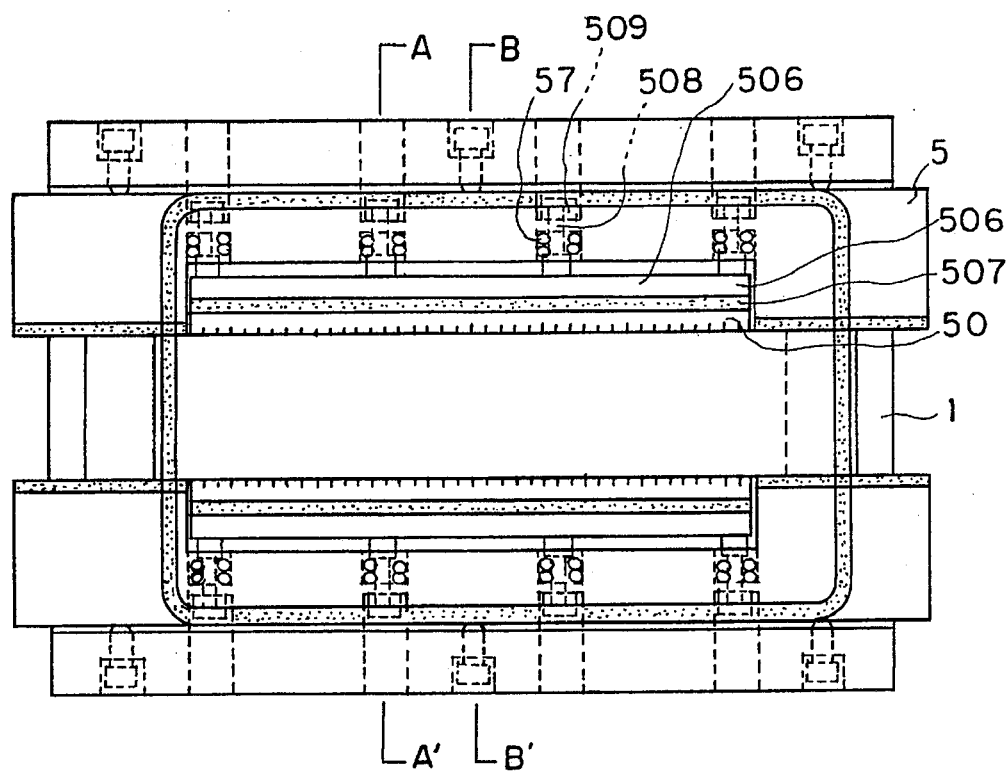
FIG. 76 is a top view of another embodiment of a laser apparatus according to the twenty-seventh aspect and the twenty-eighth aspect of the present invention.
Figure 77:
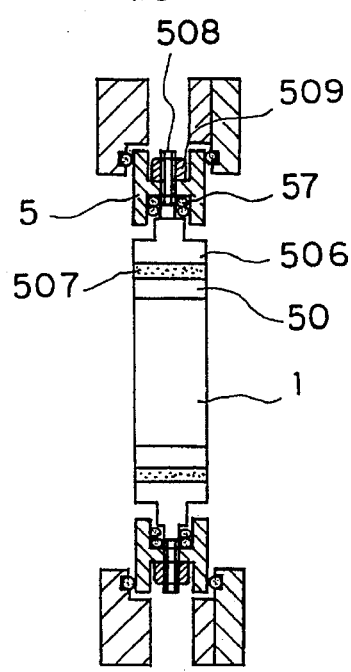
FIG. 77 is a sectional view of another embodiment of a laser apparatus according to the twenty-seventh aspect and the twenty-eighth aspect of the present invention.
Figure 78:
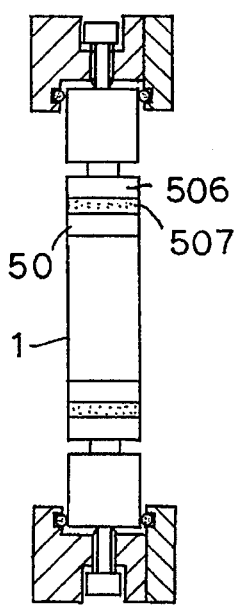
FIG. 78 is a sectional view of another embodiment of a laser apparatus according to the twenty-seventh aspect and the twenty-eighth aspect of the present invention.

Referring now to FIGS. 76 to 78, a description will be given of another embodiment according to the twenty-seventh aspect and the twenty-eighth aspect of the present invention.

For example, in the embodiments 20 and 21, contact pressure of a high reflectance body to a slab side surface is provided by compressive force of a pressing screw 715 provided in a supporter 5, and by a silicon rubber plate 507 interposed between a plate body 506 and a high reflectance body 50. However, as shown in FIG. 76, the contact pressure can also be provided by compressive force of an elastic body (such as O-ring, rubber plate, or spring) 57 interposed between the supporter 5 and the plate body 506. In the embodiment, a male screw 508 passes through the plate body 506, and the male screw 508 is tightened by a nut 509 through the O-ring 57 serving as the elastic body and the supporter 5. In the construction, the rigid body 506 and the high reflectance body 50 can move backward and forward with respect to the supporter 5 according to rotation of the nut 509.

Embodiment 23

Figure 81:
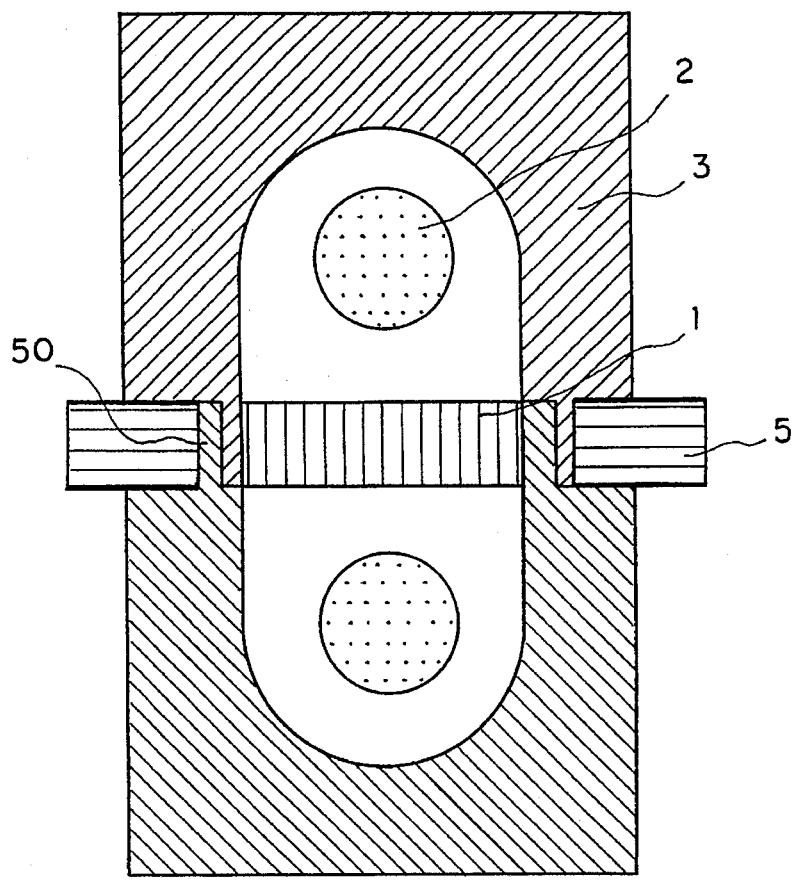
FIG. 81 is a front sectional view of another embodiment of the laser apparatus according to the thirtieth aspect of the present invention.

Referring now to FIGS. 79 to 81, a description will be given of one embodiment according to the thirtieth aspect of the present invention.

The embodiment is characterized by a configuration in which a high reflectance body 50 disposed in a recess of a supporter 5 is integrally provided with a condenser 3. This configuration can reduce the number of component parts, provide a more simplified apparatus, and eliminate a clearance between a condenser 3 and the high reflectance body 50 disposed on a slab side surface 12 so as to eliminate loss of excitation light at the clearance, resulting in an improved excitation efficiency. Further, the condenser may be made of resin having excellent elasticity, or may have an inserting portion for the supporter (i.e., a portion serving as the high reflectance body 50) whose thickness is reduced to enhance elasticity. It is thereby possible to contact the condenser 3 with the slab side surface with pressure.

Embodiment 24

Referring now to FIG. 82, a description will be given of one embodiment according to the thirty-second aspect of the present invention.

In the embodiment, a hybrid resonator serving as a symmetrically positive branch unstable resonator in a width direction and as a stable resonator in a thickness direction is applied to a slab laser medium 1 having little optical distortion described in the embodiments 1 to 23. The resonator includes a cylindrical concave surface mirror 61 having curvature only in a slab width direction, a cylindrical convex surface mirror 62, and a convex lens 63 having refracting power only in the slab thickness direction. Reflection reducing coating is applied to both ends 622 of the cylindrical convex mirror 62, and a laser beam 100 is outputted from both the ends 622.

Since the slab laser medium 1 is provided with a rectangular section having a high aspect ratio, laser oscillation by using a typical stable resonator causes a higher-order transverse mode in the range of tens order to hundreds order in a width direction to provide a larger opening, and causes a divergent angle of tens millimeters rad. It is thereby impossible to provide a high focusing performance. On the other hand, the laser oscillation causes a transverse mode of about tenth order in a thickness direction to provide a smaller opening, and causes a divergent angle of several millimeters rad, resulting in another problem of anisotropy in the focusing performance.

Hence, in the embodiment, there is formed a one-dimensional symmetrically positive branch unstable resonator in the width direction to provide the larger opening so as to provide a beam having a higher focusing performance which is several times diffraction limit. Further, there is formed a lower-order stable resonator in the thickness direction so as to reduce the anisotropy in the focusing performance of the beam. It is generally possible to provide a beam having an excellent focusing performance even in the larger opening by using the unstable resonator. However, the unstable resonator can provide lower tolerance for optical distortion in the resonator such as heat lens than that of the higher-order stable resonator. In the embodiment, constructions as described in the embodiments 1 to 23 are employed to reduce the optical distortion in a slab width direction in case the unstable resonator is employed. It is thereby possible to realize unstable type oscillation which becomes stable even in a high output area, and provide a beam having a higher focusing performance and excellent isotropy.

Embodiment 25

Figure 83:
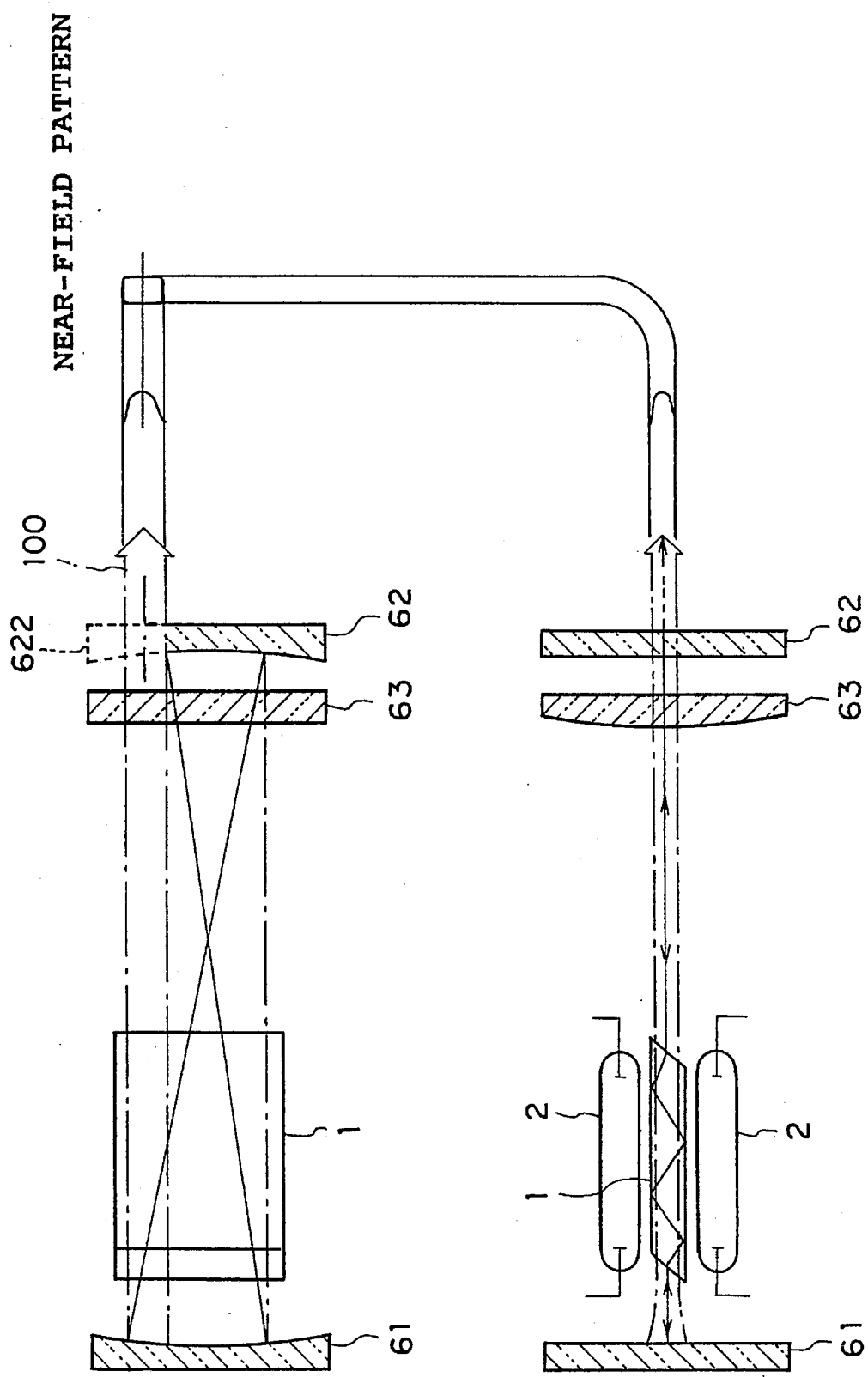
FIG. 83 is a top view and a side view illustrating a resonator of one embodiment of a laser apparatus according to the thirty-third aspect of the present invention.

Referring now to FIG. 83, a description will be given of one embodiment according to the thirty-third aspect of the present invention.

In the embodiment, cylindrical concave surface mirrors 61 and 61 having curvature in a slab width direction are provided to form a single side negative branch unstable resonator. In a one-dimensional symmetrically unstable resonator described in the embodiment 24, beams are separately outputted from both ends in a slab width direction. On the other hand, in the single side negative branch unstable resonator, a solid type beam 100 is outputted from a mirror cut-out portion 622 on the single side in the slab width direction, resulting in a more improved focusing performance. Further, the negative branch unstable resonator can provide higher tolerance for optical distortion than that of the positive unstable resonator described in the embodiment 24, thereby realizing a more stable operation.

Embodiment 26

Figure 84A:
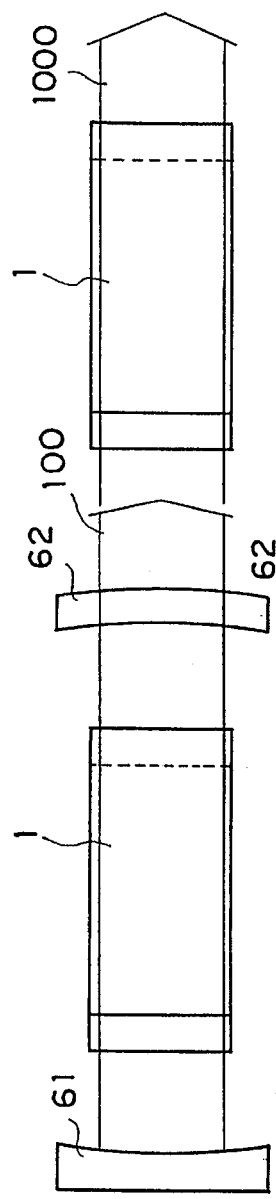
FIG. 84 is a top view and a side view illustrating a resonator and an amplifier of one embodiment of a laser apparatus according to the thirty-fourth aspect of the present invention.
Figure 84B:
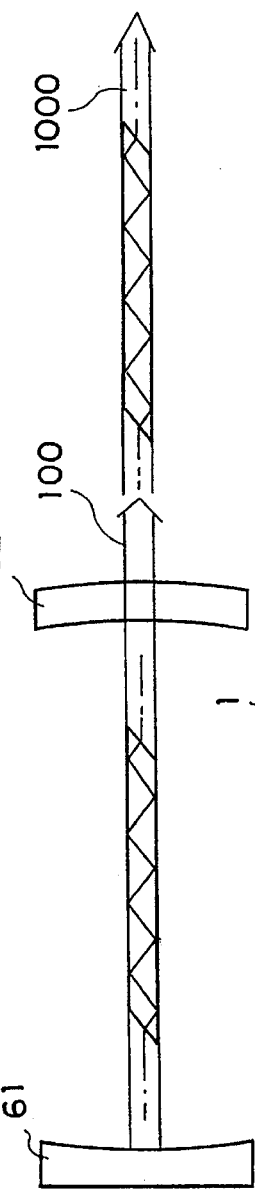

Referring now to FIG. 84, a description will be given of one embodiment according to the thirty-fourth aspect of the present invention.

In the embodiment, a slab laser medium 1 is employed as an amplifier of a laser beam. In the slab laser medium 1, optical distortion is reduced by constructions described in the embodiments 1 to 23. A laser apparatus serving as an oscillator shown on the left side in FIG. 84 is an oscillator including a stable resonator shown in FIG. 6. Another laser apparatus serving as the amplifier shown on the right side in FIG. 84 is combined with no resonator. The laser apparatus on the right side amplifies a beam 100 outputted from the oscillator on the left side as an input beam so as to generate a high power output beam 1000.

In the laser beam amplifying operation, in case the amplifier has optical distortion with an aberration component while the input beam 100 has a high focusing performance, the resultant output beam is affected by the optical distortion so that the focusing performance is degraded. In the embodiment, the optical distortion of the slab medium serving as the amplifying medium is reduced by methods discussed in the above embodiments. It is thereby possible to amplify the input beam without degradation of the focusing performance of the input beam, and provide the high power output beam.

Embodiment 27

Figure 85A:
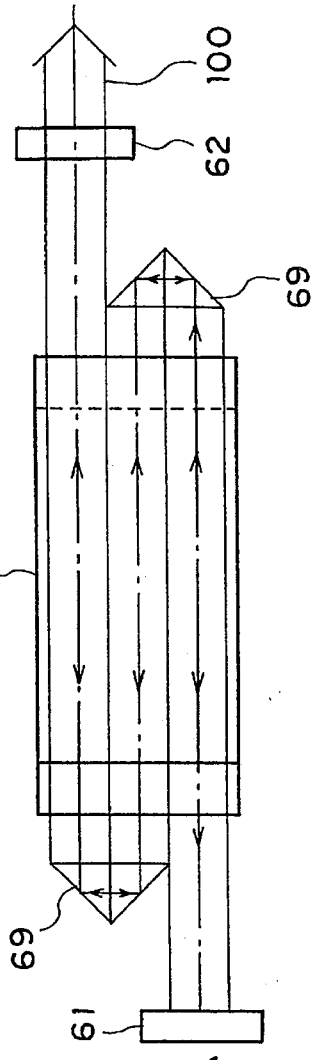
FIG. 85 is a top view and a side view illustrating a resonator of one embodiment of a laser apparatus according to the thirty-fifth aspect of the present invention.
Figure 85B:
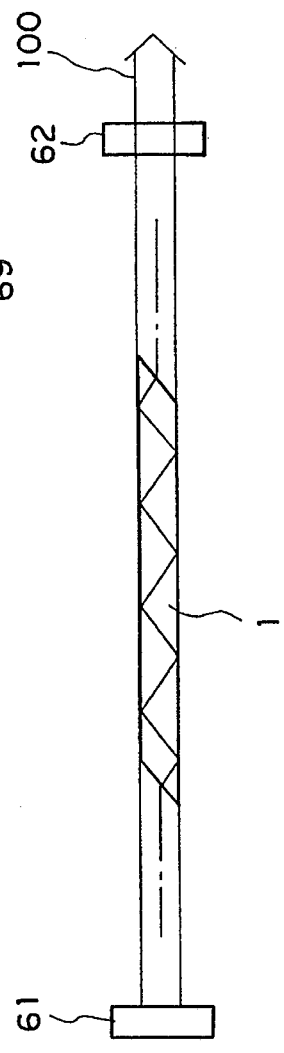
Figure 89:
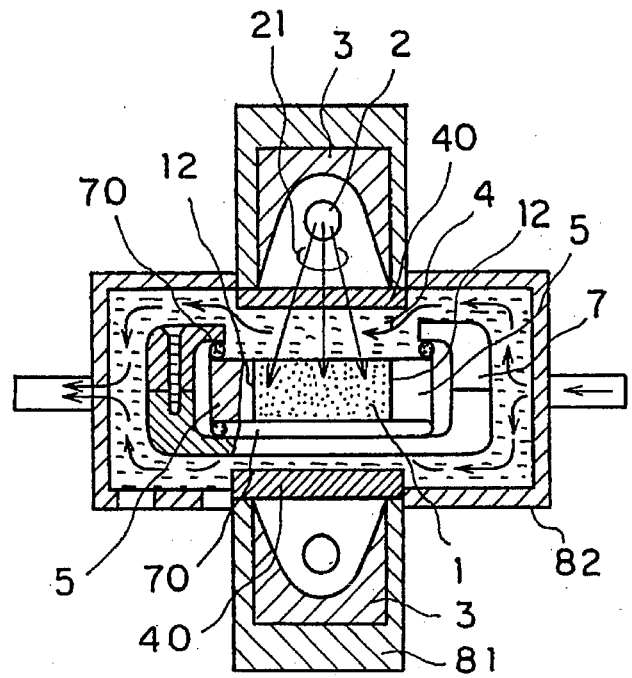
FIG. 89 is a front sectional view showing a conventional laser apparatus.
Figure 90:
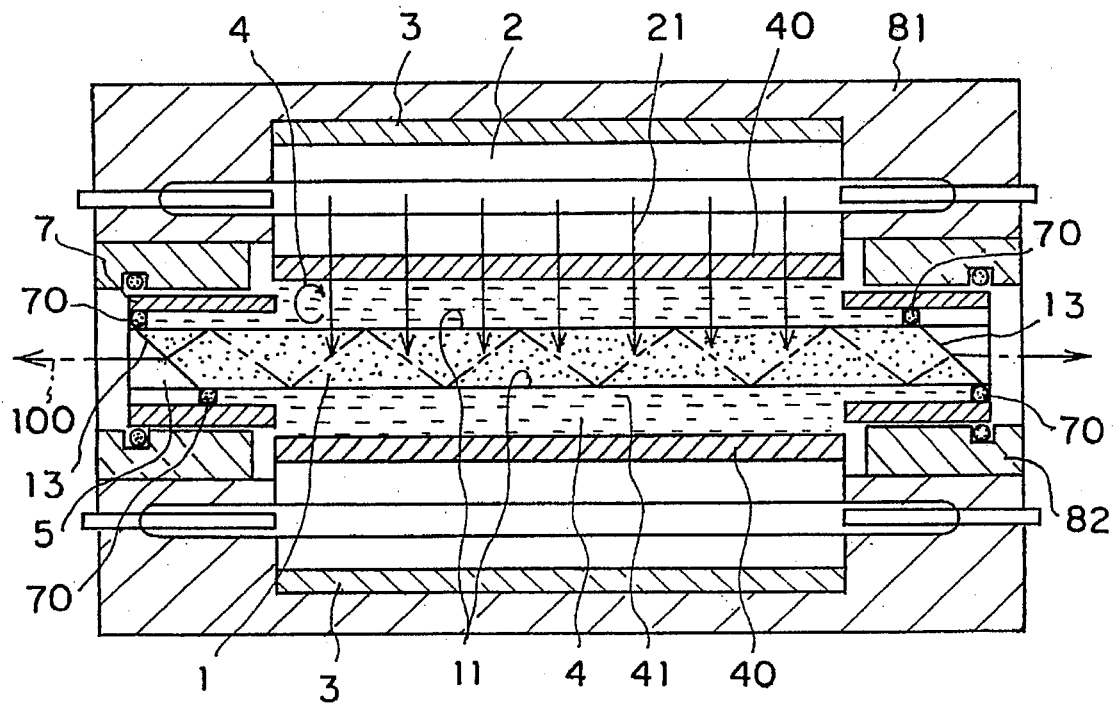
FIG. 90 is a side sectional view showing the conventional laser apparatus.
Figure 91:
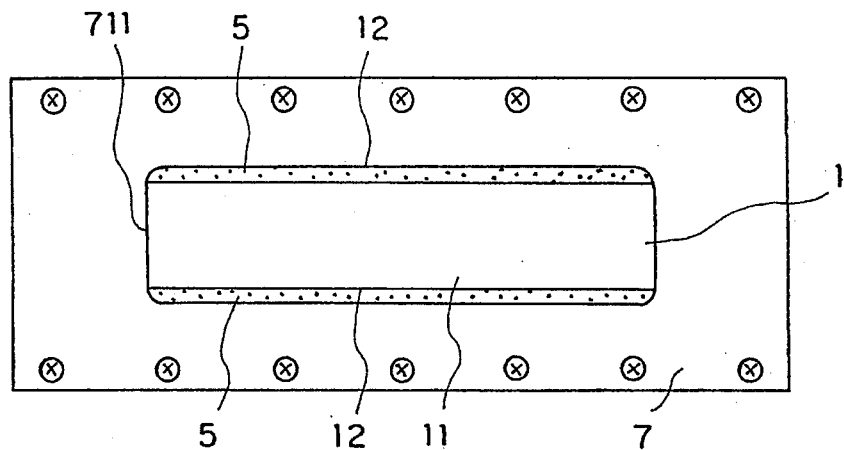
FIG. 91 is a top view showing a laser medium, supporters, and a frame containing the laser medium and the supporters of the conventional laser apparatus.
Figure 92:
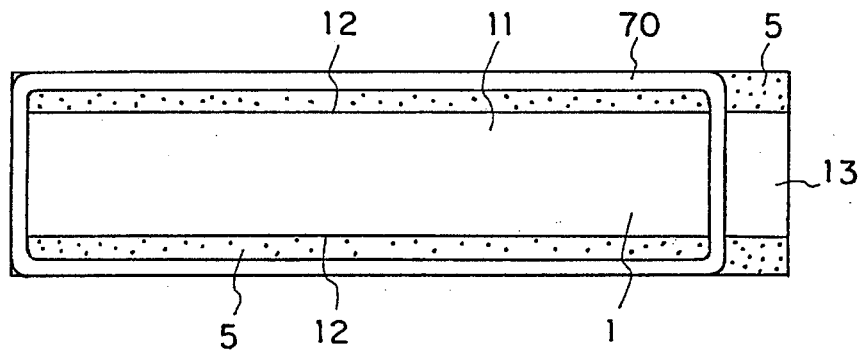
FIG. 92 is a top view showing the laser medium and the supporters of the conventional laser apparatus.
Figure 93:
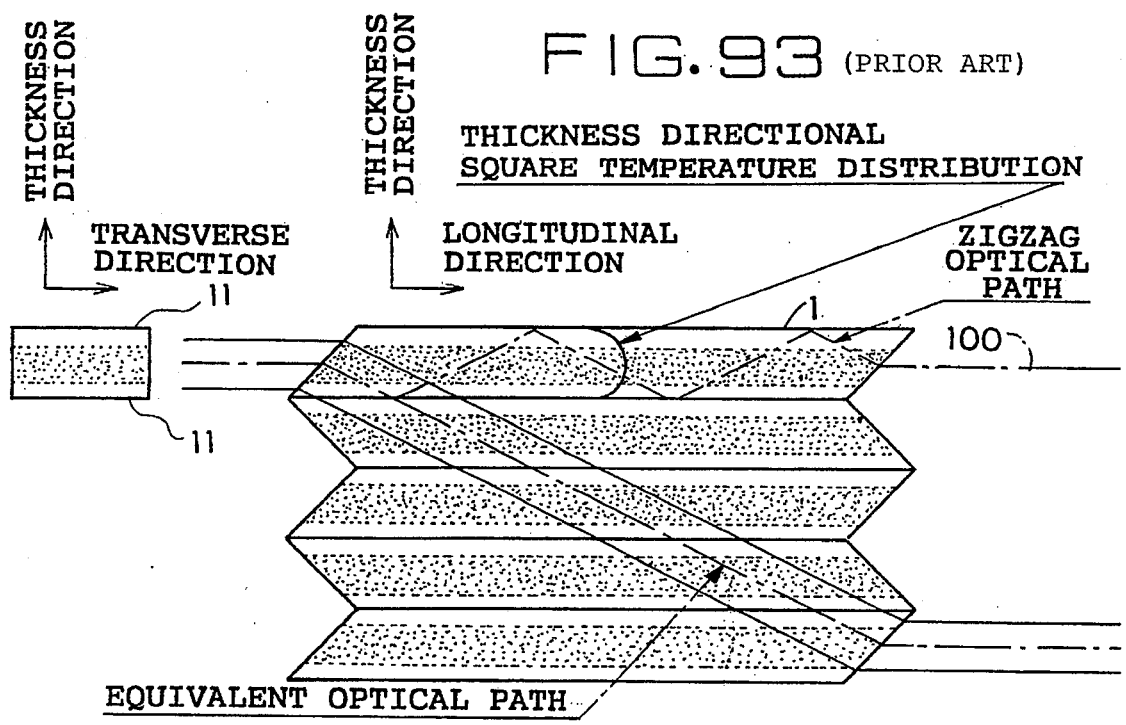
FIG. 93 is a view showing a temperature distribution in a thickness direction of a laser medium, a zigzag optical path, and an equivalent optical path.
Figure 94:
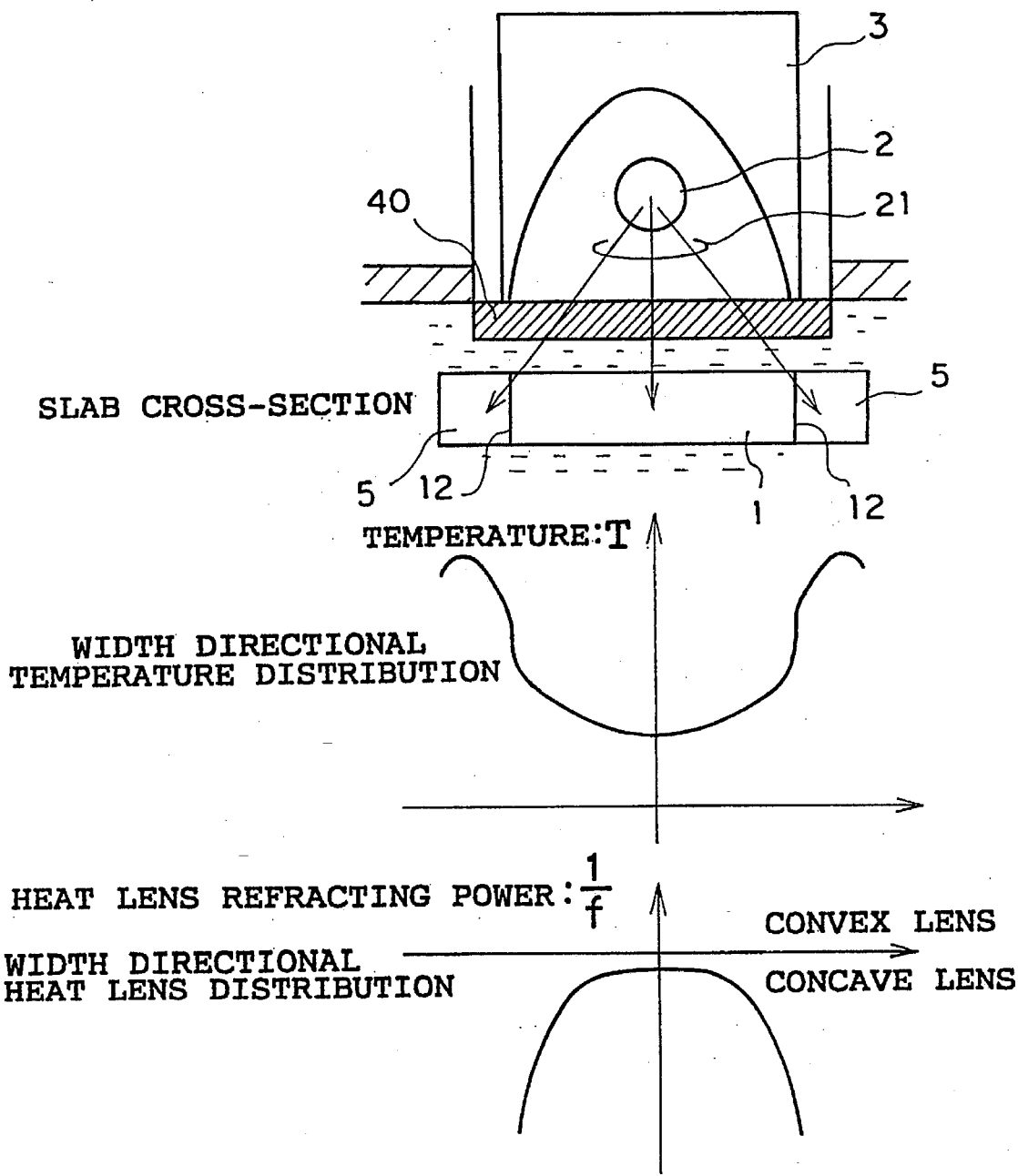
FIG. 94 is a view a temperature distribution and a heat optical distortion in a width direction of the laser medium of the conventional laser apparatus.
Figure 95:
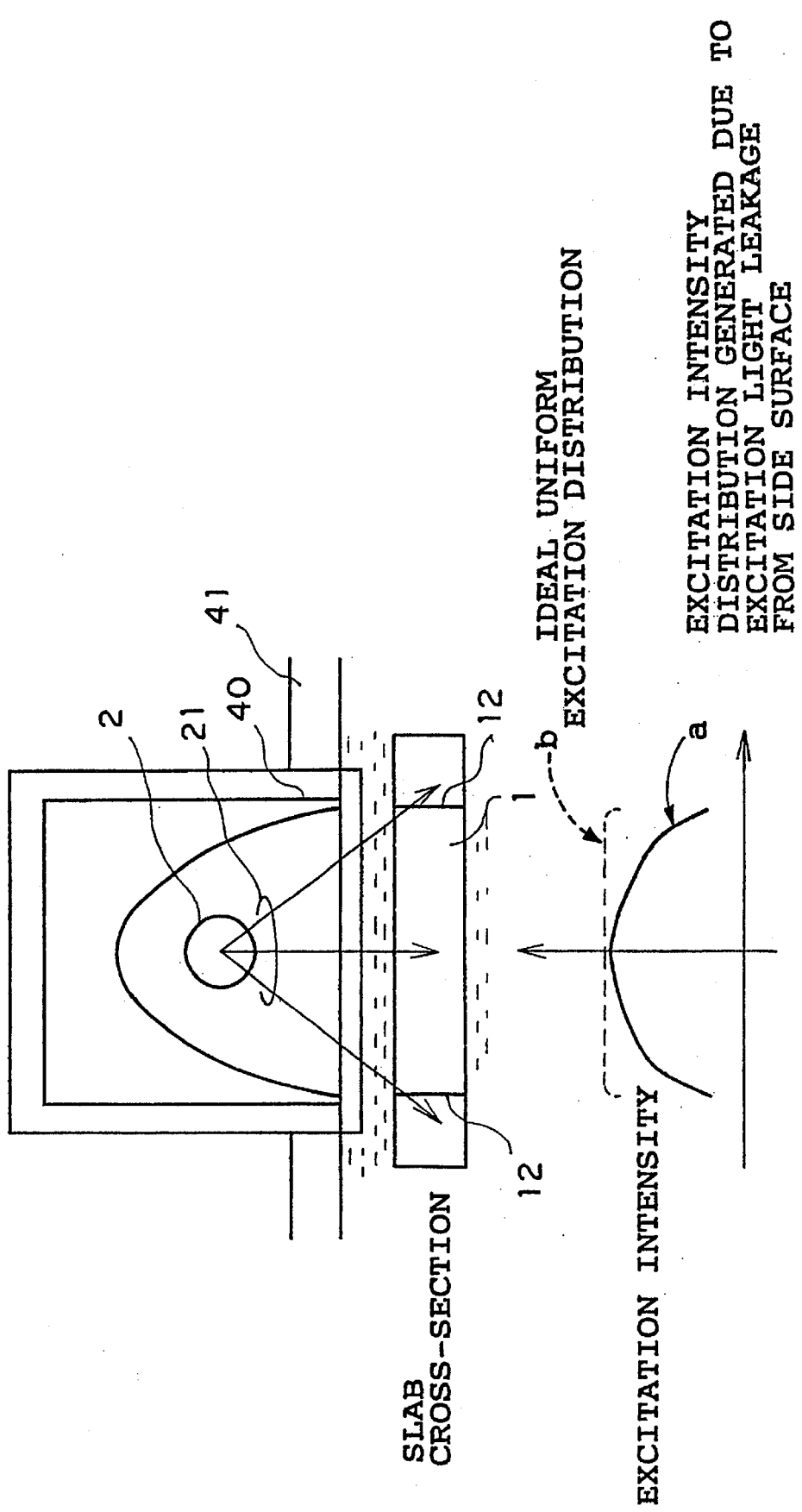
FIG. 95 is a view an excitation intensity distribution in a width direction of the laser medium of another conventional laser apparatus.

Referring now to FIG. 85, a description will be given of one embodiment according to the thirty-fifth aspect of the present invention.

In the embodiment, optical distortion of a slab laser medium 1 is reduced by constructions discussed in the above embodiments 1 to 23, and a rectangular prism 69 is used together with the slab laser medium 1 to form a stable resonator having an optical path which is folded by the rectangular prism 69 in a width direction. By folding the optical path, it is possible to compress an equivalent section in the width direction of the medium 1, and provide a laser beam which is excellent in a focusing performance and isotropy even in a typical stable oscillator which is rotationally symmetric with respect to the optical path formed by a spherical total reflection mirror 61 and a spherical partial reflection mirror 62. In this case, in the folded optical path, an effect due to the optical distortion is superimposed proportional to the number of folding. Accordingly, in order to realize a stable laser operation, there is no other choice to considerably reduce the optical distortion of the laser medium 1 as described in the embodiment.

Embodiment 28

Referring now to FIG. 86, a description will be given of another embodiment according to the thirty-third aspect, the thirty-fourth aspect, and the thirty-fifth aspect of the present invention.

In the embodiment, a laser beam 100 having an excellent focusing performance and excellent isotropy is outputted from a slab laser oscillator including a hybrid resonator disclosed in the embodiment 25. Then, the laser beam 100 is amplified by a slab laser apparatus having the same folded optical path as that described in the embodiment 27 so as to provide a high power beam 1000 which is excellent in the focusing performance and isotropy. The embodiment is characterized in that the input beam 100 and an amplifying medium have equivalent sections which are matched in a width direction as well as in a slab thickness direction, and highly efficient amplification can be made.

Embodiment 29

Referring now to FIG. 87, a description will be given of one embodiment according to the thirty-sixth aspect of the present invention.

In the embodiment, a laser beam 100 is generated from a solid state laser apparatus whose optical distortion is reduced by constructions described in the above embodiments 1 to 23. The laser beam 100 is transferred in the atmosphere, and is condensed by a condensing lens 801 after a direction of the laser beam 100 is changed by a reflection mirror 601. The condensed laser beam is used for machining a work piece 800.

In the embodiment, the laser beam to be condensed is generated from the slab laser medium 1 whose optical distortion is reduced, and the laser beam is excellent in stability and has a high focusing performance. Therefore, the beam at a condensing position can have an extremely small spot diameter and a deep depth of focus so as to realize high quality laser machining for the work piece in high efficiency. In particular, the focusing performance of the laser beam in the embodiment is constant irrespective of output. This eliminates the need for adjustment of a condensing lens position for each output level which is conventionally required, and considerably reduces a time required for maintenance.

The embodiment has been described with reference to the solid state laser apparatus employing the laser oscillator including a stable resonator described in the embodiment 1. However, it is possible to provide higher performance machining by using a solid state laser apparatus described in another embodiment which is more excellent in a beam focusing performance.

Embodiment 30

Referring now to FIG. 88, a description will be given of one embodiment according to the thirty-seventh aspect of the present invention.

In the embodiment, a laser beam 100 is generated from a solid state laser apparatus whose optical distortion is reduced by constructions described in the above embodiments 1 to 23. The laser beam 100 enters an end 6021 of an optical fiber 602 through a condensing lens 603, and is transferred through the fiber. Thereafter, the beam exits an exit end 6022, and is condensed by condensing lens 604 and 801. The condensed laser beam is used for machining a work piece 800.

In the embodiment, the laser beam to be condensed is generated from the slab laser medium 1 whose optical distortion is reduced, and is excellent in stability and has a high focusing performance, and the laser beam enters the fiber end surface. Therefore, the beam at a condensing position of the fiber entrance end surface can have an extremely small spot diameter and a deep depth of focus so as to stably and efficiently perform connection of the beam to the fiber and maintain high beam quality even after fiber transmission. As set forth above, the laser beam even after being emitted from the fiber has the high focusing performance, the beam at the condensing position for laser machining has the extremely small spot diameter and the deep depth of focus, and high quality laser machining for the work piece can be realized in high efficiency. In particular, the focusing performance of the laser beam in the embodiment is constant irrespective of output. This eliminates the need for adjustment of a machining lens position for each output level which is conventionally required, and considerably reduces a time required for maintenance.

The embodiment has been described with reference to the solid state laser apparatus employing a laser oscillator including a stable resonator described in the embodiment 1. However, it is possible to provide higher performance machining by using a solid state laser apparatus described in another embodiment which is more excellent in a beam focusing performance.

As set forth above, according to the first aspect of the present invention, the irregular construction is provided in the supporter at the surface opposed to the slab laser or at the back surface, and the irregular construction contains substances such as coolant (for example, water) having low absorbance, low heat generation and a sufficient cooling effect so as to optimize the thermal boundary condition of the side surface of the laser medium. It is thereby possible to prevent temperature distributions from occurring in the width direction and in the longitudinal direction of the laser medium and optical distortion from occurring along with the temperature distribution, and to output a laser beam having an excellent condensing performance in high efficiency and stably.

According to the second aspect of the present invention, the supporter is made of the composite material containing the plurality of different materials. It is thereby possible to optimize the thermal boundary condition between the side surface of the laser medium and the supporter, and to prevent temperature distributions from occurring in the width direction and in the longitudinal direction of the laser medium and optical distortion from occurring along with the temperature distribution. As a result, there is an effect in that the laser beam having an excellent condensing performance can be output in high efficiency and stably.

According to the third aspect of the present invention, the supporter is disposed on the side surface of the slab laser medium, and is contacted with the side surface of the laser medium with pressure. It is thereby possible to enhance water-tightness between the side surface of the laser medium and the supporter and realize stable laser operation with no water leakage, and to enhance reliability and stabilize the thermal boundary condition of the side surface of the laser medium so as to stabilize an optical characteristic of the laser medium. As a result, there is an effect in that a laser operation having excellent stability in beam quality can be realized.

According to the fourth aspect of the present invention, the supporter is contacted with the side surface of the laser medium with pressure. It is thereby possible to further stabilize an effect obtained by providing the irregular construction for the supporter inner surface or forming the supporter by a plurality of materials, that is, an effect to optimize the thermal boundary condition between the laser medium side surface and the supporter, and improve water-tightness. As a result, there are effects in that reliability can be enhanced, and a laser operation having excellent stability in beam quality can be realized.

According to the fifth aspect of the present invention, it is possible to reduce loss of excitation light on the side surface of the laser medium, and realize highly efficient laser oscillation. The high reflectance body and the side surface of the laser medium can be joined together without any inclusion such as adhesive. It is possible to reduce heat generation on the interface and optical distortion occurring along with the heat generation, and maintain high water-tightness. As a result, there is an effect in that a stable laser operation with no water leakage can be realized.

According to the sixth aspect of the present invention, it is possible to combine some of a configuration to, for example, provide the irregular construction for the supporter inner surface, a configuration to contact the supporter with the laser medium with pressure, and a configuration to dispose the high reflectance body in the recess of the supporter. It is thereby possible to concurrently realize a high optical characteristic and high beam quality, high reliability because of improved water-tightness, and highly efficient laser oscillation and the like as a synergistic effect of the combination. In particular, the configuration to dispose the high reflectance body in the recess of the supporter can be combined with the configuration to contact the supporter with the laser medium with pressure, resulting in a synergistic effect to provide high efficiency while maintaining the high water-tightness. In case the high reflectance body is disposed in the recess of the supporter, the high reflectance body is preferably contacted with the laser medium with pressure. However, in this case, pressing force to the high reflectance body reacts in the direction to separate the supporter from the laser medium. Therefore, it is necessary to press the supporter onto the laser medium against the reaction in order to maintain the high water-tightness.

According to the seventh aspect of the present invention, the groove is provided to extend in the slab medium thickness direction, and the concave portion of the groove contains substances such as coolant (for example, water) having low absorbance, low heat generation and a sufficient cooling effect. It is thereby possible to optimize the thermal boundary condition of the laser medium side surface, and prevent temperature distributions from occurring in the width direction and in the longitudinal direction of the laser medium and optical distortion from occurring along with the temperature distribution. As a result, a laser beam having an excellent condensing performance can be outputted in high efficiency and stably.

According to the eighth aspect of the present invention, a distribution in the vertical direction or in the longitudinal direction of the laser medium is provided for all or any one of the area, the pitch, and the depth of the concave portion of the supporter. The distribution provides the optimal thermal boundary condition at any positions of the laser medium side surface. It is thereby possible to prevent temperature distributions from occurring in each direction of the laser medium and optical distortion from occurring along with the temperature distribution. As a result, there is an effect in that a laser beam having an excellent condensing performance can be outputted in high efficiency and stably.

According to the ninth aspect of the present invention, the laser medium is cooled by the coolant filled to contact the surface, and the pressure difference in the coolant generates the flow of the coolant in the concave portion in the laser medium facing surface of the supporter. It is thereby possible to optimize the cooling condition on the contact interface between laser medium side surface and the supporter, and prevent temperature distributions from occurring in the width direction and in the longitudinal direction of the laser medium and optical distortion from occurring along with the temperature distribution. As a result, there is an effect in that the laser beam having an excellent condensing performance can be outputted in high efficiency and stably.

According to the tenth aspect of the present invention, the groove is provided in the supporter at the inner surface opposed to the laser medium to extend diagonally, and generates the flow of the coolant in the concave portion. It is thereby possible to optimize the cooling condition on the contact interface between the laser medium side surface and the supporter, and prevent temperature distributions from occurring in the width direction and in the longitudinal direction of the laser medium and optical distortion from occurring along with the temperature distribution. As a result, there is an effect in that the laser beam having an excellent condensing performance can be outputted in high efficiency and stably.

According to the eleventh aspect of the present invention, the supporter is provided to have the high reflectance to the excitation light. It is thereby possible to perform highly efficient excitation, provide high laser oscillation efficiency, prevent reduction of excitation intensity in the vicinity of the laser medium side surface, and reduce generation of optical distortion. As a result, there is an effect in that the laser beam having an excellent condensing performance can be outputted in high efficiency and stably.

According to the twelfth aspect of the present invention, the supporter is contacted with the laser medium with pressure through the elastic body. It is thereby possible to absorb mechanical deformation of the laser medium and the supporter, relax local stress concentration on the laser medium side surface so as to reduce stress deformation, and output the laser beam having an excellent condensing performance in high efficiency and stably. In addition, it is possible to enhance adhesive properties between the laser medium side surface and the supporter so as to further improve water-tightness, resulting in a stable laser operation with no water leakage. Moreover, it is possible to improve reliability, and further stabilize the thermal boundary condition of the laser medium side surface so as to stabilize an optical characteristic of the laser medium. As a result, there is an effect in that a laser operation having excellent stability in beam quality can be realized.

According to the thirteenth aspect of the present invention, the elastic body includes the material which is transparent to the excitation light. It is thereby possible to reduce heat generation due to absorption of the excitation light, and reduce an increased temperature of the laser medium side surface and optical distortion generated along with the increased temperature. As a result, there is an effect in that the laser beam having an excellent condensing performance can be outputted in high efficiency and stably.

According to the fourteenth aspect of the present invention, the elastic body is adhered to the supporter. It is thereby possible to facilitate assembly and disassembly of the laser medium and the supporter, facilitate maintenance of the apparatus, and improve water-tightness so as to realize a stable laser operation with no water leakage, resulting in an improved reliability.

According to the fifteenth aspect of the present invention, the elastic body is disposed only in the vicinity of the seal position for the coolant between the laser medium and the supporter, and no inclusion is interposed between the laser medium and the supporter corresponding to the excitation area. It is thereby possible to reduce heat generation on the interface between the laser medium side surface and the supporter, and reduce an increased temperature of the laser medium side surface and optical distortion generated along with the increased temperature. As a result, there is an effect in that a laser beam having an excellent condensing performance can be outputted in high efficiency and stably.

According to the sixteenth aspect of the present invention, the substance having the elasticity is filled into the clearance between the chamfer of the laser medium corner portions and the elastic body. It is thereby possible to improve water-tightness so as to realize a stable laser operation without any water leakage, resulting in improved reliability.

According to the seventeenth aspect of the present invention, the chamfer dimension of the laser medium corner portions in the vicinity of the seal position is set at 0.3 mm or less. It is thereby possible to further improve water-tightness so as to realize a stable laser operation without any water leakage, resulting in improved reliability.

According to the eighteenth aspect of the present invention, the screw hole is provided in the frame at the position opposed to the supporter to extend substantially perpendicular to the back surface of the supporter, and the distal end of the screw member fitted into the screw hole pushes the back surface of the supporter to contact the supporter with the laser medium side surface with pressure. It is thereby possible to adjust contact pressure between the supporter and the laser medium side surface by rotating the screw externally to the laser medium head, and easily provide the optimal contact pressure having excellent water-tightness and less optical distortion so as to realize a stable laser operation without any water leakage, resulting in improved reliability. As a result, there is an effect in that a laser operation having excellent stability in beam quality can be realized.

According to the nineteenth aspect of the present invention, the elastic body is interposed between the supporter and the distal end of the screw member. It is thereby possible to stabilize contact pressure and facilitate adjustment of the contact pressure. Consequently, water-tightness between the laser medium side surface and the supporter can be further improved so as to realize a stable laser operation without any water leakage, resulting in improved reliability. In addition, it is possible to further stabilize the thermal boundary condition of the laser medium side surface so as to stabilize an optical characteristic of the laser medium. As a result, there is an effect in that a laser operation having excellent stability in beam quality can be realized.

According to the twentieth aspect of the present invention, the plate body is disposed on the back surface of the supporter. It is thereby possible to relax the contact pressure distribution and reduce optical distortion so as to output the laser beam having an excellent condensing performance in high efficiency and stably. In addition, it is possible to prevent damage to the supporter, resulting in an effect of improved reliability.

According to the twenty-first aspect of the present invention, the elastic body is disposed between the supporter and the plate body. It is thereby possible to further relax the contact pressure distribution so as to further reduce optical distortion, and output a laser beam having an excellent condensing performance in high efficiency and stably and stabilize adhesive properties. As a result, there is an effect in that a laser operation having excellent stability in beam quality can be realized.

According to the twenty-second aspect of the present invention, the slight elasticity is provided for the plate body disposed on the back surface of the supporter. It is thereby possible to control the contact pressure distribution so as to provide the optimal pressure distribution having excellent water-tightness and less optical distortion. Further, it is possible to realize a stable laser operation without any water leakage, improve reliability, and realize a laser operation having excellent stability in beam quality.

According to the twenty-third aspect of the present invention, the member having the high reflectance to excitation light is disposed in the recess of the supporter, and is contacted with the laser medium side surface with pressure. It is thereby possible to enhance adhesive properties, and provide a uniform and stable thermal boundary condition of the laser medium side surface so as to stabilize an optical characteristic of the laser medium. As a result, there is an effect in that a laser operation having excellent stability in beam quality can be realized.

According to the twenty-fourth aspect of the present invention, the elastic body is provided for the back surface of the member having high reflectance to excitation light, and the elasticity of the elastic body contacts the high reflectance member with the laser medium side surface with pressure. It is thereby possible to absorb mechanical deformation of the laser medium, the high reflectance body and the supporter, and relax local stress concentration on the laser medium side surface so as to reduce stress deformation. As a result, there is an effect in that a laser beam having an excellent condensing performance can be outputted in high efficiency and stably. Further, it is possible to enhance adhesive properties between the laser medium side surface and the high reflectance body, and further stabilize the thermal boundary condition of the laser medium side surface so as to stabilize an optical characteristic of the laser medium. As a result, there is an effect in that a laser operation having excellent stability in beam quality can be realized.

According to the twenty-fifth aspect of the present invention, the screw hole is provided in the supporter to extend substantially perpendicular to the back surface of the high reflectance body, and the distal end of the male screw fitted into the screw hole pushes the back surface of the high reflectance body so as to contact the high reflectance member with the laser medium side surface with pressure. It is thereby possible to adjust contact pressure between the supporter and the laser medium side surface by rotating the screw externally to the laser medium head, and easily provide the optimal contact pressure having less optical distortion. As a result, there is an effect in that a laser operation having excellent stability in beam quality can be realized.

According to the twenty-sixth aspect of the present invention, the elastic body is interposed between the member having the high reflectance to excitation light and the distal end of the screw member. It is thereby possible to stabilize contact pressure, facilitate adjustment thereof, and improve adhesive properties between the laser medium side surface and the high reflectance body so as to further stabilize the thermal boundary condition of the laser medium side surface, resulting in stabilization of an optical characteristic of the slab medium.

According to the twenty-seventh aspect of the present invention, the plate body is disposed on the back surface of the member having high reflectance to excitation light. It is thereby possible to relax the contact pressure distribution so as to reduce optical distortion and output a laser beam having an excellent condensing performance in high efficiency and stably. Further, there is an effect in that damage to the high reflectance body can be prevented, resulting in improved reliability.

According to the twenty-eighth aspect of the present invention, the elastic body is interposed between the member having high reflectance to excitation light and the plate body. It is thereby possible to further relax the contact pressure distribution so as to further reduce optical distortion. Further, it is possible to output a laser beam having a further excellent condensing performance in high efficiency and stably, and stabilize adhesive properties. As a result, there is an effect in that a laser operation having excellent stability in beam quality can be realized.

According to the twenty-ninth aspect of the present invention, the slight elasticity is provided for the plate body disposed on the back surface of the member having high reflection to excitation light. It is thereby possible to control the contact pressure distribution so as to provide the optimal pressure distribution having less optical distortion. As a result, there is an effect in that a laser operation having excellent stability in beam quality can be realized.

According to the thirtieth aspect of the present invention, the member having the high reflectance to the excitation light is disposed in the recess of the supporter, and the high reflectance member is integrally formed with the condenser. It is thereby possible to reduce the number of component parts so as to provide an inexpensive and simple laser apparatus, and eliminate the gap between the condenser and the supporter so as to reduce loss of the excitation light, resulting in an effect to realize highly efficient laser oscillation.

According to the thirty-first aspect of the present invention, there is an effect in that the stable resonator can highly efficiently generate a laser beam having less distortion and an excellent condensing performance from the laser medium whose optical distortion is reduced.

According to the thirty-second aspect of the present invention, there is an effect in that the laser medium whose optical distortion is reduced can generate a laser beam having less distortion, excellent isotropy in the sectional form, and an excellent condensing performance.

According to the thirty-third aspect of the present invention, there is an effect in that the laser medium whose optical distortion is reduced can generate a laser beam having less distortion, and more excellent isotropy in the sectional form.

According to the thirty-fourth aspect of the present invention, the laser medium whose optical distortion is reduced can amplify the laser beam emitted from different solid state laser apparatus without distortion. As a result, there is an effect in that a high condensing and high power laser beam can be easily provided.

According to the thirty-fifth aspect of the present invention, the optical path folded in the width direction of the laser medium can provide the equivalent medium section having less distortion and excellent isotropy in the sectional form from the laser medium whose optical distortion is reduced. As a result, there is an effect in that a high condensing and high power laser beam can be generated at high efficiency in laser oscillation or an amplifying operation.

According to the thirty-sixth aspect of the present invention, the laser machining is performed by condensing the laser beam generated from the solid state laser apparatus by the condensing optical system. Thus, the laser beam generated from the laser medium whose optical distortion is reduced has less distortion and excellent isotropy in the sectional form, and generates the small spot diameter and the deep depth of focus with excellent stability at the condensing position. As a result, there is an effect in that high quality laser machining can be realized at high efficiency.

According to the thirty-seventh aspect of the present invention, the laser machining is performed by introducing the laser beam generated from the solid state laser apparatus through the optical fiber. Therefore, the laser beam generated from the laser medium whose optical distortion is reduced has less distortion and excellent isotropy in the sectional form, and generates the small spot diameter and the deep depth of focus with excellent stability in condensation to the fiber entrance end surface. Thus, it is possible to stably and highly efficiently perform connection of the laser beam to the fiber and maintain high beam quality even after fiber transmission. Further, it is possible to generate the small spot diameter and the deep depth of focus with the excellent stability at the machining condensing position. As a result, there is an effect in that high quality laser machining can be realized efficiently.

While preferred embodiments of the invention have been described using specific terms, such description is for illustrative purposes only, and it is to be understood that changes and variations may be made without departing from the spirit or scope of the following claims.

What is claimed is:

1. A solid state laser apparatus comprising:
   a laser medium having a rectangular plate form including upper and lower smooth surfaces extending substantially parallel to each other, right and left side surfaces extending substantially perpendicular to said smooth surfaces, and back and forth end surfaces for entrance/exit of a laser beam;
   a pair of supporters disposed on the right and left sides of said laser medium;
   a frame integrally containing said supporters;
   a light source exciting said laser medium;
   a condenser to condense excitation light from said light source for irradiation of said laser medium; and
   cooling means for cooling said laser medium by at least one of said smooth surfaces thereof;
   wherein an irregularity is formed in said supporter at an inner surface opposed to said side surfaces of said laser medium or at a back surface, and a cooling material is filled into a clearance of said irregularity.

2. A solid state laser apparatus according to claim 1, wherein a groove in a thickness direction of said laser medium is provided in an inner surface of said supporter to form said irregularity.

3. A solid state laser apparatus according to claim 1, wherein a distribution in a longitudinal direction or in a vertical direction of said laser medium is provided for a pitch, an area, or a depth of said irregularity.

4. A solid state laser apparatus according to claim 1, wherein cooling of said laser medium is performed by coolant filled to contact each smooth surface, and a pressure difference is provided between coolants on the upper and lower sides of said laser medium so as to generate a flow of said coolant in a concave portion in an inner surface of said supporter.

5. A solid state laser apparatus according to claim 1, wherein said irregularity in the inner surface of said supporter is formed by a groove extending diagonally to a thickness direction of said laser medium.

6. A solid state laser apparatus according to claim 1, wherein said supporter has high reflectance to excitation light.

7. A solid state laser apparatus comprising:
   a laser medium having a rectangular plate form including upper and lower smooth surfaces extending substantially parallel to each other, right and left side surfaces extending substantially perpendicular to said smooth surfaces, and back and forth end surfaces for entrance/exit of a laser beam;
   a pair of supporters disposed on the right and left sides of said laser medium;
   a frame integrally containing said supporters;
   a light source exciting said laser medium;
   a condenser to condense excitation light from said light source for irradiation of said laser medium; and
   cooling means for cooling said laser medium by at least one of said smooth surfaces thereof;
   wherein said pair of supporters is made of a plurality of different materials.

8. A solid state laser apparatus comprising:
   a laser medium having a rectangular plate form including upper and lower smooth surfaces extending substantially parallel to each other, right and left side surfaces extending substantially perpendicular to said smooth surfaces, and back and forth end surfaces for entrance/exit of a laser beam;
   a pair of supporters disposed on the right and left sides of said laser medium;
   a frame integrally containing said supporters;
   a light source exciting said laser medium;
   a condenser to condense excitation light from said light source for irradiation of said laser medium;
   cooling means for cooling said laser medium by at least one of said smooth surfaces thereof; and
   means for contacting with pressure said supports with the side surfaces of said laser medium to stabilize a thermal boundary condition at the side surfaces of said laser medium.

9. A solid state laser apparatus according to claim 8, wherein said supporter contacts said laser medium with pressure through an elastic body.

10. A solid state laser apparatus according to claim 9, wherein said elastic body is made of a material which is transparent to excitation light.

11. A solid state laser apparatus according to claim 9, wherein said elastic body is adhered to the supporter.

12. A solid state laser apparatus according to claim 8, wherein no inclusion is interposed between an excitation area of said laser medium and a supporter.

13. A solid state laser apparatus according to claim 8, wherein a substance having elasticity is filled into a clearance between a chamfer portion of a corner portion in the vicinity of a seal position of said laser medium and said elastic body.

14. A solid state laser apparatus according to claim 8, wherein a chamfer dimension of a corner portion in the vicinity of a seal position of said laser medium is set at 0.3 mm or less.

15. A solid state laser apparatus according to claim 8, wherein a screw hole is provided in said frame at a position opposed to the supporter to extend substantially perpendicular to a back surface of said supporter, and a distal end of a screw member fitted into the screw hole pushes said back surface of said supporter to contact said supporter with said laser medium with pressure.

16. A solid state laser apparatus according to claim 15, wherein an elastic body is provided between said distal end of said screw member and said back surface of said supporter.

17. A solid state laser apparatus according to claim 15, wherein a plate body is disposed on a back surface of said supporter.

18. A solid state laser apparatus according to claim 17, wherein an elastic body is disposed between said supporter and a plate body.

19. A solid state laser apparatus according to claim 18, wherein said plate body is made of a material having extremely lower elasticity than that of said elastic body.

20. A solid state laser apparatus comprising:
a laser medium having a rectangular plate form including upper and lower smooth surfaces extending substantially parallel to each other, right and left side surfaces extending substantially perpendicular to said smooth surfaces, and back and forth end surfaces for entrance/exit of a laser beam;
a pair of supporters disposed on the right and left sides of said laser medium;
a frame integrally containing said supporters;
a light source exciting said laser medium;
a condenser to condense excitation light from said light source for irradiation of said laser medium; and
cooling means for cooling said laser medium by at least one of said smooth surfaces thereof;
wherein a recess is provided in said supporter at an excitation area corresponding position opposed to said laser medium, and a member having high reflection to excitation light being disposed in said recess.

21. A solid state laser apparatus according to claim 20, wherein said high reflectance member contacts a side surface of said laser medium with pressure.

22. A solid state laser apparatus according to claim 21, wherein an elastic body is disposed between a back surface of said high reflectance member and a recess, and elasticity of said elastic body contacts said high reflectance member with a side surface of said laser medium with pressure.

23. A solid state laser apparatus according to claim 21, wherein a screw hole is provided in a recess of said supporter to extend substantially perpendicular to a side surface of a laser medium, and a distal end of a screw member fitted into said screw hole contacts said high reflectance member with the side surface of said laser medium with pressure.

24. A solid state laser apparatus according to claim 23, wherein an elastic body is interposed between said high reflectance member and the distal end of said screw member.

25. A solid state laser apparatus according to claim 23, wherein a plate body is disposed on a back surface of said high reflectance member.

26. A solid state laser apparatus according to claim 25, wherein an elastic body is interposed between said high reflectance member and a plate body.

27. A solid state laser apparatus according to claim 26, wherein said plate body is made of a material having extremely lower elasticity than that of said elastic body.

28. A solid state laser apparatus according to claim 20, wherein said high reflection member is integrally formed with a condenser.

29. A solid state laser apparatus according to claim 20, wherein an irregularity is formed in said member having high reflection to excitation light at an inner surface opposed to said side of said laser medium or at a back surface, a cooling material is filled into a clearance of said irregularity.

30. A solid state laser apparatus according to claim 29, wherein a groove in a thickness direction of said laser medium is provided in the inner surface of said member having high reflection to excitation light to form said irregularity.

31. A solid state laser apparatus according to claim 29, wherein a distribution in a longitudinal direction or in a vertical direction of said laser medium is provided for a pitch, an area, or a depth of said irregularity.

32. A solid state laser apparatus according to claim 29, cooling of said laser medium is performed by coolant to contact each smooth surface, and a pressure difference is provided between coolants on the upper and lower sides of said laser medium so as to generate a flow of said coolant in a concave portion of the inner surface of said member having high reflection to excitation light.

33. A solid state laser apparatus according to claim 29, wherein the irregularity in the inner surface of said member having high light reflection to excitation light is formed by a groove extending diagonally to a thickness direction of said laser medium.

34. A solid state laser apparatus according to claim 20, wherein said member having high reflection to excitation light is made of a plurality of different materials.

* * * * *